United States Patent
Onishi et al.

(10) Patent No.: US 7,556,393 B2
(45) Date of Patent: Jul. 7, 2009

(54) LIGHTING SYSTEM, IMAGE DISPLAY APPARATUS USING THE SAME AND LIGHT DIFFUSION PLATE USED THEREFOR

(75) Inventors: Ikuo Onishi, Tsukuba (JP); Satoko Horikoshi, Tsukuba (JP); Toshiyuki Ito, Tsukuba (JP); Shigeki Kikuyama, Tsukuba (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 11/700,066

(22) Filed: Jan. 31, 2007

(65) Prior Publication Data

US 2007/0127265 A1    Jun. 7, 2007

Related U.S. Application Data

(63) Continuation of application No. 11/102,636, filed on Apr. 11, 2005, now Pat. No. 7,237,930.

(30) Foreign Application Priority Data

| Apr. 12, 2004 | (JP) | ............................... 2004-117290 |
| Apr. 12, 2004 | (JP) | ............................... 2004-117291 |
| Oct. 12, 2004 | (JP) | ............................... 2004-297177 |
| Mar. 7, 2005 | (JP) | ............................... 2005-62333 |
| Mar. 7, 2005 | (JP) | ............................... 2005-62334 |

(51) Int. Cl.
*G09F 13/04* (2006.01)

(52) U.S. Cl. .................................... 362/97

(58) Field of Classification Search .............. 362/97, 362/337, 333–334, 225, 217, 331, 219, 600, 362/603, 610, 611, 614–617, 619–620
See application file for complete search history.

(56) References Cited

U.S. PATENT DOCUMENTS

| 5,394,255 | A | * | 2/1995 | Yokota et al. ................. 349/64 |
| 5,471,327 | A | * | 11/1995 | Tedesco et al. ................ 359/15 |
| 6,312,787 | B1 | * | 11/2001 | Hayashi et al. ............. 428/156 |
| 7,220,038 | B2 | * | 5/2007 | Yamashita et al. .......... 362/606 |
| 2003/0184993 | A1 | * | 10/2003 | Yamada ....................... 362/31 |
| 2003/0198037 | A1 | * | 10/2003 | Kuo ............................ 362/31 |
| 2005/0002204 | A1 | * | 1/2005 | Lin et al. .................... 362/551 |
| 2005/0141844 | A1 | * | 6/2005 | Olczak ....................... 385/146 |

* cited by examiner

*Primary Examiner*—Anabel Ton
*Assistant Examiner*—Julie A. Shallenberger
(74) *Attorney, Agent, or Firm*—Oblon, Spivak, McClelland, Maier & Neustadt, P.C.

(57) ABSTRACT

The invention is directed to a lighting system having a reflector, light sources and a light control member sequentially disposed from a light incident side to a light outgoing side. Preferably used for large displays requiring high uniformity, this invention eliminates lamp image and removes the necessity to do light source repositioning, while enabling luminance in the exit plane to achieve excellent luminosity and uniformity. This invention achieves total light transmittance of more that 50% when light is incident at a predetermined angle α from the normal direction of the incident plane and achieves 1.05-3 times more total light transmittance than when the light is from a direction normal to the incident plane. This is achieved by the light control member by controlling the ration between total light transmittance in the positions of greater transmittance and the total transmittance in the positions of lesser transmittance.

8 Claims, 33 Drawing Sheets
(3 of 33 Drawing Sheet(s) Filed in Color)

LIGHTING SYSTEM, IMAGE DISPLAY APPARATUS USING THE SAME AND LIGHT DIFFUSION PLATE USED THEREFOR

BACKGROUND OF THE INVENTION

1) Field of the Invention

The present invention relates to a direct type lighting system, an image display apparatus using the same and a light diffusion plate used therefore. Especially, the present invention relates to a direct type lighting system, an image display apparatus using the same and a light diffusion plate used therefore which are preferably used for large electric signboards and liquid crystal display devices required high luminance and luminance uniformity.

2) Description of the Related Art

As for example of the lighting system for the image display apparatus, there are two types of lighting systems, one of which is an edge light type that the light from a light source is directed to the front direction by an optical waveguide and uniformly distributed through a diffusion sheet, and the other of which is an direct type that a light source is disposed behind the lighting plane and the light is uniformly distributed through a light diffusion plate.

As for the direct type, the thickness is inclined to increase because the light source is disposed behind the body. Alternatively, as for the edge light type, the light source is disposed on the edge. Therefore, the edge light type is more appropriate for cellular phones and mobile computers which are required the thinness so that it has been popularly used.

Meanwhile, recently the demand for a large-screen and high luminance display is increased in the market of televisions and computer screens mainly. Along with the display is enlarged, the edge light type can not provide sufficient luminance because the ratio of the length of the peripheral portion in which the light source can be disposed to the display area is reduced so that it is not supplied with sufficient quantities of light.

In consideration of the above-described problem, the method of improving the efficiency of using light by disposing a plurality of films to increase luminance on the surface illuminant was proposed. (cf. Patent document 1)

However, the luminance increasing film comes expensive and the large number of films is required so that it is not always appropriate in view of productivity and reducing the thickness of the body. Additionally, the edge light type has another problem that the weight of the optical waveguide is increased along with enlarging the display. Thus, recently it is difficult for the edge light type to meet the requirements of the marketplace such as the large-screen and high luminance display.

Thus for large-screen televisions and computer screens which are not strictly required to reduce the thickness of the body than cellular phones and mobile computers, the direct type is paid attention. In the direct type, the efficiency of using light emitted from the light source, that is to say, the percentage of the light flux emitted from the light-emitting surface among light flux emitted from the light source is high, and the number of the light source can be freely increased.

In other words, the quantity of light can be freely increased so that the required high luminance is easily obtained and the luminance and the luminance uniformity are not reduced even if the display is enlarged. Further, the weight can be reduced because the optical waveguide to guide light to the front is not required.

As for other lighting systems, the electric signboard for example is mainly the direct type because its configuration is simple and high luminance is easily obtained without using the luminance increasing film.

However, the directly under system should resolve the unique problems such as eliminating lamp image, thinning the body and low power consumption. Especially, the lamp image significantly appears as ununifomity of luminance than the edge light type. Additionally, the thickness of the display is disadvantage than the edge light system. Therefore, in order to reduce the thickness of the display, the configuration should be changed such that the member in thickness direction is thinned and the distance between which the members are disposed is narrowed. Thus, it is further difficult to resolve the problem of the lamp image. The conventional means used by the edge light type, i.e. the diffusion sheet on which light diffusing particles is applied can not resolve the problem of the lamp image.

Thus, light diffusion plates containing the light diffusing particles are popularly used. For example, a fine particles-containing light diffusion plate 20 is provided on the front surface of the light source 1 behind which the reflector 2 is disposed as FIG. 23. The method of using a fine particles-containing light diffusion plate composed by combining a base resin such as methacryl resin, polycarbonate resin, styrenic resin and vinyl chloride resin with fine inorganic particles or bridging fine organic particles as the light diffusing particles was considered. (c.f. Patent document 2)

However, in the method of using the light diffusing particles, light is absorbed into the light diffusing particles and diffused into the unnecessary direction so that the efficiency of using light is reduced. Therefore it is not preferable in view of energy saving. Additionally, the lamp image can be reduced by disposing adjacently a number of light sources, meanwhile power consumption is increased undesirably.

On the other hand, the method of eliminating the lamp image by forming the reflector in a unique shape is proposed. (c.f. Patent document 3). Where, it is required to align the reflector with the light source and the thinning is prevented due to the reflector shape. Accordingly, the method is not appropriate.

Additionally, the method of providing the reflective member opposite to the light source (c.f. Patent document 4), and the method of disposing light beam direction sensing element such as a Fresnel lens (c.f. Patent document 5) are proposed. Where, it is required to precisely align the member with the light source as well as the method described in the Patent document 3. Therefore, the problem that it is nonproductive occurs.

Further, the method of diffusing light using prism sheets is proposed. (c.f. Patent document 6) Where, those sheets can only split the light from the normal light source into two similar images. Therefore, the sufficient luminance uniformity can not be obtained.

As for the large lighting system, the thinness is not strictly required in comparison with cellular phones and mobile computers. Therefore, the distance between the light source and the light diffusion plate is reduced, and the number of the optical film is reduced so that it can deal with the problems.

Additionally, in order to save energy, the efficiency of using light should be improved. The direct type can increase the number of the light source and obtain high luminance. However, the large number of light diffusing particles to eliminate the lamp image, which significantly reduce the efficiency of using light should be avoided to be used in view of energy saving.

[Patent document 1] Japanese Patent Unexamined Publication No. 2-17
[Patent document 2] Japanese Patent Unexamined Publication No. 54-155244
[Patent document 3] Japanese Patent No. 2852424
[Patent document 4] Japanese Patent Unexamined Publication No. 2000-338895
[Patent document 5] Japanese Patent Unexamined Publication No. 2002-352611
[Patent document 6] U.S. Pat. No. 5,161,041

SUMMARY OF THE INVENTION

The object of the present invention is that a direct type lighting system having a plurality of light sources and an image display apparatus using the same characterized in that: the luminance at the exit plane is increased; the efficiency of using light is increased; it is easily adapted to the large-screen because it is not changed the optical design and is not reduced the luminance and the luminance uniformity along with enlarging the screen; the lamp image is eliminated without strictly aligning the light source with the other members; and the distance between the light source and the other members is narrowed and the film configuration is simplified to reduce the thickness: and a light diffusion plate appropriately used as the member for a direct type lighting system having the light source disposed directly under the principal plane thereof and an image display apparatus using the same, and having high luminance uniformity are provided.

The present inventors considered the above-described problems and studied as follows so that the present invention is achieved.

In the direct type lighting system, outgoing light energy is increasing in the direction opposite to each light source and reducing as getting away therefrom. When a plurality of light sources is used, the outgoing light energy is reduced at the position opposite to the region between adjacent light sources. Therefore, the light emitted from the position opposite to the light source is weakened by appropriately reflecting using a light control member (such as the light diffusion plate), the reflected light is diffused by the reflector as diffused light and the diffused light is returned to the light control member again to exit.

Thereby the energy of the light emitted from the position opposite to the light source is equivalent to the energy of the light emitted from the other positions without so much reducing the efficiency of using light so that the lamp image is eliminated. Additionally, means for controlling the ratio between the total light transmittance in the position opposite to the light source of the light control member and the total light transmittance in the position opposite to the middle point between adjacent two light sources to the appropriate range, that is to say, means for controlling the ratio between the total light transmittance of the light vertically incident on the incident plane of the light control member and the total light transmittance of the light incident on the incident plane of the light control member from a predetermined angle to the appropriate range was found in order to achieve the above-described object.

The reflected light to the light source may be recycled by a reflector which is individually disposed. Since the directivity of the light to be recycled is reduced than that of the light from the normal light source, the elimination of the lamp image as one of the problems of the present invention can be efficiently resolved without so much reducing the efficiency of using light.

The present inventors further studied in detail so that the optimum range of the ratio of the total light transmittance was found. Thereby the light diffusing members causing to reduce efficiency of using light can be eliminated or substantially reduced so that the efficiency of using light can be improved.

In order to eliminate to align the light source with the light control member, any point of the incident plane on the light control member should have the same property regarding the total light transmittance. That is to say, any point on the incident plane should have the uniform optical property. Where, the point means a minute region at least not affecting vision.

Additionally, a plurality of convex structures were formed on at least one of the principal planes of the light control member as means for controlling the ratio of the total light transmittance. Further, the preferable shape of the convex structure is found.

In order to eliminate to align the light source with the light control member, any point of the incident plane on the light control member should have the same property regarding the total light transmittance. That is to say, any point on the incident plane should have the uniform optical property as described above. Where, the "point" means not the minute region only including one slope of the convex structures but an region equivalent to the width of one convex structure as well as the minute region not affecting vision in order to effectively utilize the optical property of the convex structures which is the feature of the present invention. The "region not affecting vision" means a region in which the substantial unevenness is not viewed. It is different as usage, and for example, it is usually within 500 μm in diameter in home large-screen televisions.

Meanwhile, as for the light diffusion plate of the present invention, the object that the use of the diffusing material is eliminated or substantially reduced and the lamp image in the direct type lighting system is eliminated without aligning with the light source is same as the light control member. In order to achieve the object, the ratio of the total light transmittance is controlled, and any point on the incident plane has the same optical property regarding the total light transmittance in the same way. Further, in order to extensively meet various configurations, the light diffusion plate of the present invention can widely adjust the ratio of the total light transmittance. Thereby the light diffusion plate can be not only applied as the light control member of the present invention, but also applied to a lighting system using a single light source, a lighting system without a reflector and a double-faced lighting system.

Based on the above-described consideration, the invention according to claim 1 is a direct type light system comprising at least a plurality of light source regularly disposed, a reflector and a light control member for controlling the direction to which the light exit that the light from the reflector passes therethrough. Where, the reflector, the light sources and the light control member are sequentially disposed from the light incident side to the light outgoing side. The light control member has an incident plane for mainly receiving light and an exit plane for mainly emitting light. The distance between any light source X1 and the proximate other light source Y1 is D, the distance between the light source X1 and the light control member is H, and the total light transmittance of the light incident on any point on the incident plane at an angle $\alpha = \mathrm{Tan}^{-1}\{(D/2)/H\}$ with the normal direction of the incident plane is more than 50%. The total light transmittance is 1.05-3 times as many as the total light transmittance when the light is incident on the point on the incident plane from the normal direction.

Thereby the total light transmittance of the light incident at an predetermined angle $\alpha=\text{Tan}^{-1}\{(D/2)/H\}$ with the normal direction of the incident plane is more than 50%, and is 1.05-3 times as many as the total light transmittance when the light is incident from the normal direction, that is to say, it is appropriately increased than the total light transmittance of the light incident on the position directly-above and opposite to the light source. Accordingly, the light energy emitted from the light control member is uniformly distributed within the exit plane. Additionally, desirable optical property can be obtained at any point on the incident plane.

The invention provides the lighting system according to claim 1. Wherein the lighting system includes the light control member in which a plurality of convex structures are formed on the exit plane.

Since pluralities of convex structures are formed on the exit plane, the light incident on the light control member and advancing toward the exit plane is diffused in multidirectional course by the plurality of convex structures and exited.

The invention provides the lighting system. Wherein the range in which the absolute vale of slope of the convex structure formed on the exit plane of the light control member is 50-70 degrees is U. The ratio of the projected area of U onto the light control member to the projected area of one convex structure onto the light control member is within 0.2-0.8.

Thereby the light incident on the region U among the light incident on the light control member corresponding to the position between the light sources exits to approximately front direction so that the luminance uniformity within the plane can be obtained.

The invention provides the lighting system. Wherein the border line on the light exit surface on the cross-section along at least a predetermined one direction, which is perpendicular to the exit plane of the light control member and includes the top of the convex structure includes two approximate straight lines of which extension lines cross at an acute angle $\theta$ each other and a convex curve lying across between each end of the two approximate straight lines.

Since the shape of the border line of the convex structure has two approximate straight line of which extension lines cross at an acute angle $\theta$ each other and a convex curve lying across between each end of the two approximate straight lines, condensing efficiency and diffusing efficiency are different between the approximate straight line portion and the convex curve portion. Accordingly, the ratio between the straight line portion and curve portion is appropriately selected so that condensing function and diffusing function can be provided together.

The invention provides the lighting system according to claim 1. Wherein 10-50% of the light incident on the incident plane of the light control member at an angle α with the normal direction exits at an angle from −15 degrees to +15 degrees with the normal direction of the exit plane.

Since 10-50% of the light incident at an angle α exits at an angle from −15 degrees to +15 degrees, the ratio of the light component exits from the front direction of the light control member, i.e. the normal direction of the incident plane is significantly increased on the exit plane of the light control member.

The invention provides the lighting system according to claim 1. Wherein the light control member includes a plurality of convex structures formed on the incident plane. The borderline including the top of the convex structure and cut by the direction perpendicular to the incident plane includes two approximate straight lines between which the top of the convex structure is sandwiched. Thereby the light emitted from the light source to the light control member is inclined to plurality of angles on the incident plane.

Since the light is inclined to plurality of angles on the incident plane, comparing the total light transmittance between the light vertically incident on the incident plane and the light obliquely incident on the incident plane, the latter total light transmittance is higher than that of the former. Additionally, a part of the light obliquely incident is totally reflected within the convex structure formed on the incident plane to exit at an angle approximately perpendicular to the light control member. That is to say, the luminance in the normal direction between the light sources is increased so that luminance uniformity within the plane can be improved.

The invention provides the lighting system according to claim 1. The light source is a liner light source. The light control member includes a plurality of convex structures formed on the incident plane. The ridgeline on the light exit surface which is perpendicular to the exit plane and is cut by the direction including the top of the convex structure on the exit plane and being in parallel with the linear source is a straight line extending in the direction in parallel with the liner light source.

Since the straight line direction of ridgeline formed on the exit plane is in parallel with the longitudinal direction of the liner light source, a part of the light particularly advancing directly-above the liner light source and incident on the light control member is totally reflected by the convex structures on the exit plane.

The invention provides the lighting system according to claim 1. Wherein at least one layer having the thickness of less than 1 μm and made of the material having the refractive index less than that of the base material of the light control member is formed on at least either of the incident plane or the exit plane of the light control member.

Since the thin layer (less than 1 μm) made of the material having the refractive index less than that of the base material of the light control member is formed on the incident plane or the exit plane of the light control member, the transmittance of oblique incidence can be increased than that of vertical incidence due to optical interferential action.

The invention provides the lighting system according to claim 1. The light source is a point light source.

Even if the plurality of light sources is point light source, luminance can be uniformalized as well as the liner light source.

The invention provides an image display apparatus including the lighting system according to claim 1 on which a transmissive display device.

Since the transmissive display device such as a liquid crystal panel is provided on the lighting system, the light efficiently condensed or diffused by the light control member can transmits through the transmissive display device.

The invention provides a light diffusion plate including two approximately parallel principal planes. A plurality of convex structures is periodically formed on at least one of the principal planes. The one of the principal planes is an incident plane for mainly receiving light and the other of the principal planes is an exit plane for mainly emitting light. The total light transmittance when the light is incident on the incident plane at a predetermined angle α with the normal direction is more than 50% and 1.05-5 times as many as the total light transmittance when the light is vertically incident.

Since the light diffusion plate has the parallel principal planes, it is also appropriate for a continuous molding such as an extrusion molding. The total light transmittance when the light is incident on the incident plane at a predetermined angle α with the normal direction is more than 50% and 1.05-5 times as many as the total light transmittance when the light is incident from the normal direction, that is to say, it is appropriately higher than the total light transmittance of light incident on the position directly-above and opposite to the light source. Accordingly, the light energy emitted from the light diffusion plate is uniformly distributed within the exit plane. Additionally, the convex structures are periodically formed so that desirable optical property can be obtained at any point on the incident plane. That is to say, the total light transmittance of the light diffusion plate is dependent on only the incident angle but independent of the incident position so that it is not necessary to finely align the light diffusion plate with the other members such as the light source. In other words, it is not necessary to strictly set the position and direction within the plane of the light diffusion plate when the lighting system is assembled. Accordingly, as for the light diffusion plate of the present invention, after the large plate is manufactured, each piece cut from any position according to the required size can be used so that it is also appropriate for a continuous molding such as an extrusion molding. Additionally, since it is not necessary to change the lighting system due to resize, productivity can be improved. As thus described above, the light diffusion plate can be preferably used for a direct type lighting system having a plurality of light source which are disposed behind the light diffusion plate, and also can be used for a electric signboard, a large lighting system having a single-sided lighting plane or a double-sided lighting plane and an image display apparatus using the same. Additionally, the light diffusion plate also can be used as the light control member in the lighting system, and the image display apparatus.

The invention provides the light diffusion plate. Wherein 10-50% of the light incident on the light diffusion plate at an angle $\alpha$ with the normal direction exits at an angle from ($-\pi/12$ radian) to ($\pi/12$ radian with the normal direction of the exit plane.

Thereby the light incident at a predetermined angle $\alpha$ is controlled to exit around the front.

The invention provides the light diffusion plate. Wherein the angle $\alpha$ is within 30-80 degrees.

Since the total light transmittance of the light incident at the angle 30-80 degrees out of the normal direction and the light incident from the normal direction is adjusted, the outgoing light can be widely and uniformly distributed.

The invention provides the light diffusion plate. The incident plane is a flat plane. The exit plane includes the convex structures. The slope $\theta$ of the border line on the light exit surface on the cross-section in at least a predetermined one direction which is perpendicular to the exit plane and includes the top of the convex structure satisfies $0 \leq |\text{Sin}^{-1} (n \cdot \sin(\theta - \text{Sin}^{-1}(1/n) \cdot \sin \alpha)) - \theta| \leq (\pi/12)$ (radian) the refractive index of the light diffusion plate is n, and includes an region X in which the absolute value $\theta 2$ of the slope to the exit plane is less than $\text{Sin}^{-1}(1/n)$. The region X includes the top of the convex structure. The ratio between a length x of the directional component in parallel with the exit plane on the region X and a length P of the directional component in parallel with the exit plane over the border line is within 0.15-0.80.

Since the exit plane includes the convex structure and the slope of the border line of the cross-section including the top of the convex structure and cut by a plane perpendicular to the exit plane in a predetermined one direction is less than $\theta$, the incident light at the angle $\alpha$ is prevented from exiting to unnecessary direction far out of the front. Additionally, since the light diffusion plate includes a region X in which the absolute value for the slope $\theta 2$ to the exit plane is less than $\text{Sin}^{-1}(1/n)$ by a ratio of 0.15-0.80 of the exit plane as the directional component in parallel with the exit plane on the border line and the region X includes the top, the region X appears the different light diffusibility. The ratio of the region X is adjusted so that the balance between condensing and diffusing can be adjusted and the incident light can be emitted over the preferred angle distribution.

The invention provides the light diffusion plate. The incident plane is flat plane. The exit plane includes the convex structures. The border line on the light exit surface on the cross-section in at least a predetermined one direction, which is perpendicular to the exit plane and includes the top of the convex structure has two straight lines of the convex structure. The two straight lines cross at an acute angle $\theta 1$ on the exit side of the top.

Since the predetermined cross-section has the two straight lines crossing at the acute angle $\theta 1$ on the exit side of the top of the light diffusion plate, the light incident at the angle $\alpha$ can be inclined to a preferred angle to emit.

The invention provides a light diffusion plate including two approximately parallel principal planes. Wherein one of the principal planes is an incident plane for mainly receiving light and the other of the principal planes is an exit plane for mainly emitting light. When the light is incident on the incident plane at a predetermined angle $\alpha$ with the normal direction, the total light transmittance is more than 50% and 1.05-3 times as many as the total light transmittance when the light is vertically incident. The convex structures are periodically formed on the incident plane. The border line of the cross section including the top of the convex structure and cut by a plane perpendicular to the incident plane in a predetermined one direction has two straight lines of the convex structure. The two straight lines cross at an acute angle $\theta 1'$ more than an angle ($\pi/9$ radian) on the top or the entrance side of the top.

Since the total light transmittance of the light incident on the incident plane of the light diffusion plate at the predetermined angle $\alpha$ with the normal direction is more than 50%, and further the convex structures are formed on the incident plane, the light is inclined to plurality of angles on the incident plane, thereby the total light transmittance is 1.05-3 times as many as the total light transmittance when the light is incident from the normal direction, that is to say, it is appropriately higher than the total light transmittance of light incident on the position directly-above and opposite to the light source. Accordingly, the light energy emitted from the light diffusion plate is uniformly distributed within the exit plane. Additionally, the convex structures are periodically formed so that desirable optical property can be obtained at any point on the incident plane.

The invention provides the light diffusion plate. The exit plane includes convexoconcave.

Thereby a part of the light uniformly distributed in the plane by the convex structures on the incident plane is totally reflected by the convexoconcave formed on the exit plane.

The invention provides the light diffusion plate. Wherein When the refractive index of the light diffusion plate is n, the light diffusion plate has a region Y in which the absolute value to the slope of the incident plane is an angle $\theta 2'$ satisfying $0 \leq \text{Sin}^{-1}(n \cdot \sin(\theta 2' - \text{Sin}^{-1}(1/n) \cdot \sin \ \theta 2'))) \leq (\pi/12)$ (radian) between the convex structures on the incident plane.

Thereby a part of the light incident from the normal direction is emitted to the region Y provided between the convex structures on the incident plane at an angle from ($-\pi/12$ radian) to ($\pi/12$ radian) with the normal line.

In the invention according to claim 1, the total light transmittance of the light incident on the light control member at the position opposite to the middle point between adjacent two light sources is appropriately higher than the total light transmittance of the light incident on the position opposite to the light source so that the light energy emitted from the light control member is uniformly distributed within the exit plane. Thereby the lighting system in which the lamp image is eliminated, luminance is increased and the luminance within the exit plane is uniformalized can be obtained.

Additionally, the desirable optical property can be obtained at any point on the incident plane thereby it is not necessary to align the light source with the light control member, and the change of display size, the number of the light source and the placement of the light source can be flexibly responded so that the productivity of the lighting system can be improved. Further, the use of light diffusing particles causing to reduce the efficiency of using light can be eliminated or substantially reduced so that the high efficiency of using light is achieved.

In the invention, light is effectively condensed on the exit plane by a plurality of convex structures and diffused to exit in a multidirectional course condensing efficiency and diffusing efficiency are improved than ever before so that luminance can be further uniformalized within the exit plane.

In the invention, the region U in which the absolute value for the slope of the convex structure on the exit plane is 50-70 degrees is within 0.2-0.8 of the projected area of the convex structure so that the light approximately vertically incident from the light source is totally reflected so as not to exit and the light obliquely incident on the position between the light sources exits to approximately front direction. Thereby the luminance within the exit plane can be uniformalized.

In the invention, the degree of condensing and diffusing on the exit plane is different between the approximately straight line portion and the curve portion each other thereby the condensing efficiency and the diffusing efficiency on the exit plane are further improved so that the luminance within the exit plane can be effectively uniformalized.

In the invention, the ratio of light exiting from the front direction of the light control member on the exit plane is increased so that the luminance in the front direction is improved, especially.

In the invention, the total light transmittance of the light obliquely incident on the incident plane is more than the total light transmittance of the light vertically incident on the incident plane so that the light energy on the exit plane of the light control member can be uniformalized in the region directly above each light source and the region obliquely above each light source (the region directly above the region between the light sources)

In the invention, a part of the light vertically incident on the light control member is totally reflected by the convex structures on the exit plane so that the transmittance of the light vertically incident on the light control member can be easily controlled.

In the invention, the transmittance of the light vertically incident on the light control member is reduced and the transmittance of the light obliquely incident on the light control member is increased so that the light control member can further easily controls to adjust the light transmittance.

In the invention, a plurality of point light source are used thereby luminance is uniformalized as well as when the linear light source is used so that the number of the point light source can be selected according to the use conditions and the degree of freedom to design is broadened in view of selecting the kind of light sources.

In the invention, the light condensed and diffused by the light control member is transmitted through the transmissive display device. Thereby the image display apparatus in which it is not necessary to adjust the position of the light source, the lamp image can be eliminated, and the brightness is excellently uniformalized within the exit plane can be easily obtained while it is simply configured.

The invention, the total light transmittance of the light incident at a predetermined angle $\alpha$ is appropriately higher than the total light transmittance of the light incident from the normal direction by the convex structures periodically formed on at least one of the principal planes so that the light energy emitted from the light diffusion plate can be uniformly distributed within the exit plane. Thereby the lamp image in the direct type lighting system and the light diffusion plate in which luminance is increased and the luminance within the exit plane is uniformalized can be obtained.

Additionally, the preferred optical property can be obtained at any point on the incident plane thereby it is not necessary to align the light source with the light control member, and the change of display size, the number of the light source and the placement of the light source can be flexibly responded so that the productivity of the lighting system can be improved. Further, the use of the light diffusing particles causing to reduce the efficiency of using light can be eliminated or substantially reduced so that the high efficiency of using light is achieved.

In the invention, the ratio of light exiting from the front direction of the light diffusion plate on the exit plane is increased so that the luminance in the front direction improved, especially.

In the invention, The predetermined angle $\alpha$ is within 30-80 degrees so that the light from the light source to the light diffusion plate can be uniformly distributed within the exit plane even if the incident angle of the desired range is wide. Thereby the uniform outgoing image by using one or a few light sources so that the body can be thinned, the number of parts can be reduced and further energy can be saved, especially.

The invention, the degree of condensing and diffusing on the exit plane is different between the region X and the other regions on the exit plane each other thereby the condensing efficiency and the diffusing efficiency on the exit plane are further improved so that the luminance within the exit plane can be effectively uniformalized.

In the invention, the light can be exited at the same angle as the incident angle by the straight line portion thereby the outgoing light distribution can be easily controlled, ununifomity of luminance can be easily eliminated, and the luminance around the front can be further increased according to need.

In the invention, the total light transmittance when the light is obliquely incident on the incident plane is 1.05-3 times as many as total light transmittance when the light is incident on the incident plane from the normal direction so that the light energy emitted from the light diffusion plate is uniformly distributed within the exit plane. Thereby the lamp image in the direct type lighting system is eliminated, and the light diffusion plate in which the luminance is increased and the luminance within the exit plane is uniformalized can be obtained.

Additionally, the preferred optical property can be obtained at any point on the incident plane thereby it is not necessary to align the light source with the light diffusion plate, and the change of display size, the number of the light source and the placement of the light source can be flexibly responded so that the productivity of the lighting system can be improved. Further, the use of the light diffusing particles causing to reduce the efficiency of using light can be eliminated or substantially reduced so that the high efficiency of using light is achieved.

In the invention, a part of the light incident on the light diffusion plate from the normal direction is totally reflected by the convex structures on the exit plane so that the transmittance of the light vertically incident on the light diffusion plate can be easily controlled.

In the invention, a part of the light incident from the normal direction is emitted to at an angle from $(-\pi/12 \text{ radian})$ to $(\pi/12 \text{ radian})$ with the normal line by the region Y provided between the convex structures on the incident plane. Thereby the total light transmittance and the luminance angle distribution of the light incident from the normal direction can be easily controlled.

The present invention provides the direct type lighting system comprising at least a plurality of light sources regularly disposed, a reflector and a light control member to control the outgoing direction when the light from the light sources and the reflector is transmitted therethrough. The reflector, the light sources and the light control member are sequentially disposed from the light incident side to the light outgoing side. The light control member includes an incident plane for mainly receiving light and an exit plane for mainly emitting light. The total light transmittance of the light incident on the light control member at the position opposite to the middle point between two adjacent light sources is appropriately higher than the total transmittance of the light incident on the position opposite to the light source so that the light energy emitted from the light control member can be uniformly distributed within the exit plane. Thereby the lighting system in which the lamp image is eliminated, the luminance is increased, the efficiency of using light is improved and the luminance within the exit plane is uniformalized can be obtained.

In the light control member according to the present invention, it is not necessary to align the light control member with the light source because the preferred optical property can be obtained at any point on the incident plane. Additionally, the ratio between the total light transmittance of the light incident on the position opposite to the light source and the total light transmittance of the light incident on the position opposite to the middle point between adjacent light sources is related to the distance between the light sources and the distance between the light source and the light control member.

Therefore, the change of the display size, the number of light sources and the placement of the light sources can be flexibly responded in order to satisfy the demand for enlarging and thinning the body and low power consumption, and the productivity of the lighting system can be improved. Additionally, high luminance, luminance uniformity and luminance angle distribution desirable for the lighting system can be easily obtained thereby the use of the functional optical films and light diffusing particles can be eliminated or substantially reduced.

Additionally, in the present invention, the light condensed and diffused through the light control member is transmitted trough the transmissive display device thereby the image display apparatus in which it is not necessary to adjust the position of the light sources, the lamp image can be eliminated, and the brightness is excellently uniformalized within the exit plane can be easily obtained while it is simply configured.

Further, the light diffusion plate according to the present invention can be not only applied as the light control member, but also applied to a lighting system using a single light source and a lighting system without a reflector because the ratio of the total light transmittance can be widely controlled within the preferred range. Thereby the lighting system in which the lamp image is eliminated, luminance is increased and the luminance within the exit plane is uniformalized can be obtained in the same way.

BRIEF DESCRIPTION OF THE DRAWINGS

The patent or application file contains at least one drawing executed in color. Copies of this patent or patent application publication with color drawing(s) will be provided by the office upon request and payment of the necessary fee.

DETAILED DESCRIPTION

Firstly, preferred embodiments of the lighting system and the image display apparatus provided by the present invention will be described. The present invention is characterized in that: The reflector, the light sources and the light control member are sequentially disposed from the light incident side to the light outgoing side; The light control member includes an incident plane for mainly receiving light and an exit plane for mainly emitting light; When the distance between any light source X1 and the proximate another light source Y1 is D, and the distance between the light source X1 and the light control member is H, the total light transmittance of the light incident on any point on the incident plane at an angle $\alpha=\text{Tan}^{-1}\{(D/2)/H\}$ with the normal direction of the incident plane is more than 50% and 1.05-3 times as many as the total light transmittance when the light is incident on the point on the incident plane from the normal direction. Thereby the lighting system and the image display apparatus in which the configuration is simplified, the productivity is improved, it is not necessary to adjust the position of the light sources, the lamp image is eliminated and the luminance within the exit plane is excellently uniformalized can be obtained inexpensively.

Further, the total light transmittance of the light control member is dependent on only the incident angle but independent of the incident position on the light control member so that it is not necessary to align a plurality of light sources with the light control member. In other words, it is not necessary to strictly set the position and direction within the plane of the light control member when the lighting system is assembled. Accordingly, after the light control member is manufactured as a large plate, each piece cut from any position according to the required size can be used so that the productivity of the lighting system can be significantly improved.

EMBODIMENT 1

The lighting system and the image display apparatus provided in the present invention will be described with reference to FIG. 1-FIG. 34 as the embodiment 1.

Figure 1:
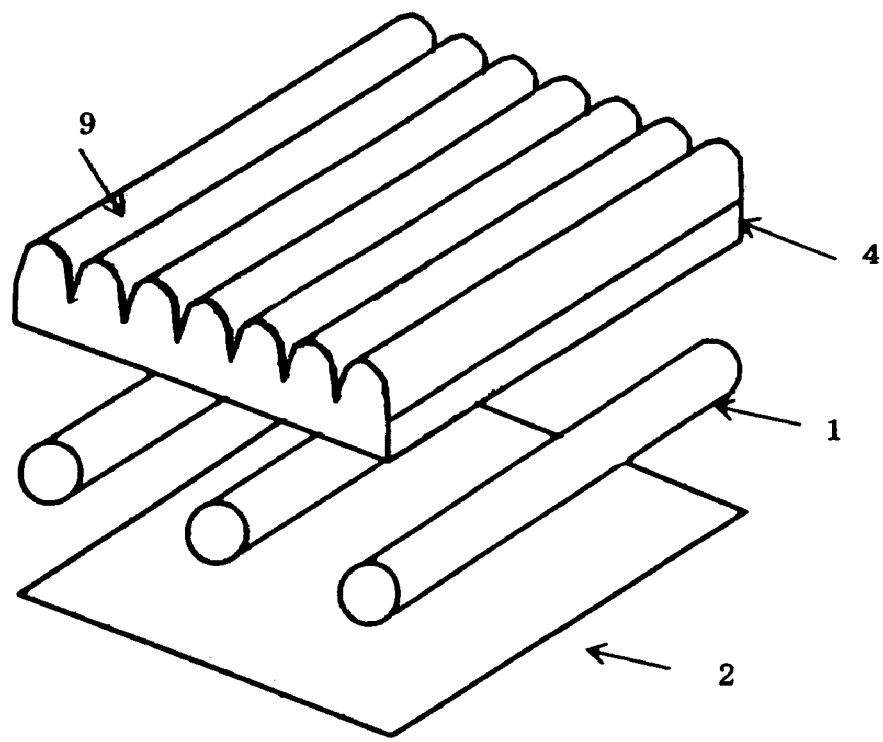
FIG. 1 is a schematic view of an embodiment of the lighting system according to the present invention.

A reflector 2, a plurality of light sources 1 and a light control member 4 are sequentially disposed from a light incident side to a light outgoing side as FIG. 1. A plurality of convex structure is regularly formed on the light control member 4.

Figure 2:
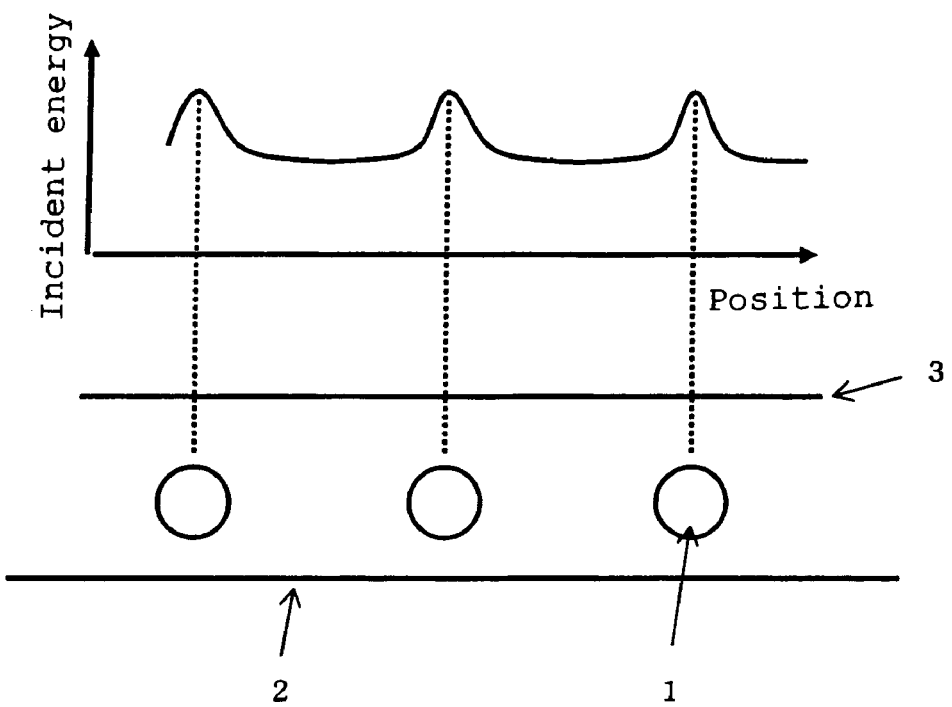
FIG. 2 is an incident energy distribution diagram typically representing the incident energy of the light incident on the imaginary plane provided above a plurality of light sources according to the present invention.

In the lighting system including the plurality of light sources 1 on the reflector 2, the incident energy of the light incident on a vertical imaginary plane 3 perpendicular to the front direction (upward in the figure) is different between the portion directly above each light source 1 and the portion directly above between each adjacent light source 1 as FIG. 2. The imaginary plane 3 is equivalent to the incident plane of the light control member 4 in FIG. 1 and it is means that the incident energy on the light control member 4 is different between the portion directly above each light sources 1 and the portion directly above between each adjacent light source 1.

That is to say, the region opposite to and directly above each light source 1 is close to the light sources 1 so that the incident energy is increased, alternatively, the region not directly above between a plurality of light sources 1 (the portion obliquely above each light source 1) is not directly above the light sources 1 and not close to the light sources 1 so that the incident energy is reduced.

Figure 3:
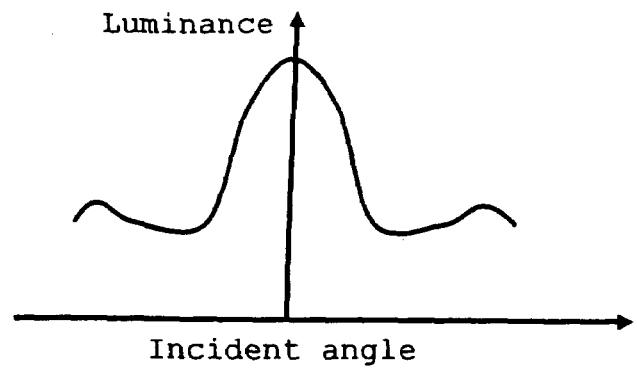
FIG. 3 is a luminance distribution diagram typically representing the luminance (incident energy) of the light incident on the light control member (imaginary plane) directly above the linear light source according to the present invention.

FIG. 3 is an explanatory view representing the relationship between the incident angle and the incident energy of the light incident on the imaginary plane 3 opposite to and directly above the light source 1 in FIG. 2. Where, the incident angle means an angle of the imaginary plane 3 with the normal line. The luminance of the light vertically incident on the imaginary plane 3 is highest as FIG. 3. The luminance is gradually come down as the light advances out of vertical direction and the incident angle is increased.

Figure 4:
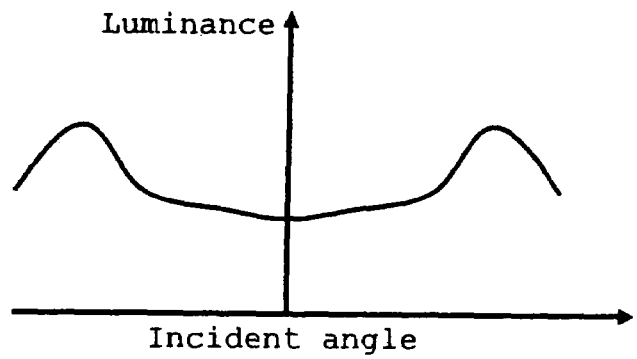
FIG. 4 is a luminance distribution diagram typically representing the luminance (outgoing energy) of the light incident on the light control member (imaginary plane) between a plurality of linear light sources according to the present invention.

Meanwhile, FIG. 4 is an explanatory view representing the relationship between the incident angle and the incident energy of the light incident on the imaginary plane 3 corresponding to the portion between the light sources 1 in FIG. 2. The luminance of the light vertically incident on the imaginary plane 3 is low as FIG. 4. The luminance reaches a peak when the light is incident on out of the normal direction and closely approaches the light source.

Figure 5:
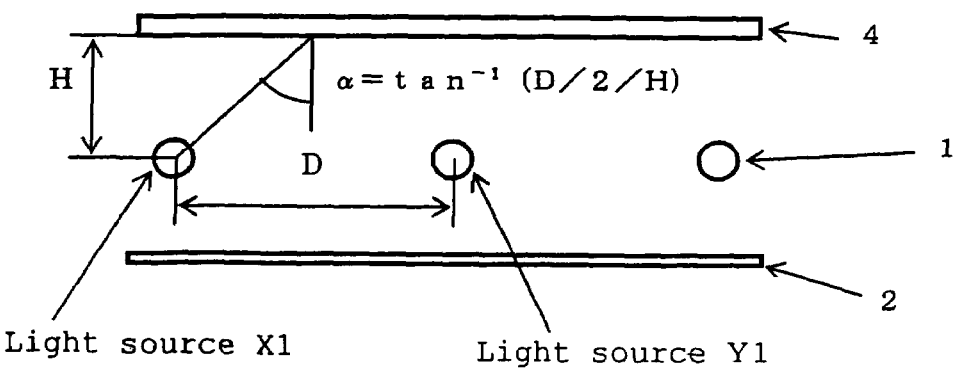
FIG. 5 is a schematic view representing the incident angle of the light incident on the light control member positioned between a plurality of light sources according to the present invention.

FIG. 5 is a schematic view representing the positional relationship between any light source X1, another light source Y1 proximate to the light source X1, the reflector 2 and the light control member 4 in the lighting system according to the present invention. When the distance between any light source X1 and another light source Y1 proximate to the light source X1 is D, and the distance between the light source X1 and the light control member 4 is H, the total light transmittance as the rate when the light incident on any point on the incident plane of the light control member 4 at an angle α exits from the exit plane of the light control member 4 is within 50%-100%. Where, the following relationship is satisfied.

When the light is incident on the incident plane at an angle $\alpha=\text{Tan}^{-1}\{(D/2)/H\}$ with the normal direction, the total light transmittance R1 is 1.05-3.00 times as many as the total light transmittance when the light is vertically incident on the incident plane. Preferably, the rate R1/R2 of the total light transmittance is 1.05-2.00 times in view of efficiency of using light.

The angle α is equivalent to the incident angle when the light emitted from the light source X1 or Y1 is incident on the light control member 4 directly above the middle point between the light source X1 and Y1. The total light transmittance R1 when the light is obliquely incident on the light control member 4 at the incident angle α(≠0) is higher than the total light transmittance R2 when the light is vertically incident on the light control member 4. Therefore, the outgoing light energy in the light control member 4 can be totally uniformalized on the portion directly above each light source X1 and Y1, and the portion between the light source X1 and Y1.

Figure 6:
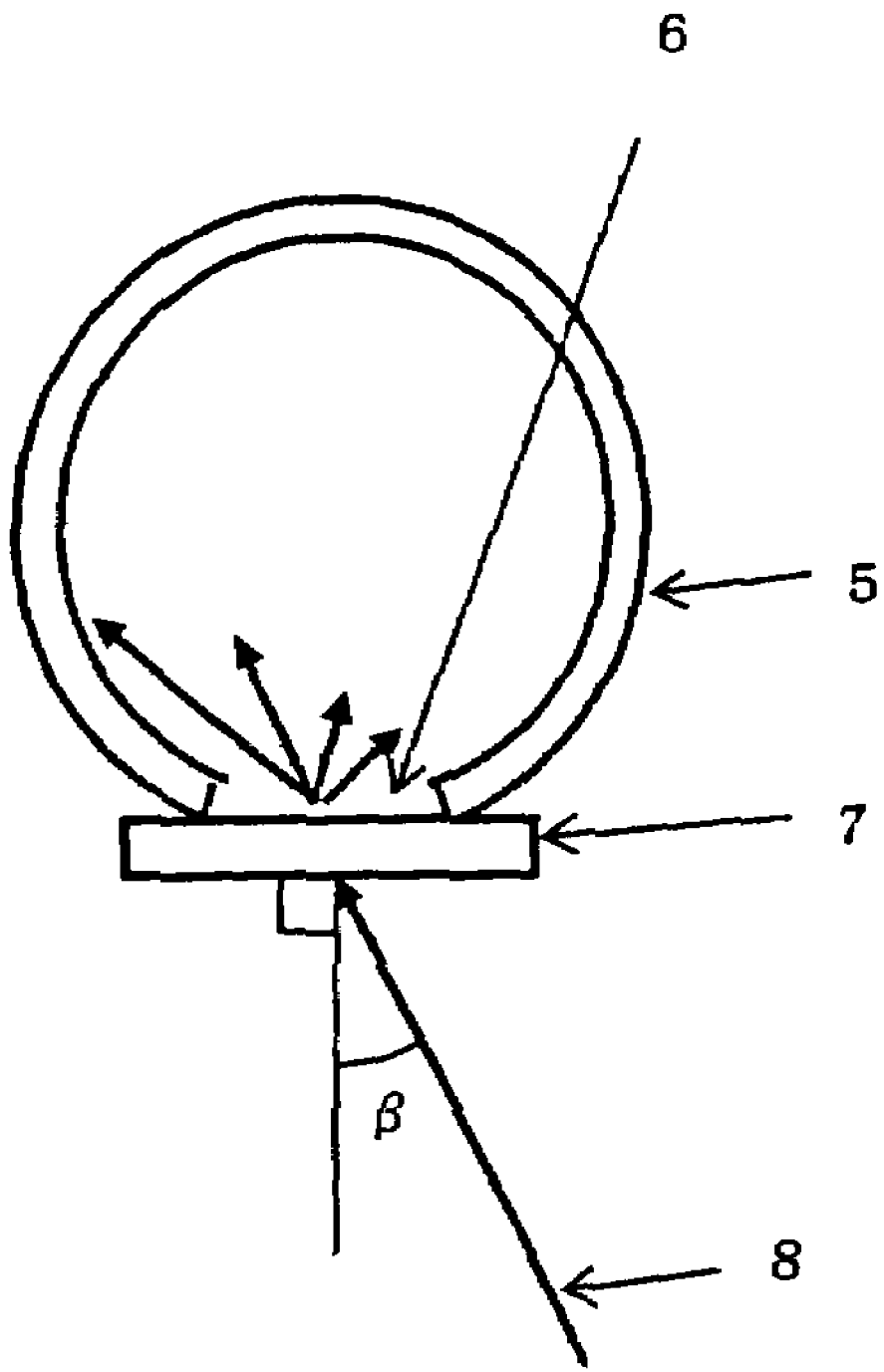
FIG. 6 is a schematic view representing an example of the device to measure angular dependency of the total light transmittance of the light control member according to the present invention.

A method of measuring the total light transmittance required for selecting the light control member used for the present invention is represented in FIG. 6. A measuring object 7 is provided below an aperture 6 of an integrating sphere 5 such that aperture 6 is closed by the measuring object 7. Laser beam or parallel light 8 collimated by a lens is incident on the measuring object 7 at an angle β with the normal direction as FIG. 6.

Then, the light transmitted through the measuring object 7 is irregularly reflected in the integrating sphere 5. The reflected energy is measured with a detector as represented by a photomultiplier (not shown in the figure). Provided that the output from the detector when the measuring object 7 is disposed as FIG. 7 and the parallel light 8 is incident on the measuring object 7 at the angle β is V(β), and the output from the detector when the measuring object 7 is not disposed is V0, the total light transmittance at the angle β is derived from V(β)/V0.

As for measuring the total light transmittance, when convexoconcave is formed on the surface of the light control member, the width of the parallel light flux to the measuring object should be not for a micro region such as only one slope of the convexoconcave but for a wide region at least more than the pitch of the convexoconcave in order to reflect the feature of the convexoconcave on the total light transmittance.

An example of concrete means for adjusting the total light transmittance when the light is vertically and obliquely incident on the light control member 4 will be described.

Firstly, as for a first example of the concrete means, a plurality of convex structures 9 is formed on the exit plane of the light control member 4 as FIG. 1. When the convex structures 9 are cut perpendicular to the exit plane of the light control member 4 and along at least a predetermined one direction including the top of the convex structure 9, a preferred cross-section is as follows.

When the range in which the absolute value for the slope of the border line is 50-70 degrees is U, the ratio of the projected area of U onto the light control member to the projected area of one convex structure onto the light control member is within 0.2-0.8.

Figure 28:
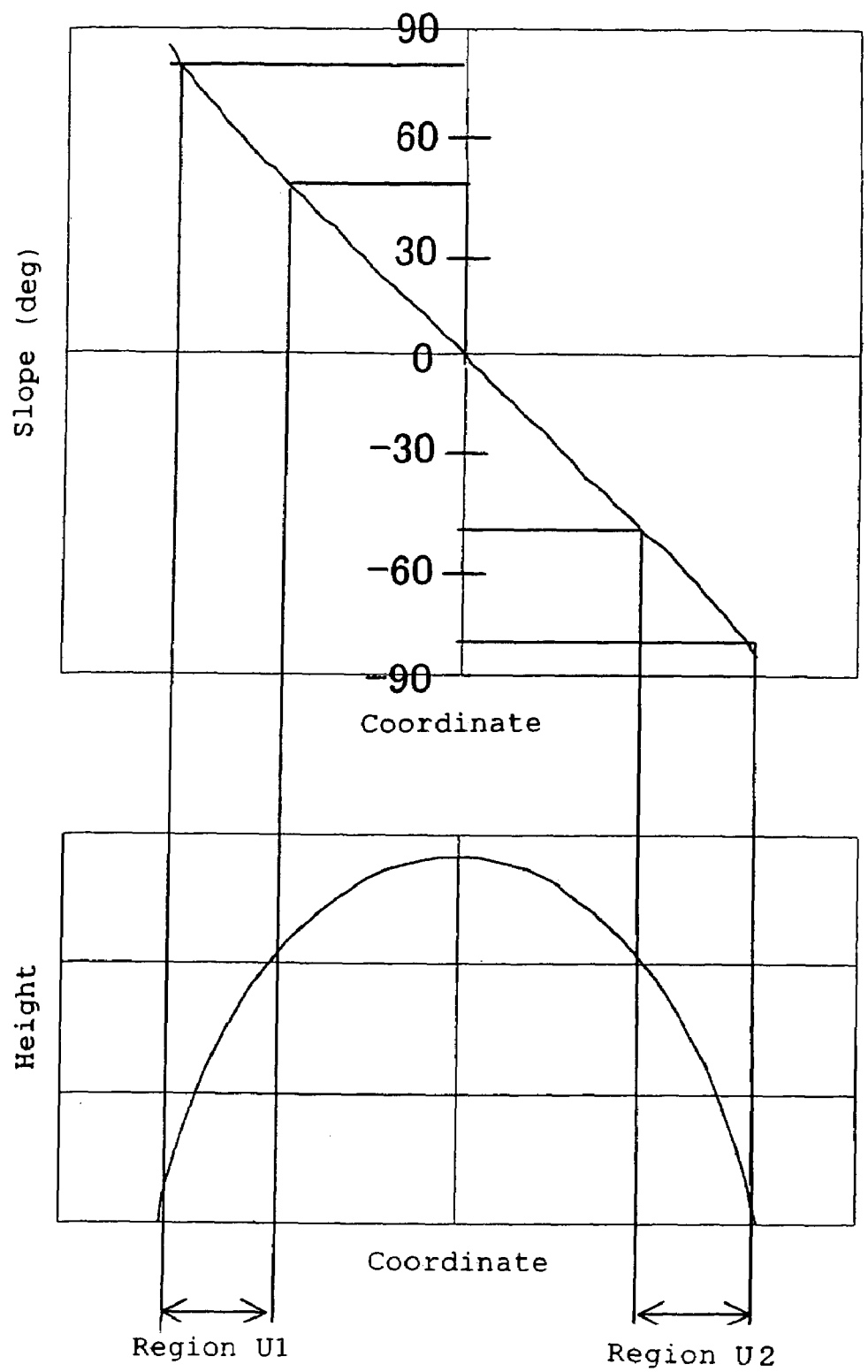
FIG. 28 is an explanatory view representing the relationship between the border line perpendicular to the exit plane and cut along a predetermined one direction including the top, and the slope of each point on the border line in the convex structures of the first example of the embodiment 1 of the light control member used for the present invention.

FIG. 28 is an explanatory view representing the relationship between the border line perpendicular to the exit plane and cut along a predetermined one direction including the top, and the slope of each point on the border line. When the range in which the absolute value for the slope of the border line is 50-70 degrees is U, the ratio of the projected area of U onto the light control member to the projected area of one convex structure onto the light control member is within 0.2-0.8. If the ratio of the projected area of U onto the light control member to the projected area of one convex structure onto the light control member is less than 0.2, the ratio of the light exiting to the front direction among an oblique incident light 12 is decreased so that the uniformity within the exit plane is reduced. Alternatively, if the ratio of the projected area of U onto the light control member to the projected area of one convex structure onto the light control member is more than 0.8, the effect of diffusing light is decreased so that the uniformity of luminance is reduced.

Where, the ratio of the projected area of the region U onto the light control member is preferably within 0.4-0.75 in view of the uniformity of the luminance within the exit plane. Further preferably it is within 0.5-0.7. The predetermined direction means a direction to which the cross-section can most effectively control the light and a direction in parallel with the direction from light source X1 to the light source Y1.

Figure 29:
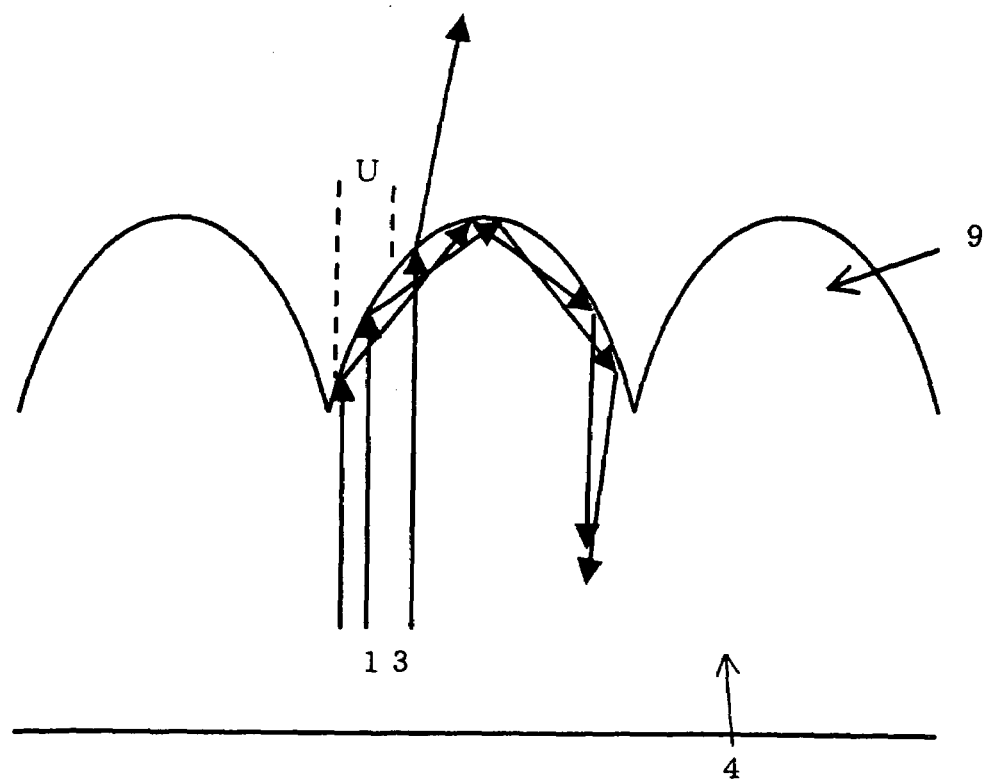
FIG. 29 is a schematic view representing a trajectory of the light vertically incident on the light control member used for the present invention in the first example of the embodiment 1.

A light 13 vertically incident on the light control member 4 is diffused in the outgoing direction around the top out of the region U of the convex structure in which the absolute of the slope is small, also diffused in the outgoing direction on the surface in the region U, but the light incident on the surface around the bottom of the convex structure in the region U is totally reflected and does not exit so that the total light transmittance of the light can be reduced as FIG. 29. The total light transmittance of the light 13 vertically incident on the light control member 4 is reduced thereby the lighting system having excellent luminance uniformity and high luminance can be easily obtained.

In order not to exit the light vertically incident on the region U of the light control member 4 by totally reflecting, the region U is positioned not at least around the top of the convex structure 9 but around the bottom, and preferably, the absolute value for the slope around the top is smaller than that in the region U.

However, when the adjacent convex structures are contacted each other at the bottom and the edge of the bottom is in the region U, the die for shaping should be sharp convexity thereby to tend to distort the shape due to the distortion of the convexity of the die. Thus the absolute value for the slope within the narrow region in the valley portion of the convex structure 9 is preferably set to a small value thereby to prevent the above-described shape distortion.

Incidentally, the light is totally reflected in the region in which the absolute value of the convex structure is more than 70 degrees in the same way (not shown in the figure), however reflection angle in the vertical direction is less than 40 degrees so that the light mostly exits from the exit plane. Therefore, it is difficult to reduce the total light transmittance.

Figure 30:
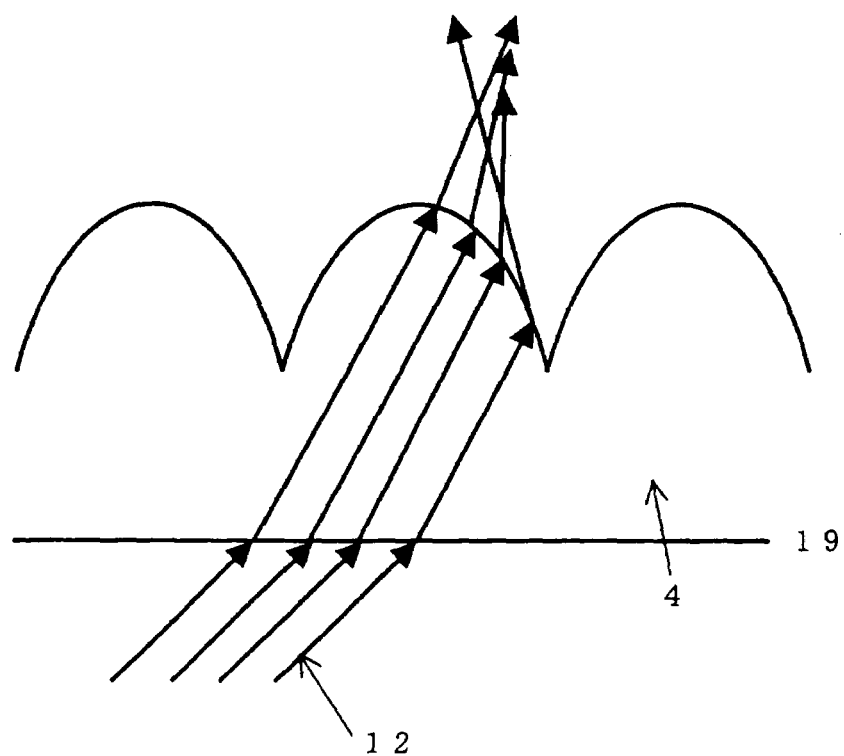
FIG. 30 is a schematic view representing a trajectory of the light obliquely incident on the light control member used for the present invention in the first example of the embodiment 1.

The oblique incident light 12 obliquely incident on an incident plane 19 of the light control member 4 can be exited from the exit plane of the light control member 4 to approximately vertical direction (same direction as the approximately vertical direction of the incident plane 19) by refracting as FIG. 30.

If the slope of the tangent line of the convex structure to the incident plane 19 of the light control member 4 is an angle γ, it can be expressed by the following formula.

$$\gamma = (\pi - \theta)/2 \text{ (radian)}$$

Where, if the incident angle with the light control member 4 is $\phi 1$ and the refractive index of the light control member 4 is n, an angle $\phi 5$ of the light transmitted from a point on one of the convex structure 9 with the normal direction of light control member 4 is derived from the following formula.

$$\phi 2 = \mathrm{Sin}^{-1}\{(\sin \phi 1)/n\}$$

$$\phi 3 = \gamma - \phi 2$$

$$\phi 4 = \mathrm{Sin}^{-1}(n \times \sin \phi 3)$$

$$\phi 5 = \phi 4 - \gamma$$

Where, $\phi 4 \leq 90$ degrees and $0 \leq \gamma$, so that $$0 \leq \gamma \leq \mathrm{Sin}^{-1}(1/n) + \mathrm{Sin}^{-1}\{(\sin \phi 1)/n\}$$

If the distance between the light sources D is 33 mm and the shortest distance H from the center of the light source to the light control member 4 is 15 mm, since $\phi 1$ (=α) is approximately 48 degrees at the center position between the light source, 0 degree $\leq \gamma \leq 69$ degrees if the refractive index n of the light control member 4 is 1.54. That is to say, if γ is more than 69 degrees, the incident light passes through the light control member and then is incident on the incident plane at an angle more than the critical angle thereby to totally reflect and obliquely exit.

In view of the object of the present invention, the outgoing direction of the light is preferably the front direction of the light control member 4 as much as possible. Accordingly, when $\phi 1 = \alpha$, it is preferably $-15$ degrees $\leq \phi 5 \leq 15$ degrees. Further it is preferably $-10$ degrees $\leq \phi 5 \leq 10$ degrees. Further, it is excellently preferable that γ is selected such that $-5$ degrees $\leq \phi 5 \leq 5$ degrees. Additionally, in view of the luminance uniformity, it is preferable that the light incident on the region where γ is selected such that −15 degrees≦φ5≦15 degrees is within 10-15% of the total incident light.

When the distance between the light sources D is 33 mm and the shortest distance H from the center of the light source to the light control member 4 is 15 mm and the refractive index n of the light control member 4 is 1.54 as well as described above, preferred range of γ is 51 degrees≦γ≦69 degrees (42 degrees ≦θ≦78 degrees), more preferred range of γ is 57 degrees≦γ≦68 degrees (44 degrees≦θ≦66 degrees) and further preferred range of γ is 62 degrees≦γ≦67 degrees (46 degrees≦θ≦56 degrees).

Based on the relationship between the incident angle φ1, the absolute value of the slope of the convex structure γ, and the outgoing angle φ5, the light refracting on the slope of the region U and exiting among the light incident on the point opposite to the portion between the light sources of the light control member exits around the front in the preferred lighting system according to the present invention. Additionally, when the oblique incident light refracts the slope other than the region U, the light exits obliquely to the normal direction of the light control member. In order to prevent the outgoing light from reentering in the adjacent convex structures and returning to the light source, it is effective to position the center of the region U on the outside of the center of the convex structure.

The symmetrically distributed light is incident on the position corresponding to the position between the sources as FIG. 4. Accordingly, the cross-section of the convex structures is shaped in symmetric so that the outgoing light is distributed symmetrically to the vertical direction of the light control member.

Figure 7:
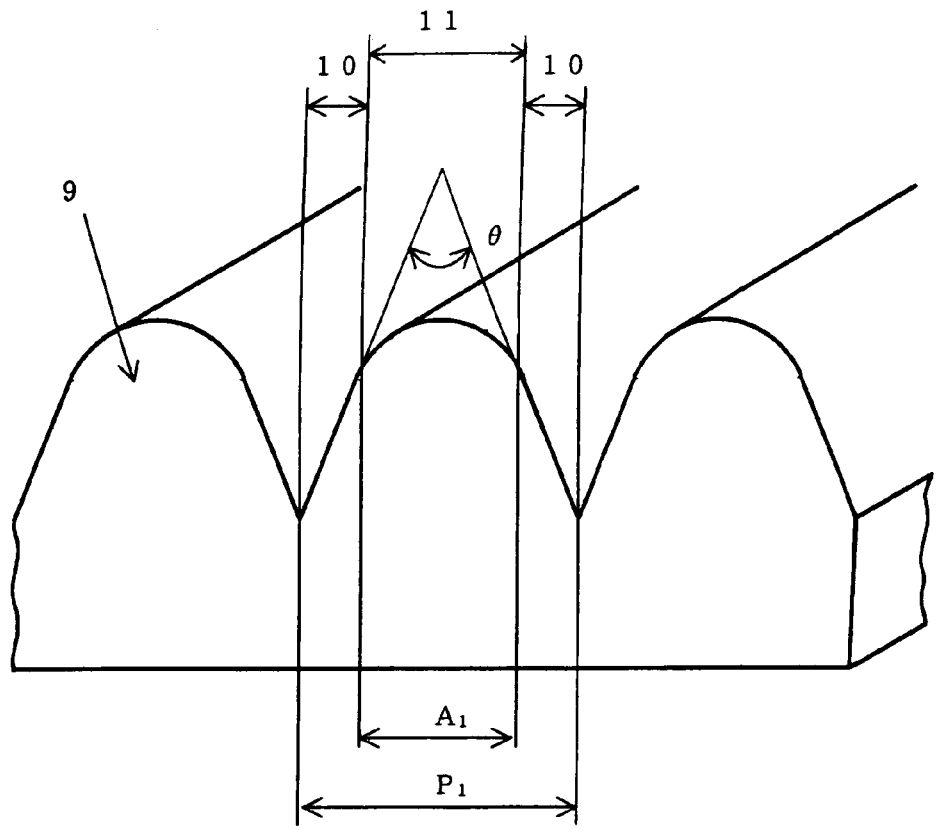
FIG. 7 is a schematic view representing the cross-section of the convex structures on the exit plane of the light control member used for the present invention.

A preferred example of the cross-section of the convex structure 9 in striped pattern is represented in FIG. 7. The three-dimensional configuration of the convex structures 9 is composed of two approximately slopes with an acute angle θ (corresponding to cross-sectional approximately straight line 10) and a curved surface portion (corresponding to cross-sectional curve 11). Since the degree of condensing and diffusing on the exit plane is different between the approximately straight line portion and the curve portion, the condensing efficiency and the diffusing efficiency on the exit plane are further improved so that the luminance within the exit plane can be more effectively uniformalized.

Figure 8:
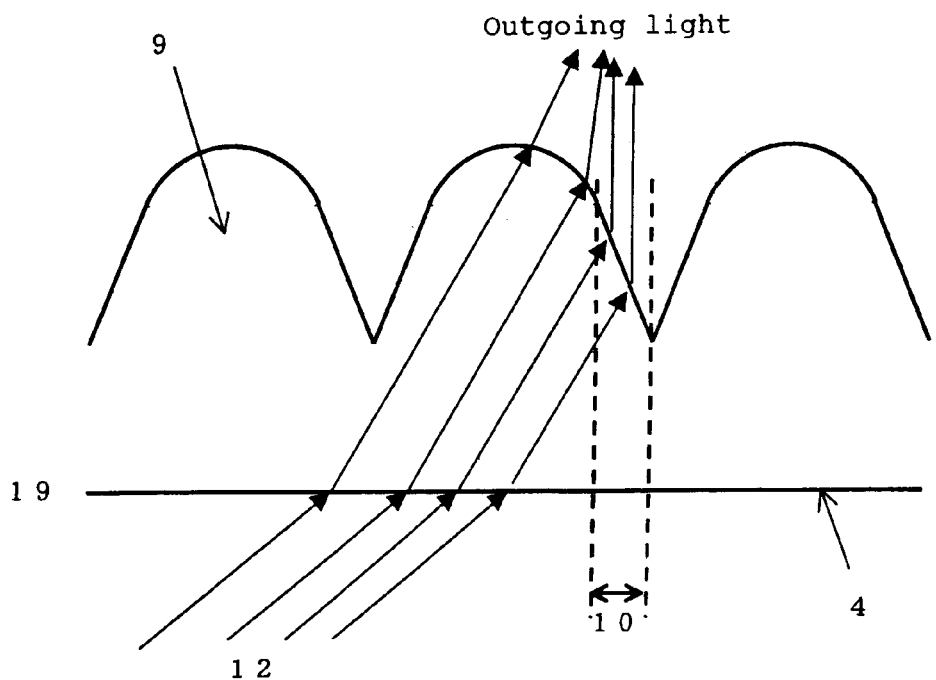
FIG. 8 is a schematic view representing the advancing state of the light obliquely incident on the light control member according to the present invention.
Figure 9:
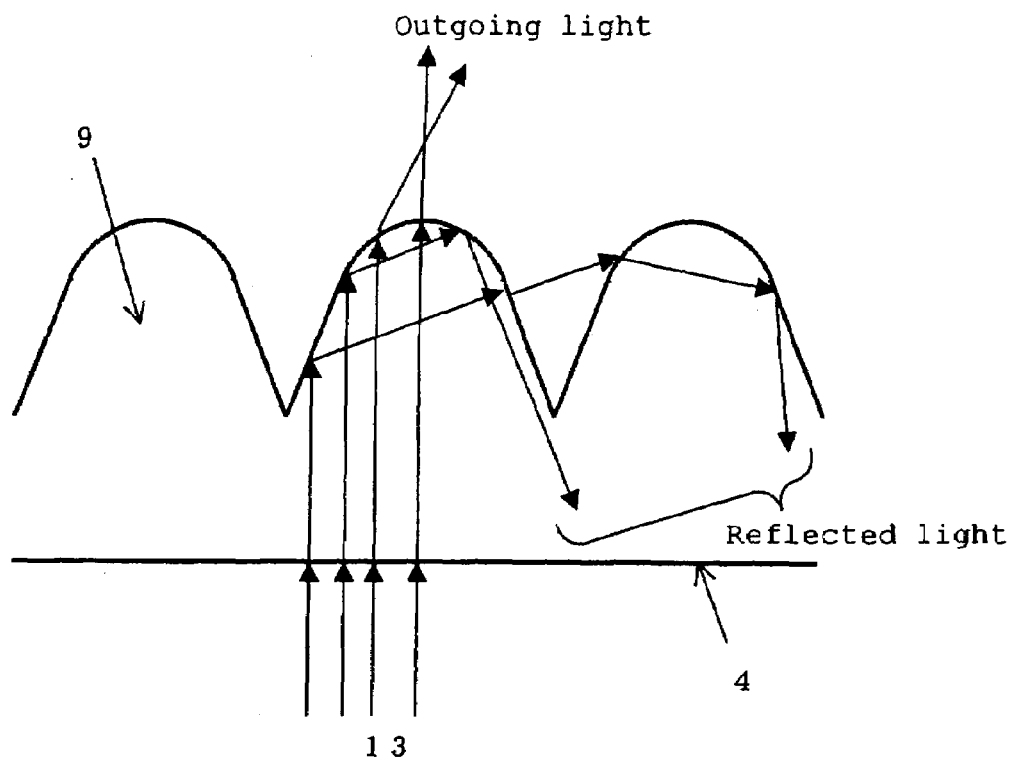
FIG. 9 is a schematic view representing the advancing state of the light vertically incident on the light control member according to the present invention.
Figure 10:
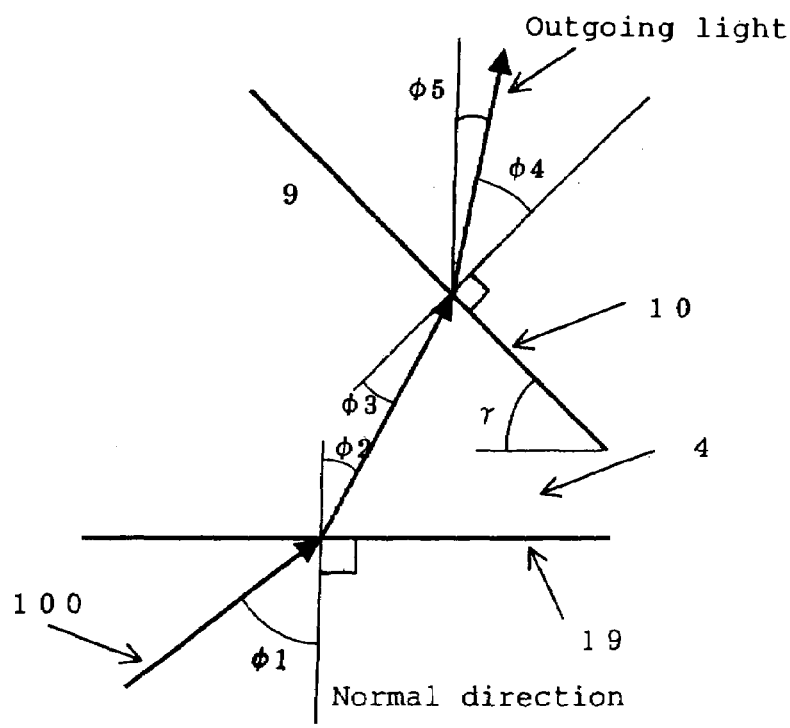
FIG. 10 is a schematic view representing the relationship between the optical path and the angle of the light refracting on the convex structure of the exit plane and exiting in the light control member according to the present invention.

The light coming from the same direction and incident on the approximately straight line portion 10 is refracted or reflected in the same direction as FIGS. 8 and 9. Therefore, the outgoing direction can be easily controlled and it is facilitate the optical design to obtain the desirable luminance angle distribution. The oblique incident light 12 obliquely incident on an incident plane 19 of the light control member 4 can be exited from the exit plane of the light control member 4 to approximately vertical direction (same direction as the approximately vertical direction of the incident plane 19) by refracting in the cross-sectional approximately straight line 10 as FIG. 8. Incidentally, the radius of curvature forming the top of the border line may be infinity, i.e. a straight line.

The shape of the convex structures 9 may be approximately cone or pyramid form including the two cross-sectional approximately straight line 10 and the cross-sectional curve 11 in the omnidirection.

Figure 11:
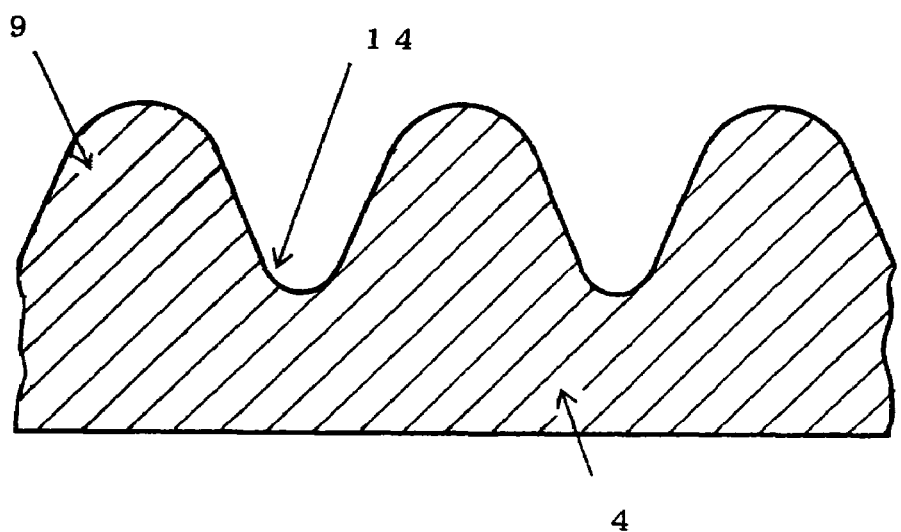
FIG. 11 is an explanatory view of an example of the cross-section of the light control member used for the present invention.

Another shape of the convex structures 9 applicable to the present invention is represented in FIG. 11. Where, a valley portion 14 is provided on the valley of the convex structures 9. The outgoing direction of the light is diffused into multidirectional course by the cross-sectional curve 14 thereby the lighting system in which the luminance uniformity is improved can be obtained. Additionally, means for polarizing parallel light on the incident plane of the light control member 4 into a plurality of angles may be used in order to propagate the light in various directions in the light control member 4 to improve diffusion effect. Specifically, a random or periodic convexoconcave structure is formed on the incident plane of the light control member 4.

Additionally, since the front edge of the convexity of the die for shaping is curved obtuse by the valley portion 14, it is unlikely to distort the shape due to the distortion of the convexity of the die in comparison with the sharp shape. Incidentally, the radius of curvature of the curve forming the top of the border line may be infinity. Where, the curve forming the top becomes a straight line.

If the light source is a linear light source, a striped lens in which a plurality of convex structures 9 on the exit plane are arranged in parallel is formed, and the longitudinal direction of the lens can be in parallel with the longitudinal direction of the linear light source. Thereby the angle distribution of the outgoing light on the exit plane of the light control member 4 is further easily adjusted.

Figure 12:
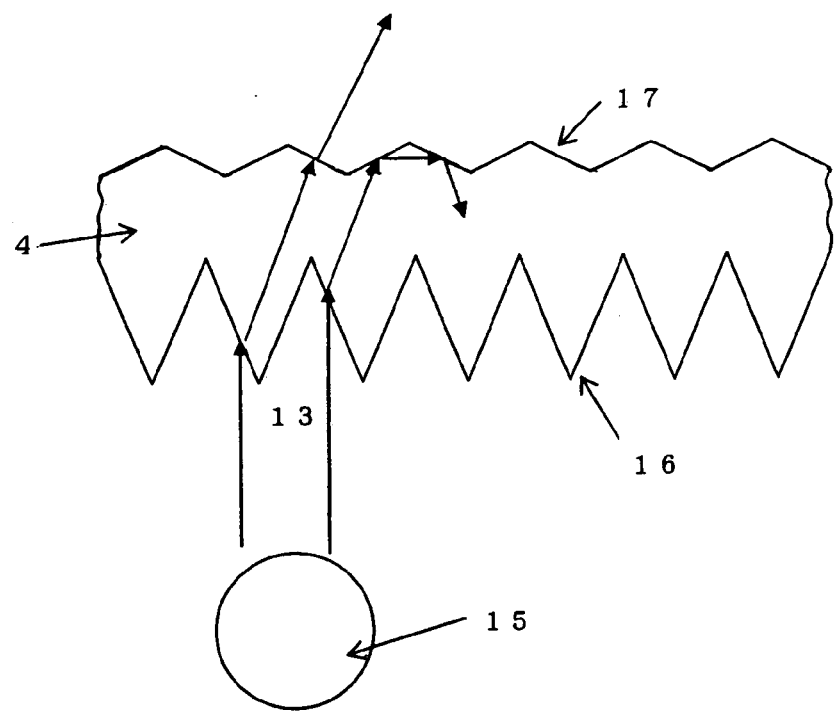
FIG. 12 is an explanatory view of another example of the cross-section of the light control member used for the present invention.

Next, another constitutional example of the light control member 4 involving means for adjusting the total light transmittance is represented in FIG. 12. In the direct type lighting system comprising a plurality of linear light sources 15, a reflector to reflect the light from the linear light sources 15 (not shown in the figure) and a light control member 4 to diffuse and transmit the light from the linear light sources 15 and the reflector, a plurality of striped prisms 16 are formed on the incident plane opposite to the linear light sources 15 of the light control member 4 in parallel with the longitudinal direction of the linear light sources 15.

In the striped prisms 16, the apex angle on the ridgeline faced on the linear light sources 15 is within 30-60 degrees. Additionally a plurality of convexoconcaves 17 is formed on the exit plane of the light control member 4. The convexoconcaves 17 on the exit plane are also formed of stripe. The longitudinal direction of the striped convexoconcaves 17 is in parallel with the longitudinal direction of the striped prisms 16 on the incident plane.

A vertical incident light 13 incident on directly above the linear light sources 15 is refracted by the slope of the prisms 16 formed on the incident plane, and then, a part of the light is totally reflected by the convexoconcaves 17 formed on the exit plane as FIG. 12. Thereby the transmittance of the light vertically incident on the light control member 4 is reduced so that the light control member 4 can control the total light transmittance.

Figure 13:
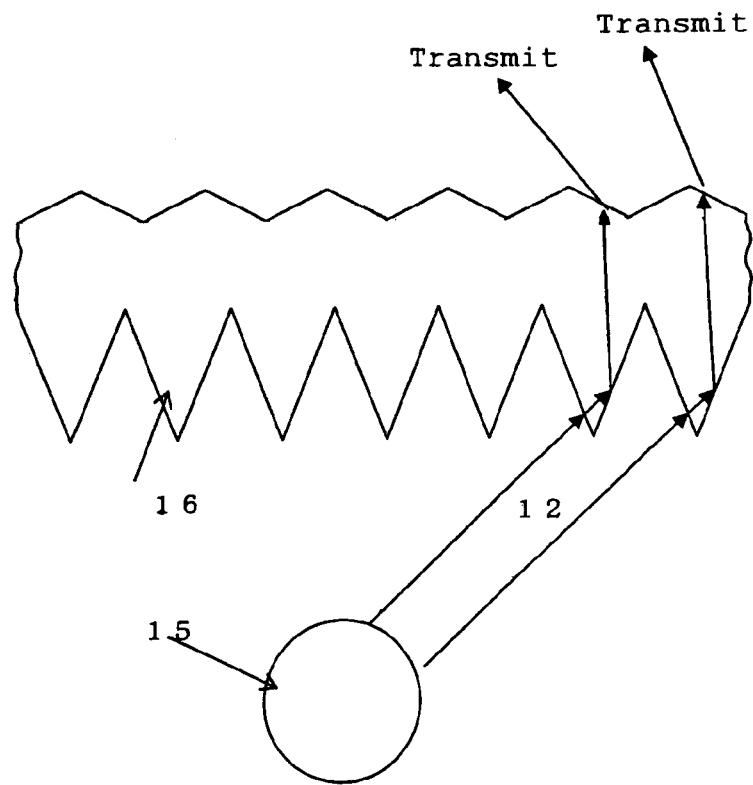
FIG. 13 is a schematic view representing a trajectory of the light obliquely incident on the light control member according to the present invention.

The light incident between the linear light sources 15, i.e. the oblique incident light 12 on the light control member 4 is refracted and totally reflected by the prisms 16 formed on the incident plane and exited to the light control member 4 in approximately front direction as FIG. 13. Thereby the luminance around the front direction between each linear light source 15 can be increased.

Figure 14:
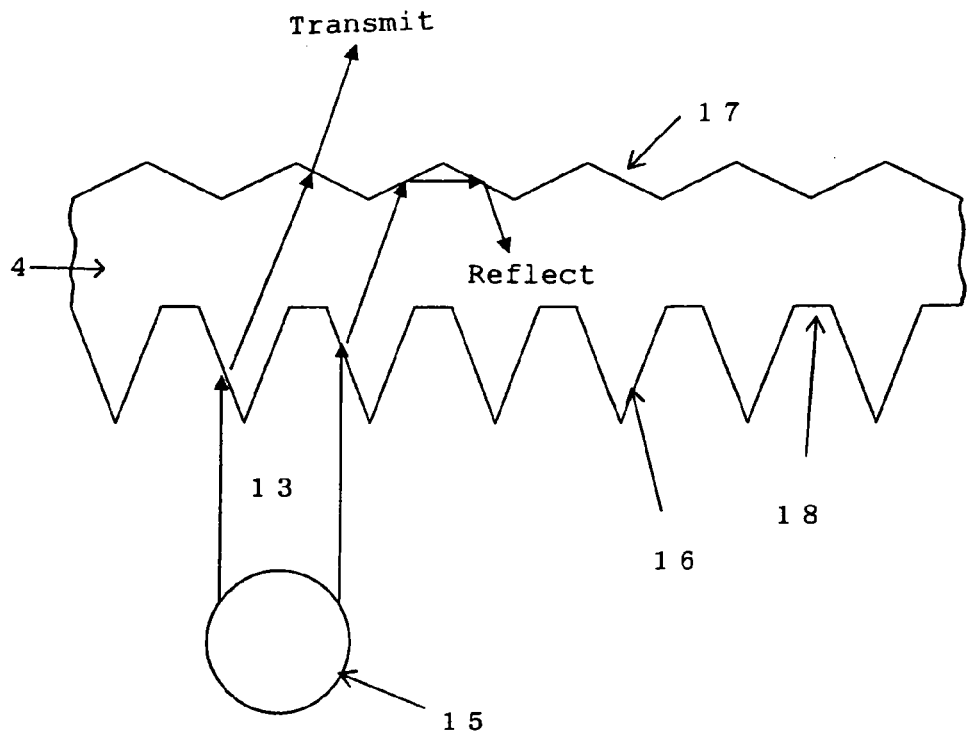
FIG. 14 is an explanatory view of further another example of the cross-section of the light control member used for the present invention.

A constitutional example of further another light control member 4 is represented in FIG. 14. In the light control member 4 to diffuse and transmit the light exited from the plurality of linear light sources 15, a plurality of striped prisms 16 extending in parallel with the longitudinal direction of the linear light sources 15 are formed on the incident plane opposite to the linear light sources 15 of the light control member 4, and additionally, a flat portion 18 having a predetermined length is provided between the plurality of striped prisms 16. A plurality of convexoconcaves on the exit plane 17 extending in parallel with the longitudinal direction of the striped prisms 16 are formed on the exit plane of the light control member 4. The convexoconcaves on the exit plane 17 has the cross-section formed of prism. Thereby the luminance within the exit plane can be uniformalized.

The vertical incident light 13 incident directly above the linear light sources 15 is refracted by the prisms 16 formed on the incident plane, and a part of the light is totally reflected by the convexoconcaves 17 formed on the exit plane as FIG. 14. Thereby the transmittance of the vertical light 13 vertically incident on the light control member 4 can be controlled. Additionally the flat portion 18 formed between the plurality of prisms 16 on the incident plane allows the light control member 4 to easily adjust the light transmittance. The ratio of the flat portion 18 to the whole incident plane is preferably not more than 40%.

Figure 15:
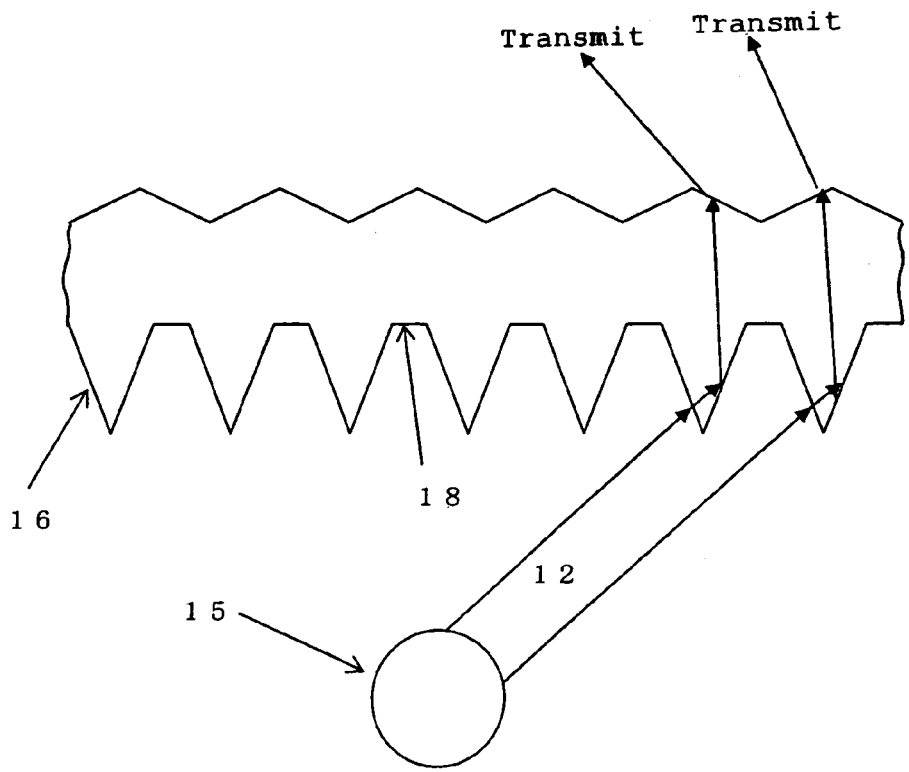
FIG. 15 is a schematic view representing a trajectory of the light obliquely incident on the light control member having a flat portion according to the present invention.

The oblique light 12 incident between the liner light sources 15 is refracted and totally reflected by the prisms 16 formed on the incident plane and exited to approximately front direction as FIG. 15. Thereby the luminance between the linear light sources 15 in the front direction can be increased.

Figure 16:
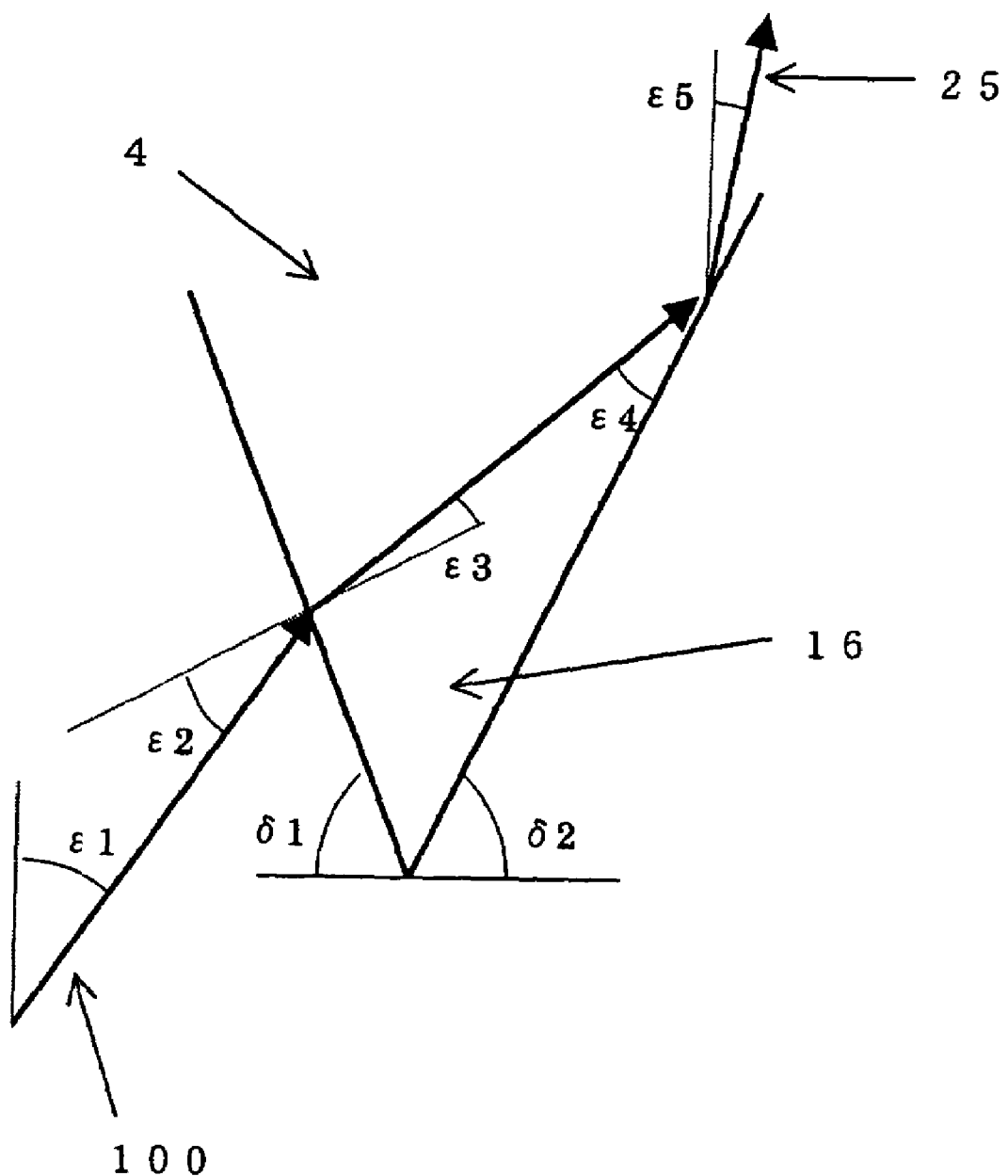
FIG. 16 is a schematic view representing the relationship between the optical path and the angle of the light incident on the prism provided on the incident plane according to the present invention.

The traveling direction of the light when the light is totally reflected within the prisms 16 formed on the incident plane of the light control member 4 is represented in FIG. 16. If the incident angle of an incident light 100 with the normal direction of the incident plane of the light control member 4 is $\epsilon 1$, an angle $\epsilon 5$ of an advancing light 25 with the normal direction within the light control member 4 after being totally reflected by the prism 16 formed on the incident plane can be derived from the following formula:

$\epsilon 2 = \delta 1 - \epsilon 1$ $\epsilon 3 = \sin^{-1}\{(\sin \epsilon 2)/n\}$ $\epsilon 4 = \delta 1 - \epsilon 1 + \delta 2 - 90$ degrees $\epsilon 5 = 90$ degrees $- (\epsilon 4 + \delta 2)$ In view of the object of the present invention, the outgoing direction of the light is preferably the front direction of the light control member 4, i.e. the same direction as the normal direction. Accordingly, the advancing light 25 preferably advances to the normal direction of the exit plane. When $\epsilon 1 = \alpha$, it is preferable that $-20$ degrees $\leq \epsilon 5 \leq 20$ degrees, it is more preferable that $-10$ degrees $\leq \epsilon 5 \leq 10$ degrees and it is further preferable to select $\delta 1$ and $\delta 2$ such that $-5$ degrees $\leq \epsilon 5 \leq 5$ degrees.

When the distance between the light sources D is 33 mm and the spaced distance H from the center of the light source to the light control member 4 is 15 mm and the refractive index n of the light control member 4 is 1.54, it is preferable that 55 degrees $\leq \delta 1 \leq 72$ degrees, it is more preferable that 59 degrees $\leq \delta 167 \leq$ degrees and it is further preferable to select such that 61 degrees $\leq \delta 1 \leq 65$ degrees.

The height or the depth of the convexoconcaves 17 formed on the exit plane is preferably from 1 μm to 1000 μm. If it is more than 1000 μm, the quality is deteriorated because the convexoconcaves is visible. If it is less than 1 μm, the quality is also deteriorated because coloring occurs due to diffraction phenomena of light. Additionally it is more preferable that 10 μm to 500 μm. It is further preferable that 30 μm to 300 μm.

Figure 33:
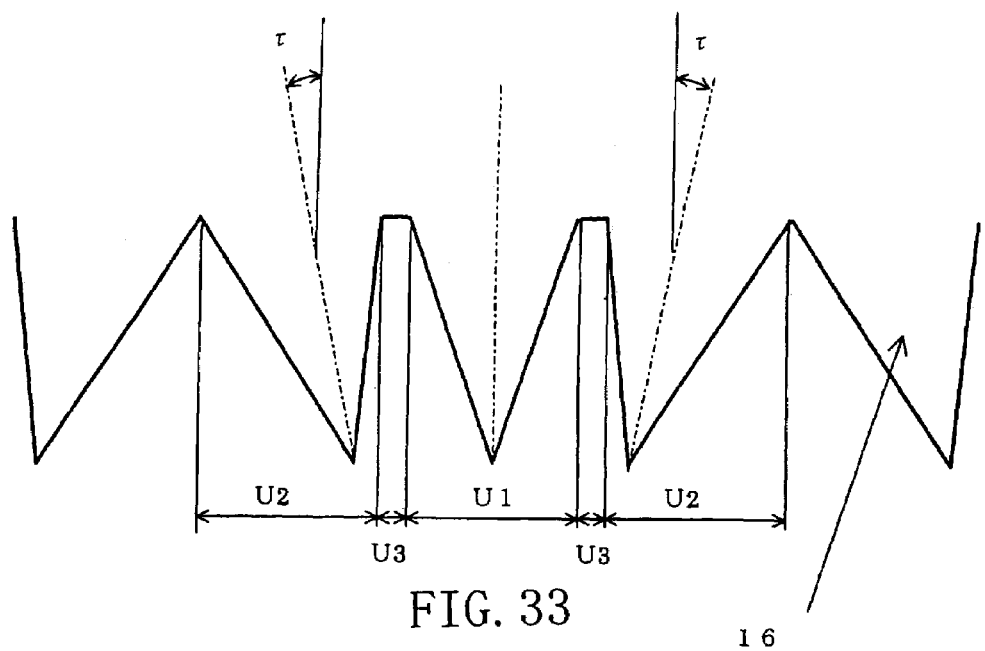
FIG. 33 is an explanatory view of further another example of the cross-section of the light control member used for the present invention.
Figure 34:
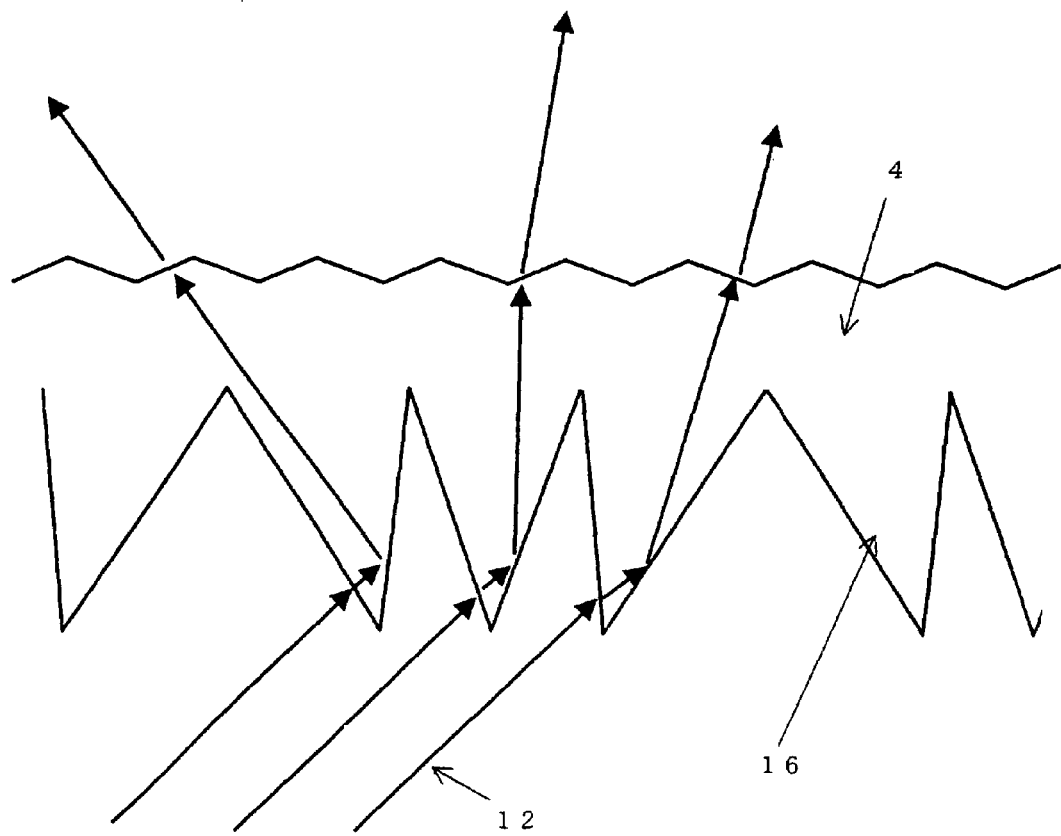
FIG. 34 is a schematic view representing a trajectory of the light obliquely incident on the light control member including the asymmetric prism on the incident plane according to the present invention.

The prisms formed on the incident plane may include a plurality of slopes as FIG. 33. A symmetric incident plane prism region U1, a pair of asymmetric prism U2 linear symmetrical to the center of the U1 and a small gap U3 between the U1 and U2 are provided to facilitate to manufacture a die. The prism group U1 and U2 is composed of more than three set. Those are totally symmetric, preferably. In the light control member 4 as FIG. 34, the incident plane has the shape as FIG. 33. Where, the oblique light 12 from the light sources (not shown in the figure) is more widely diffused and exited so that the lamp image is preferably eliminated.

Forming the surface pattern such as the above-described prism, any of an extrusion molding, an injection molding and a 2P molding using ultraviolet curing resin can be used. The forming method may be selected in consideration of size, shape and productivity for the prism and it is not limited.

In another constitutional example of the light control member 4 involving means for adjusting the total light transmittance, at least one thin layer having the thickness of not more than 1 μm and the refractive index less than that of the base material of the light control member 4 is provided on at least one of the incident plane and the exit plane of the light control member 4. Thereby the total light transmittance is reduced when the light is vertically incident on the light control member 4 and the total light transmittance is increased when the light is obliquely incident on the same due to interferential action of light.

Incidentally, providing a transmissive display device on the lighting system of the present invention, the image display apparatus in which the luminance on the screen is excellently uniformalized can be easily obtained.

Figure 27:
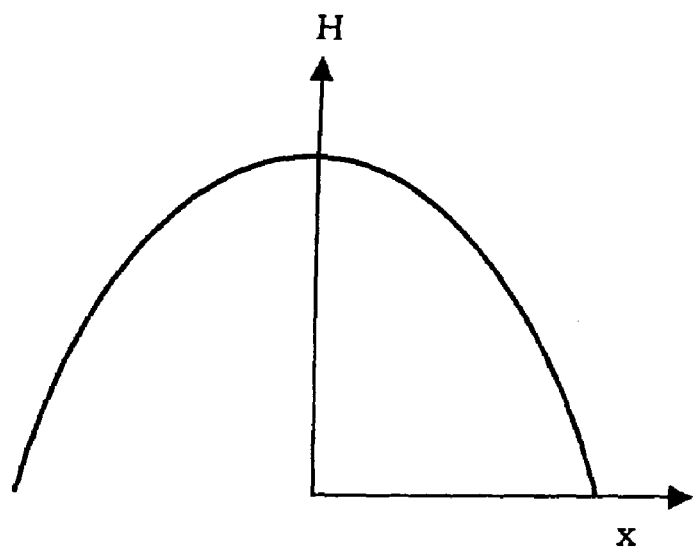
FIG. 27 is an explanatory view representing the cross-section of the convex structure of the light control member in the first example of the embodiment 1 used for the present invention.

A first example of the present embodiment is represented in FIG. 27.

$$H(x) = 0.139 - \frac{cx^2}{1 + \sqrt{1 - (k+1)c^2 x^2}} \qquad \text{[Formula 1]}$$

Where, c=8.33 k=−0.44

In the present embodiment, a female die having the striped grooves expressed by the above-described formula are manufactured by cutting work. Where, x is the distance from the center of a unit shape. k is elliptical shape. The width of one groove is 0.3 mm. That is to say, $-0.15 \leq x \leq 0.15$ (mm).

Next, a convex shape is formed on the surface of a polycarbonate film with ultraviolet curing resin by the die. The surface on which the prism made of the polycarbonate film is not formed is bonded to a transparent acrylic board having the thickness of 2 mm to obtain a light control member. Cold fluorescent lamps disposed at intervals of 30 mm as the linear light sources. The acrylic board is disposed at a distance of 18 mm from the cold fluorescent lamps such that the surface including the convex structure of the acrylic board is an exit plane. Where, $\alpha$=40 degrees. A reflecting sheet is provided on one side of the cold fluorescent lamps opposite to the acrylic board.

As the result of the observation in the above-described state, the lighting system in which the lamp image is eliminated and the luminance within the exit plane is uniformalized can be obtained. When light is incident on the above-described incident light control member at an angle 40 degrees with the normal direction of the incident plane, the transmittance is 66%. When light is incident to the normal direction, the transmittance is 52%. The ratio between the former transmittance and the latter transmittance is 1.27.

A second example of the present embodiment will be described in detail. Firstly, a female die having striped grooves in which an angle θ formed by extension lines of two approximately straight lines 10=50 degrees, P1=260 μm and A1=182 μm of FIG. 7 is manufactured by cutting work.

Next, a convex shaped prism is formed on the surface of a polycarbonate film with ultraviolet curing resin by the female die. The surface on which the prism made of the polycarbonate film is not formed is bonded to a transparent acrylic board having the thickness of 2 mm to obtain a light control member including the convex shaped prism.

Next, a plurality of linear light sources is disposed between the light control member and the reflector. Where, a plurality of cold fluorescent lamps is disposed at intervals of 33 mm as the linear light sources. The acrylic board is disposed at the position at a distance of 15 mm from the cold fluorescent lamps such that the surface including the convex structure of the acrylic board is an exit plane. Where, $\alpha$=48 degrees. A reflecting sheet is provided on one side of the cold fluorescent lamps opposite to the acrylic board.

In the above-described state, the cold fluorescent lamps are lighted to emit the light control member by light and the light control member is observed. As the result of the observation, the lighting system in which the lamp image is eliminated and the luminance within the exit plane is uniformalized can be obtained. When light is incident on the incident plane of the above-described light control member at an angle 48 degrees with the normal direction of the incident plane, the total light transmittance R1 is 75%. When light is incident to the normal direction, the total light transmittance R2 is 51%. The ratio of those total light transmittance R1/R2 is 1.47.

Figure 24:
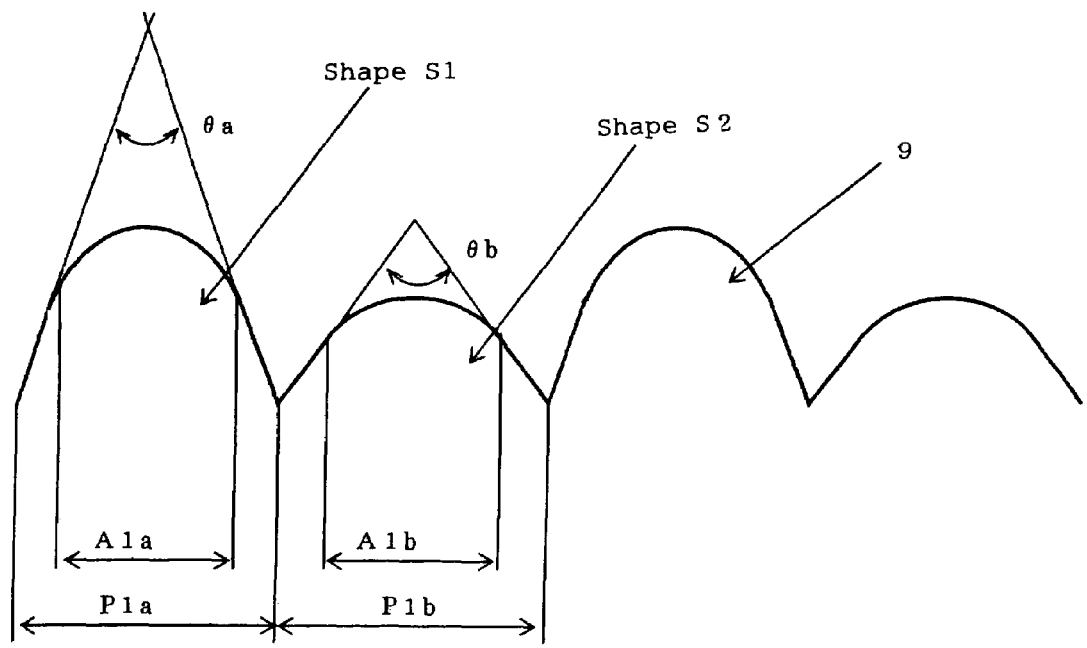
FIG. 24 is an explanatory view of the third embodiment of the light control member used for the present invention.
Figure 25:
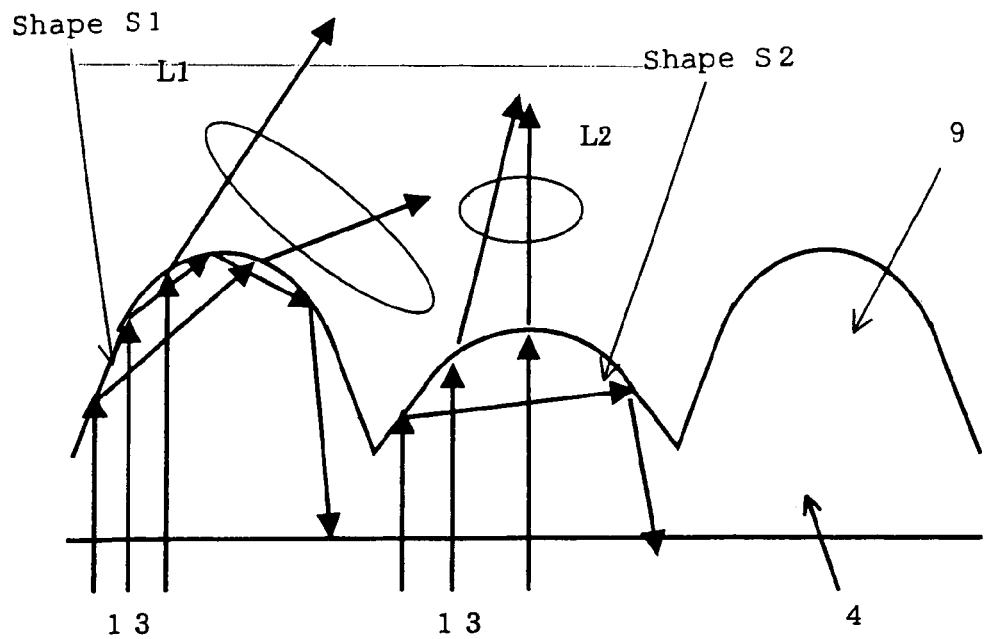
FIG. 25 is a schematic view representing a trajectory of the light vertically incident on the light control member having a plurality of cylindrical convex structures according to the present invention.
Figure 26:
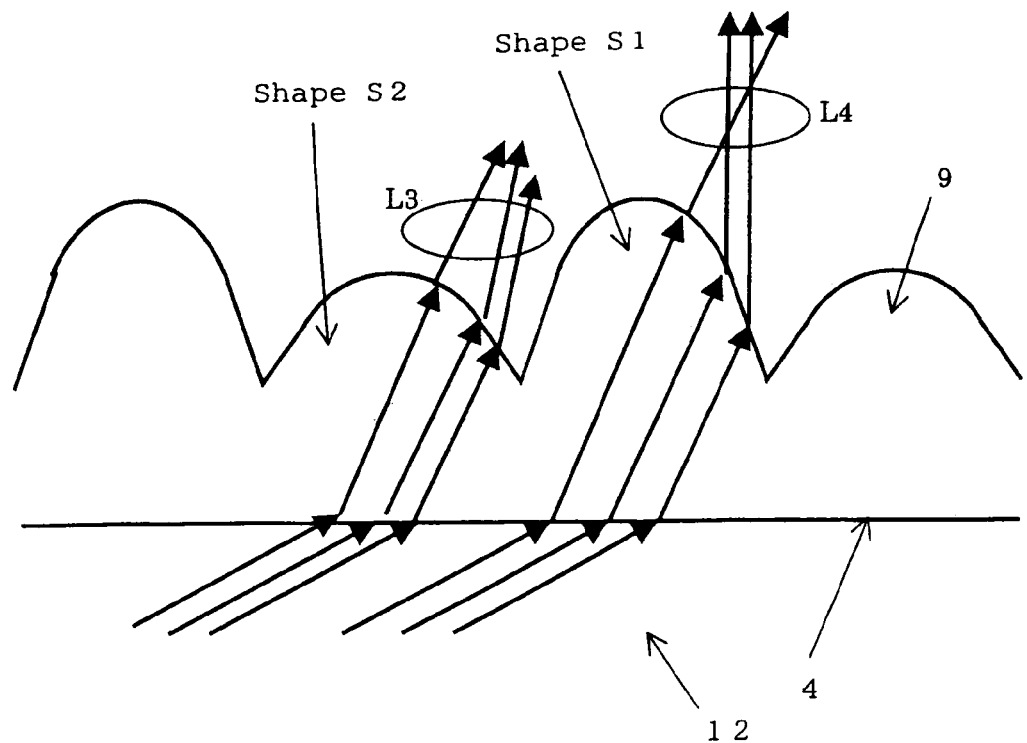
FIG. 26 is a schematic view representing a trajectory of the light obliquely incident on the light control member having a plurality of cylindrical convex structures according to the present invention.

A third example of the present embodiment is represented in FIG. 24. In the present embodiment, a female die having striped grooves S1 in which an angle $\theta$a formed by two approximately straight lines=40 degrees, P1$a$=0.113 mm and A1$a$=0.045 mm and S2 in which $\theta$b=70 degrees, P1$b$=0.113 mm and A1$b$=0.045 mm is manufactured by cutting work. Next, a convex shape is formed on the surface of a polycarbonate film with ultraviolet curing resin by the die. The surface on which the prism made of the polycarbonate film is not formed is bonded to a transparent acrylic board having the thickness of 2 mm to obtain a light control member. Cold fluorescent lamps are disposed at intervals of 33 mm as the linear light sources. The acrylic board is disposed at a distance of 16.5 mm from the cold fluorescent lamps such that the surface including the convex structure of the acrylic board is an exit plane. Where, $\alpha$=45 degrees. A reflecting sheet is provided on one side of the cold fluorescent lamps opposite to the acrylic board.

As the result of the observation in the above-described state, the lighting system in which the lamp image is eliminated and the luminance within the exit plane is uniformalized can be obtained. When light is incident on the above-described incident light control member at an angle $\alpha$=45 degrees with the normal direction of the incident plane, the transmittance is 76%. When light is incident to the normal direction, the transmittance is 52%. The ratio between the former transmittance and the latter transmittance is 1.46.

As thus described above, providing two types of striped convex structures, the vertical incident light 13 on the light control member has different outgoing light properties L1 and L2 between the shape S1 and S2. The oblique incident light 12 also has outgoing light properties L3 and L4 corresponding to L1 and L2. Thus the outgoing light direction can be diffused so that the ununifomity of luminance within the plane can be effectively reduced. In other words, the degree of freedom of setting shape when the outgoing light is controlled is increased for each kind of the striped convex structure thereby the property of the outgoing light is more effectively controlled. Incidentally, the striped convex structure is not limited to two types, of course three or more types may be applied.

Next, a forth example of the present embodiment will described in detail. Firstly, in order to mold a prism plane composed of a prism portion having an apex angle 40 degrees and flat portions disposed equally between each prism portion by a ratio of 30% to the whole plane and a convexoconcave portion formed of prism having an apex angle 140 degrees, respectively, a die having a plurality of grooves corresponding to each prism shape is manufactured by cutting work. Where, the plurality of grooves provided at intervals of 50 µm. The surface shape of the die manufactured by cutting work is formed of symmetry corresponding to the prism shape. The depth of the symmetric grooves is fixed in the plane.

A polycarbonate film is set in the die and ultraviolet curing resin is poured thereto so that prism shaped portions corresponding to each prism shape are formed one side of the polycarbonate film. Each surface on which the prism shaped portions made of the polycarbonate film are not formed is bonded to a transparent acrylic board having the thickness of 2 mm, respectively. Where, the surface and the polycarbonate film are bonded such that a ridgeline of the prism portion of the entrance side having an apex angle 40 degrees is in parallel with ridgeline of the convexoconcave surface of the exit plane side having an apex angle 140 degree. Thereby a light control member that the convexoconcave portions are formed on the both sides can be obtained.

Next, a plurality of cold fluorescent lamps are disposed at intervals of 33 mm as the linear light sources. The light control member is disposed at the position at a distance of 16.5 mm from the cold fluorescent lamps such that the prism portion of the control member is in parallel with the longitudinal direction of the cold fluorescent lamps and the convexoconcave surface is an exit plane side of the light control member. Where, $\alpha$=45 degrees. A reflecting sheet is provided on one side of the cold fluorescent lamps opposite to the acrylic board.

In the above-described state, the cold fluorescent lamps are lighted to emit the light control member by light and the light control member is observed. As the result of the observation, the lighting system in which the lamp image is eliminated and the luminance within the exit plane is uniformalized can be obtained. When light is incident on the incident plane of the above-described light control member at an angle 45 degrees with the normal direction of the incident plane, the total light transmittance R1 is 79%. When light is incident to the normal direction, the total light transmittance R2 is 66%. The ratio of those total light transmittance R1/R2 is 1.19.

Next, in order to compare the luminance uniformity between when the light control member according to the present invention is applied to the lighting system and when the conventional light diffusion plate containing fine particles is applied, a test was conducted. Firstly, an aperture 20$a$ having the width B is formed on a light diffusion plate 20 containing fine particles in which the prism shaped portion is not formed. Next, cold fluorescent lamps as linear light sources 15 are provided between the fine particles-containing light diffusion plate 20 and a reflector 2 and lighted. Where, anything is not disposed in the aperture 20$a$ of the light diffusion plate 20.

Figure 17A:
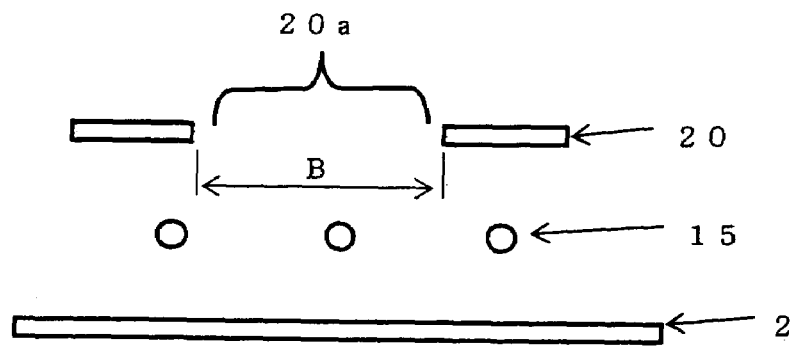
FIG. 17 is an explanatory view representing the configuration of the evaluation of another embodiment according to the present invention and the result thereof.
Figure 17B:
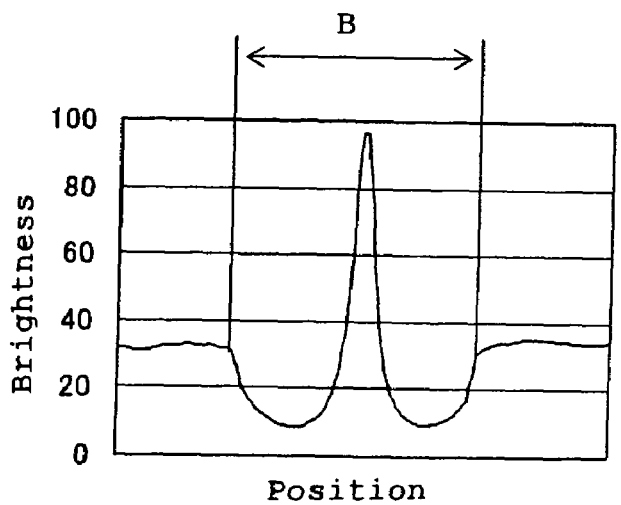

While the cold fluorescent lamps are lighted, the brightness of the light diffusion plate 20 is measured from the front direction. The measured result is represented in FIG. 17($b$). Where, the luminance directly above the cold fluorescent lamp is increased and the luminance between adjacent cold fluorescent lamps (obliquely above region) is decreased. Thereby the luminance difference between the region directly above the cold fluorescent lamp and the region obliquely above the cold fluorescent lamp is wide so that the quality such as the luminance uniformity within the screen is significantly reduced.

Next, an acrylic board that a polycarbonate film is bonded on the both side, i.e. the light control member 4 on which the prism portion of the incident plane and the convexoconcave of exit plane are formed is cut off corresponding to the size of the aperture 20a and the cut portion is installed in the aperture 20a. Where the surface of the prism portion on the incident plane of the light control member 4 is faced to the cold fluorescent lamps and the ridgeline direction of the prism portion on the incident plane is matched with the longitudinal direction of the cold fluorescent lamps.

Figure 17C:
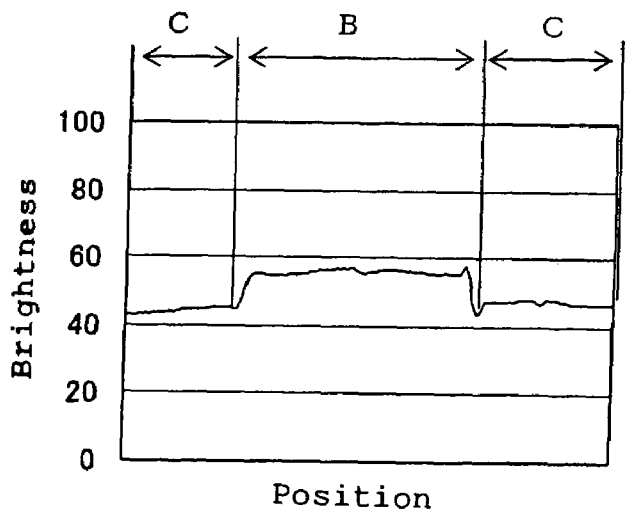

Next, a diffusion sheet is overlaid on the light control member 4. Then, while the cold fluorescent lamps 15 are lighted, the brightness on the surface of the diffusion sheet is measured from the front direction. The measured result is represented in FIG. 17(c). Where, when the light control member 4 on which the prism portion on the incident plane is formed is used, the image of the linear light sources 15 is eliminated, and approximately same luminance between the portion directly above the linear light sources 15 and the portion between the plurality of linear light sources 15 can be obtained.

Comparing between the brightness of range B corresponding to the light control member 4 and the brightness of range C corresponding to the fine particles-containing light diffusion plate 20 in FIG. 17 (c), the brightness of the range B is more than that of the range C by 10%. That is to say, when the light control member 4 according to the present invention is used, the lighting system can be brighter than when the conventional fine particle-containing light diffusion plate 20 is used.

Attempting to obtain the same level luminance as the luminance of the light control member 4 using the fine particles-containing light diffusion plate 20, the luminance directly above the cold fluorescent lamp is increased and the luminance between the plurality of cold fluorescent lamps are decreased. Therefore, it is difficult for the fine particles-containing light diffusion plate 20 to obtain the same level luminance as the luminance of the light control member 4.

Figure 18:
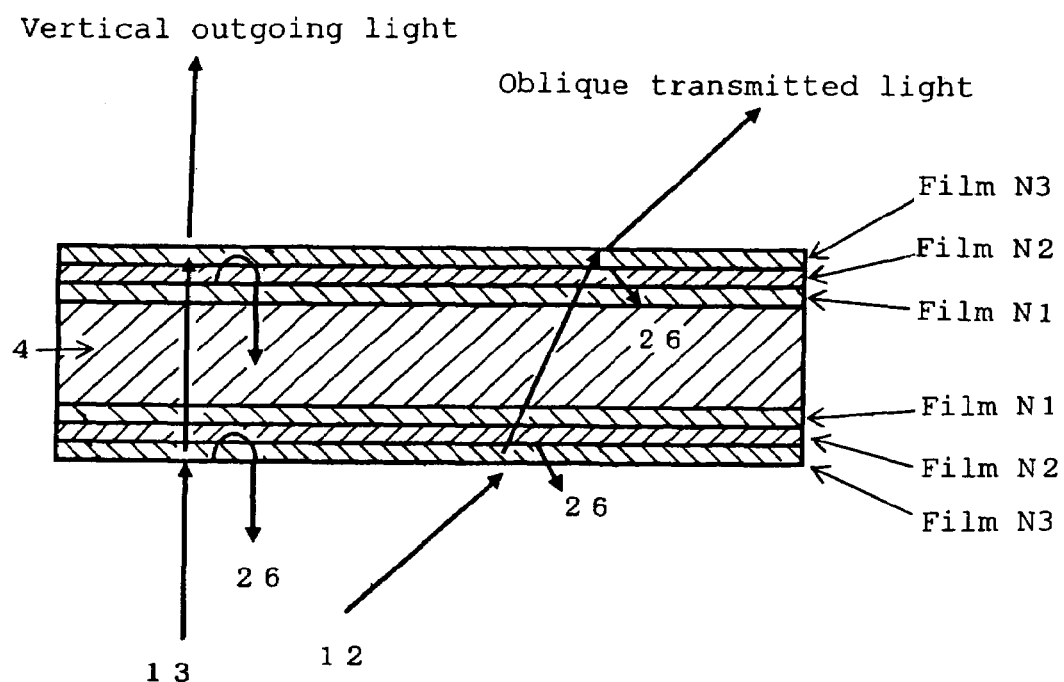
FIG. 18 is an explanatory view representing a further another embodiment of the present invention that the light control member according to the present invention includes the thin film formed thereon.

A fifth example of the present embodiment is represented in FIG. 18. In the present embodiment, a transparent thin film N1, N2 and N3 having each refractive index 1.48, 1.62 and 1.38 are laminated on an entrance/exit plane of the base material having the thickness of 2 mm and consisting of methyl methacrylate-styrene copolymer in the thickness of 0.1 μm, 0.078 μm, and 0.179 μm, respectively to form the light control member 4. Incidentally, 26 is a reflected light.

A plurality of cold fluorescent lamps are used as the linear light sources to emit light. Where, the plurality of cold fluorescent lamps are disposed at intervals of 33 mm. The light control member 4 is disposed at a distance of 16.5 mm from the cold fluorescent lamps. Where, an angle α=45 degrees. A reflecting sheet is provided on one side of the cold fluorescent lamps opposite to the acrylic board.

In the above-described state, the cold fluorescent lamps are lighted to emit the light control member 4 by light and the light control member 4 is observed. As the result of the observation, the lighting system in which the lamp image is eliminated and the luminance within the exit plane is uniformalized can be obtained. When light is incident on the above-described light control member at an incident angle 45 degrees with the normal direction of the incident plane, the total light transmittance R1 is 90%. When light is incident to the normal direction, the total light transmittance R2 is 85%. The ratio of those total light transmittance R1/R2 is 1.09.

Figure 19:
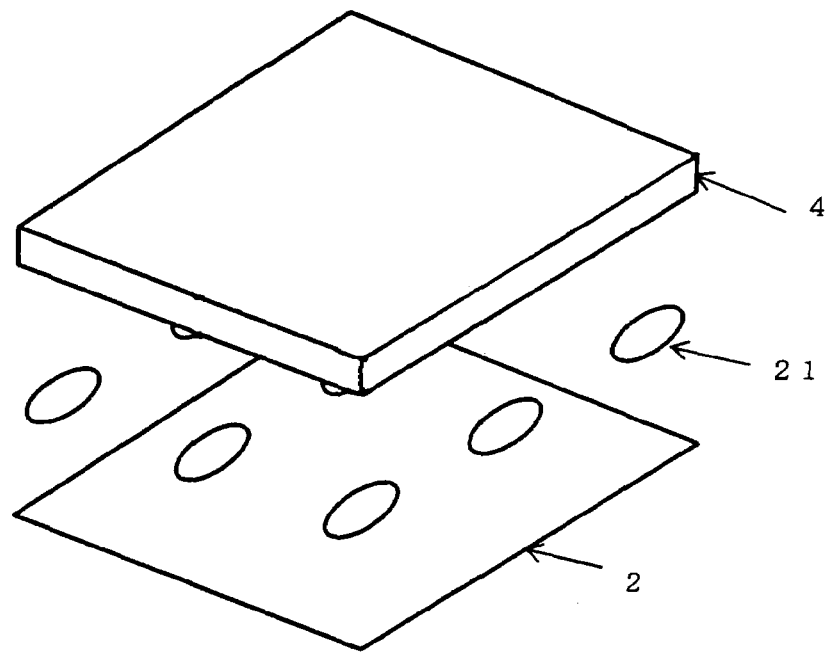
FIG. 19 is an explanatory view representing a constitutional example of using the point light source according to the present invention.

The light sources according to the present invention are not limited to the linear light sources and a plurality of point light source may be applied. A constitutional example when point light source 21 are provided between the reflector 2 and the light control member 4 is represented in FIG. 19. Where, the same operation/working-effect as when the linear light sources are used can be obtained.

Figure 20:
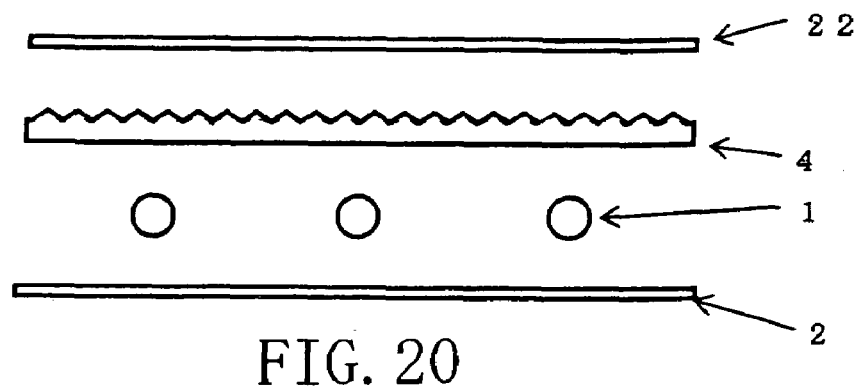
FIG. 20 is an explanatory view representing an example of the configuration of the lighting system used for the present invention.

Another constitutional example used for the present invention is represented in FIG. 20. Where, a diffusion sheet 22 is overlaid on the exit plane of the light control member 4. Thereby the luminance angle distribution of the outgoing light within the exit plane can be further uniformalized so that the superior lighting system can be obtained.

Figure 21:
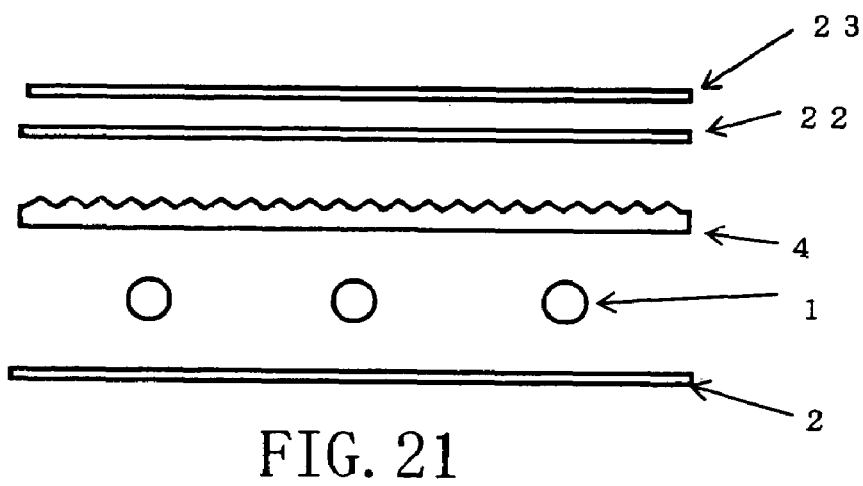
FIG. 21 is an explanatory view representing another example of the configuration of the lighting system used for the present invention.

Further another constitutional example used for the present invention is represented in FIG. 21. Where, a polarization separating film 23 is overlaid on the diffusion sheet 22. When the polarization separating film 23 splits linearly polarized lights crossing at right angles, a liquid crystal panel is placed on the light-emitting surface and the transmissive polarized axis of the polarization separating film 23 is matched with the transmission axis of the polarizing film on the incident plane of the liquid crystal panel thereby the lighting system in which the luminance is further increased can be obtained.

Additionally, when the polarization separating film 23 splits clockwise or counterclockwise circularly polarized light, a quarter-wave plate is overlaid on the exit plane of the polarization separating film 23, the circularly polarized light is transformed to linearly polarized light after passing through the quarter-wave plate. Thereby the linearly polarized light direction is preferably matched with the transmission axis of the polarizing film on the incident plane of the liquid crystal panel.

Next, as for an outline constitutional example of the liquid-crystal display (image display apparatus), the liquid crystal panel is placed on the light control member 4 thereby the liquid-crystal display in which the luminance within the panel screen is uniformalized can be obtained. A transmissive display device is placed on the lighting system of the present invention so that the image display apparatus of which configuration is simplified can be easily obtained. A liquid crystal panel is taken as the representative example of the transmissive display device.

Figure 22:
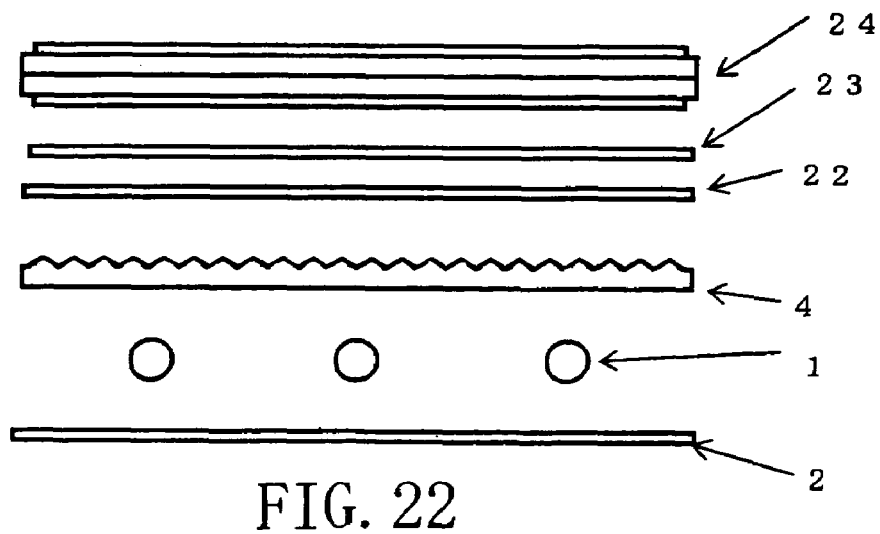
FIG. 22 is an explanatory view representing a constitutional example of the lighting system on which the liquid crystal panel is mounted as a liquid crystal display unit according to the present invention.
Figure 23:
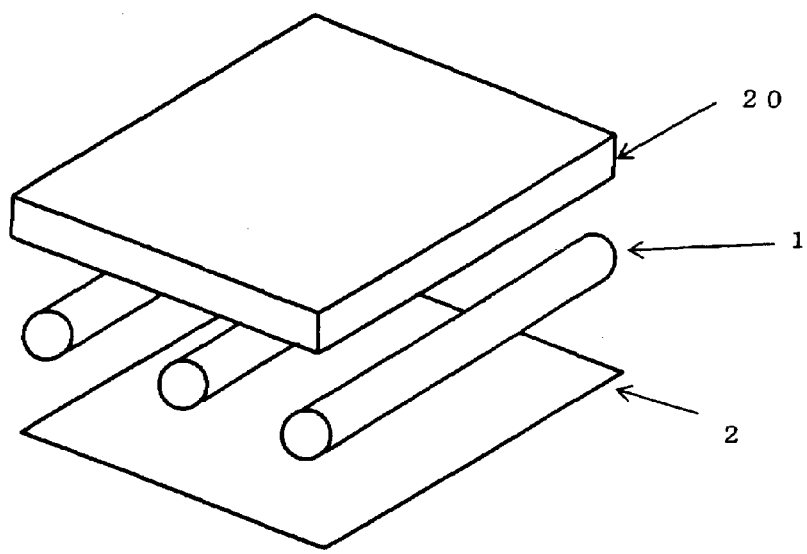
FIG. 23 is a schematic view of the conventional lighting system.

Where, the image display apparatus is an display module by combining the lighting system and the display device, and further, an equipment having at least a image display facility such as a television and a computer screen using the display module. A constitutional example of an image display apparatus by the combination of the lighting system and the display device is represented in FIG. 22. Where, a light diffusion sheet 22 is overlaid the light control member 4, a polarization separating film 23 is overlaid thereon and the liquid crystal panel 24 is overlaid further thereon. The transmissive polarized axis of the polarization separating film 23 is matched with the transmission axis of the polarizing film on the incident plane of the liquid crystal panel 24.

COMPARATIVE EXAMPLE 1

It is described that the light source is split into two images so that a uniform surface light source can be obtained in the patent document 6. In order to compare means described in the patent document 6 with the light control member according to the present invention, a sheet having the exit plane on which a prism with an apex angle=90 degrees is formed as means for splitting the light source into two images of the patent document 6 is disposed such that the prism is in parallel with the linear light sources. The obliquely incident light is exited to the front direction by the sheet as FIG. 32. However, the light vertically incident on the sheet is totally reflected so that the light exiting to the front direction is significantly decreased as FIG. 31. As the result of observing from the front direction, the luminance is decreased at the portion directly above the light source and the ununifomity of luminance within the plane is increased. When light is incident on the incident plane of the sheet at an angle α=45 degrees with the normal direction of the incident plane, the transmittance is 90%. When light is incident to the normal direction, the transmittance is 5%. That is to say, the ratio of the transmittance is 18. If the ratio of the transmittance is increased as just described above, the luminance directly above the light source is decreased so that the unevenness in the plane can not be adjusted.

Figure 31:
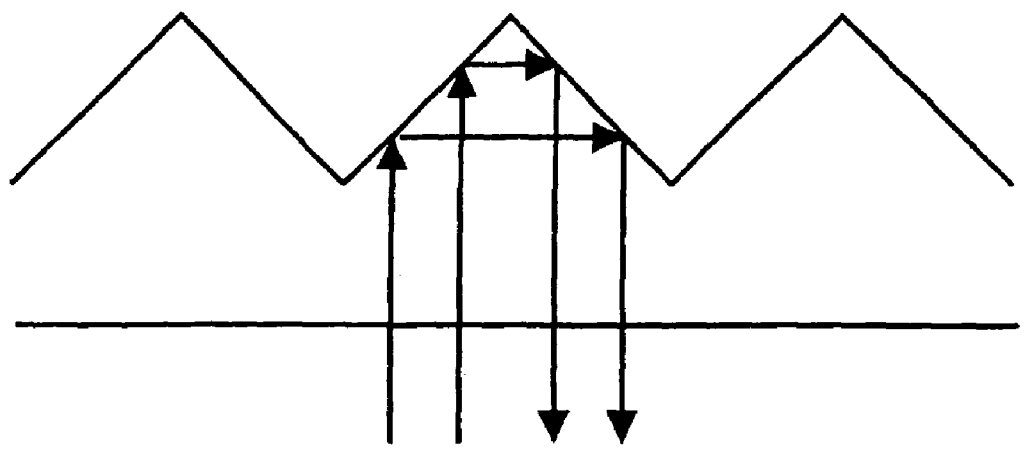
FIG. 31 is a schematic view representing a trajectory of the light vertically incident from the sheet including the prism with 90 degrees of the apex angle on the exit plane.
Figure 32:
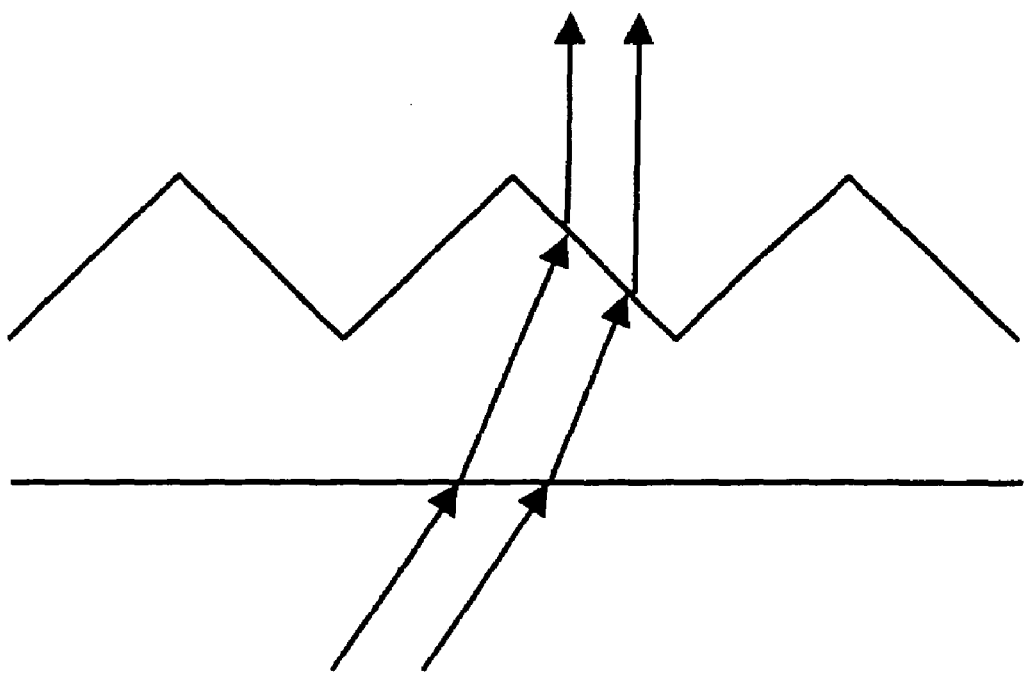
FIG. 32 is a schematic view representing a trajectory of the light obliquely incident from the sheet including the prism with 90 degrees of the apex angle on the exit plane.

The principle of light control by the sheet is represented in FIG. 31 and FIG. 32. Since the light incident on the incident plane of the light control member from the normal direction is totally reflected and returned to the entrance side as FIG. 31, the total light transmittance in the pertinent region is 0 in principle and the measured value is 5% as a very low value. Alternatively, since the light incident from the oblique direction is refracted by the convex structure and advanced to the vicinity of the front as FIG. 32, the total light transmittance is increased. The measured value is 90%. That is to say, the total light transmittance is significantly increased when the light is obliquely incident in comparison with the present invention.

In order to compare in detail the difference of the luminance uniformity due to the difference of the total light transmittance between the oblique incident light and the vertical incident light, the light control member of the first example of the embodiment 1 in FIG. 27 or the prism sheet of the above-described comparative example is provided at a distance of 55 mm from the cold fluorescent lamp. While the cold fluorescent lamp is lighted, an occurring image is taken with the camera.

Figure 36:
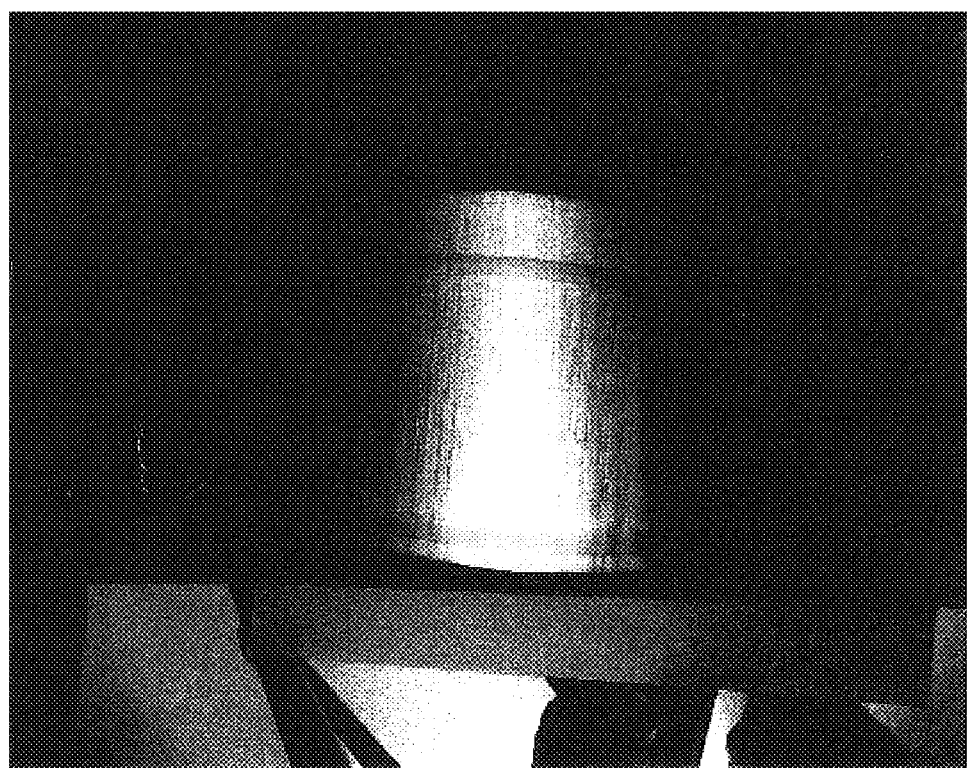
FIG. 36 is a photography of the light control member of the embodiment 1 to compare the light control member according to the present invention with means described in the patent document 6.
Figure 37:
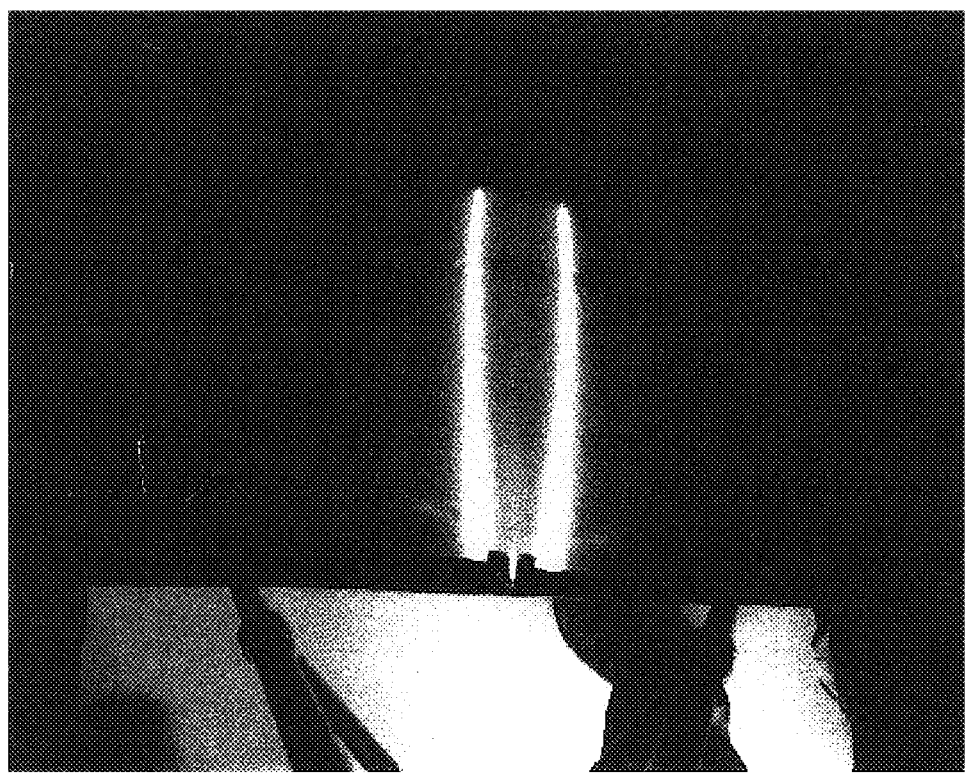
FIG. 37 is a photography of the prism sheet of the patent document 6 to compare the light control member according to the present invention with means described in the patent document 6.
Figure 38:
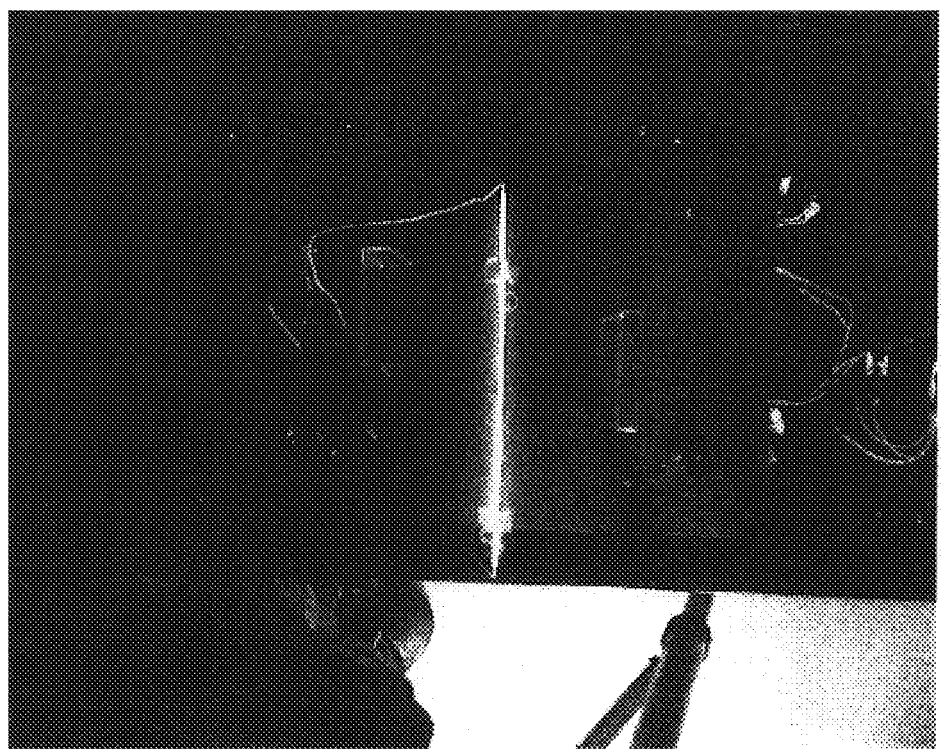
FIG. 38 is photography of the light source directly taken to compare the light control member according to the present invention with means described in the patent document 6.

Thereby in the light control member of the first example of the embodiment 1, the light from the light source is emitted from the wide range is observed as the photograph of FIG. 36. Therefore, the luminance in the plane is uniformalized so that the excellent surface light source can be obtained. Alternatively, in the prism sheet of the comparative example described in the patent document 6, the light source is clearly split into two images as FIG. 37, and the region having high luminance is formed in the each portion so that it is projected to occur nonuniformity of the luminance. FIG. 38 is a photography of the light source directly taken.

Next, the preferred embodiment of the light diffusion plate provided in the present invention will be described. The light diffusion plate includes approximately parallel two principal planes. A plurality of convex structures are periodically formed on at least one of the principal planes. The one of the principal planes is an incident plane for mainly receiving light and the other of the principal planes is an exit plane for mainly emitting light. The total light transmittance when the light is incident on the normal direction of the incident plane at a predetermined angle α is more than 50% and 1.05-5 times as many as total light transmittance when the light is vertically incident. Thereby used for a member of the direct type lighting system, the light diffusion plate can provide the following advantages: the configuration can be simplified; the body can be thinned; the productivity is improved; it is not necessary to finely align with the light source; the lamp image is eliminated; and the luminance in the plane is excellently uniformalized.

In the conventional light diffusion plate having approximately parallel two principal planes, the light incident on the incident plane at angle α with the normal line exhibits the luminance angle distribution centered on the angle α, alternatively, in the light diffusion plate according to the present invention, the incident light can be inclined such that 10-50% of the incident light is exited within the angle range (−π/12 radian)−(π/12 radian) with the normal line of the exit plane by the convex structure. Thereby preferred luminance angle distribution centered on the vicinity of the front can be usually obtained.

The angle α can be selectively set within 0 degree<α<90 degrees, and wider the angle α, further can be uniformalized outgoing energy in wide range. The angle α is normally within 30-80 degrees, and further preferably, it is within 40-70 degrees. When the angle α is less than 30 degrees and the distance to the light source is not changed, the uniformly irradiating range of light from the light source is narrowed so that it is required to use a number of light sources for use with a large lighting system, undesirably. It is undesirable that the distance to the light source is increased in view of thinning the body. When the angle α is narrowed, the difference of the outgoing energy is reduced thereby the known diffusion sheet can resolve the problem to some extent and it is some uses not required the high quality. Alternatively, when the angle α is wider than 80 degrees, the light incident from the light source at the angle α is weak and it is not enough to be used as the light diffusion plate required the high luminance.

Usually, when the light is emitted on the principal plane of a transparent flat plate, energy loss within the flat plane occurs even if the plate is transparent so that outgoing energy is decreased than incident energy. Where, the ratio between the outgoing energy and the incident energy is represented as total light transmittance and the value is less than 100. The optical path length in the flat plate i.e. from when the light is incident on the incident plane to when the light exits from the exit plane in the oblique direction is longer than that in the normal direction. Thereby the energy loss in the oblique direction is increased and the total light transmittance in the oblique direction is less than that in the normal direction. The thickness of the plate is increased around directly above the light source and decreased in proportion as away from the light source so that the total light transmittance in the oblique direction can be larger than that in the normal direction. However, it is necessary to precisely align the plate with the light source so that the productivity is reduced.

In order not to be necessary to align the light diffusion plate with the light source, the property of the total light transmittance should be same at any point on the incident plane of the light diffusion plate. The above-described matter is one of the feature of the present invention. That is to say, a plurality of convex structures are periodically provided on at least one plane of the light diffusion plate so that each of the total light transmittance of the light incident from any point on the incident plane has the same optical property in the present invention. Additionally, selecting preferred angle α, the light diffusion plate of the present invention has the special optical property that the total light transmittance of the light obliquely incident on any point of the incident plane at an angle α with the normal direction is larger than that of the light incident from the normal direction. Further, angle α where the ratio between the total light transmittance of the light obliquely incident and that of the light from the normal direction is equivalent to the ratio of the total light transmittance defined in the present invention exists on at least one point.

Meanwhile, the surface shape of the light diffusion plate is designed according to the method disclosed in the present invention and the ratio of the total light transmittance is adjusted so that the angle α is freely adjusted and the lighting system fitted for the purpose can be obtained. Normally, the angle α is preferably an angle made by the positional relationship between the point on the incident plane around the darkest region on the viewing screen of the lighting system and the light source. In the direct type lighting system in which the light source is centrally disposed for example, it is preferably an angle made by the positional relationship between the light source and the region around the light diffusion plate, that is determined based on the distance between the light source and the light diffusion plate and the size of the light diffusion plate. Additionally, in the direct type lighting system in which the plurality of light sources are disposed, it is preferably an angle made by the positional relationship between the incident plane adjacent the light source and opposite to the middle point of the light source, and the light source.

The light diffusion plate of the present invention may use the material used as the base material for the conventional light diffusion plate. Translucent resin is usually used for the material of the present invention. For example, it is methacryl resin, polystyrene resin, polycarbonate resin, cycloolefin resin, methacryl-styrene copolymer resin and cycloolefin-alkene copolymer resin.

The light diffusion plate has periodic convex structures on one side thereof. The periodic convex structures may be formed on both sides, however, it is preferable for the productivity to form the periodic convex structures on only one side. When the light diffusion plate of the present invention includes a flat incident plane and an exit plane provided with the convex structures, the present invention can be provided by forming the convex structure as the following shape: when the refractive index is n, a border line on the light exit surface on the cross-section in a predetermined one direction, which is perpendicular to the exit plane and includes the top of the convex structures includes the region X where the absolute value of the slope to the exit plane is less than $\sin^{-1}(1/n)$; the ratio between the length x of the directional component in parallel with the exit plane on the region X and the length P of the directional component in parallel with the exit plane over the border line is within 0.15-0.80; and the region X includes the top of the convex structures.

The light incident on the flat incident plane from the normal direction passes through the light diffusion plate and advances to the exit plane without refracting. When the slope of the exit plane to the incident plane is θ, an angle of the normal direction of the exit plane with the light incident from the normal direction and passing through the light diffusion plate toward the exit plane is also θ. Therefore, provided that the refractive index of the light diffusion plate is n and the refractive index of air is 1, when the absolute value of the slope of the exit plane is less than $\sin^{-1}(1/n)$, the light incident from the normal direction and passing through the light diffusion plate toward the exit plane is transmitted through the exit plane and exited to the viewing screen. Alternatively, when the absolute value of the slope of the exit plane is more than $\sin^{-1}(1/n)$, the light from the normal direction and passing through the light diffusion plate toward the exit plane is totally reflected.

Figure 46:
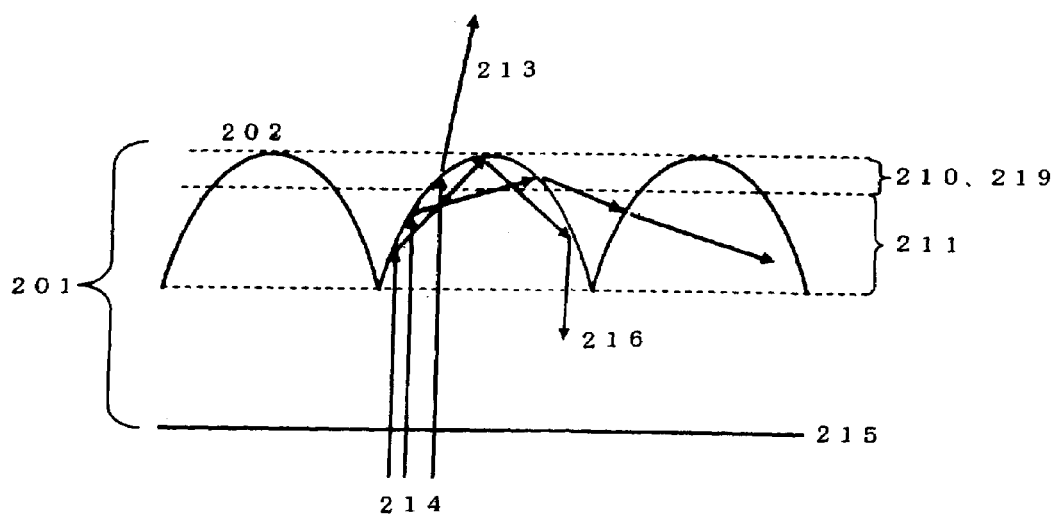
FIG. 46 is a schematic view representing the advancing state of the light vertically incident on the light diffusion plate according to the present invention.

Accordingly, the light incident on the incident plane from the normal direction and incident on the region X without refracting is refracted on the exit plane at an angle dependent on the slope of a region X219 and transmitted to exit as an outgoing light 213 as FIG. 46. The angle of the region X219 is curved shape so that the refracting angle on the exit plane is continually changed. Thereby the strong transmitted light from the normal direction can be uniformly distributed. Incidentally, the region X219 may be formed at a plurality of points in one convex structure.

It is preferable for facilitating to design the shape that the cross-section of the convex structure is liner symmetry centered on the normal direction.

The light incident on the region other than the region X from the normal direction is totally reflected on the exit plane as FIG. 46. The totally reflected light passes through the light diffusion plate again and advances to the other exit plane, and further totally reflects and returns to the entrance side as a reflected light 16, or transmits, usually. The transmitted light is mostly incident again on the other exit plane and returns to the entrance side as the reflected light 16. Additionally, a part of the transmitted light exits to the viewing screen side by the convex structures. However, the ratio is small and it has little affect on adjusting the rate of the total light transmittance.

Returning the light incident on a region other than the region X to the entrance side is an important function in order to adjust the ratio of the total light transmittance. In other words, the ratio of the region X is adjusted so that the ratio of the transmittance can be adjusted to the appropriate ratio to the total light transmittance of the light incident from the angle α. The ratio between a length x of the directional component in parallel with the exit plane on the region X and a length P of the directional component in parallel with the exit plane over the border line is preferably within 0.15-0.80. It is further preferably within 0.25-0.60. When x/P is less than 0.15, the luminance directly above a lamp is excessively decreased and the viewing screen is darkened. When it is more than 0.25, further preferably dispersibility is also improved. When it is more than 0.80, the light toward the front among the incident light at the angle α is decreased so that the uniformity in the plane is reduced.

In order to return the light incident on the region other than the region X to the incident plane direction, the slope to the exit plane is important. The preferred slope is different according to the refractive index of the base material. Usually, when transparent resin is used as the base material, the slope is preferably within 45-80 degrees. It is further preferably within 50-70 degrees. It is furthermost preferably within 55-65 degrees.

Meanwhile, the light incident on the region other than the region X at the angle α is inclined around the front and transmitted. The outgoing light angle is determined based on the angle α, the slope of the convex structure θ, and the refractive index of the base material. In order to condense around the front, if the refractive index is 1.54 and α is 50 degrees, it is preferably 54-70 degrees, it is further preferably 61-69 degrees, and it is furthermore preferably 64-68 degrees.

The light incident on the region X at the angle α is diffused on a region slightly away from around the front. The outgoing light angle is determined based on the angle α, the slope of the convex structure θ, and the refractive index of the base material. In order to condense around the front, if the refractive index is 1.54 and α is 50 degree, the light is exited within 24-50 degrees with the normal direction. Thereby the luminance uniformity in the plane is increased and preferred outgoing light angle distribution can be obtained.

The absolute value of the slope of the convex structure is less than θ satisfying $0 \leq |\sin^{-1}(n \cdot \sin(\theta - \sin^{-1}((1/n) \cdot \sin \alpha))) - \theta| \leq (\pi/12)$ (radian). When the absolute value of the slope is more than the above-described value, the light incident from the angle α is mostly exited to the oblique direction so that it is difficult to adjust to preferred outgoing angle distribution.

Thus the slope of the region other than the region X in the convex structures and the ratio of the region X are adjusted so that the preferred total light transmittance and outgoing angle distribution can be obtained.

At least a part of the region other than the region X is made a flat plane perpendicular to the predetermined angle so that the light incident from a fixed angle can be exited from the flat plane to the same direction. Since the outgoing light angle can be adjusted according to the incident light angle, the outgoing light angle distribution is easily adjusted and the ununifomity of luminance is easily eliminated. It is further preferable in view of controlling the luminance angle distribution that two of such flat planes are provided such that the top is sandwiched therebetween to form an acute angle thereto. Where the two flat planes are crossed at the exit plane side of the top of the convex structure. It is more preferable that the two planes are linear symmetrical to the normal line. The angle made by the two planes is an angle made by the region other than the region X so that it can be adjusted responsive to the required total light transmittance and the luminance angle distribution.

Additionally, the convex structures formed on the exit plane has same configuration between the section directly above the linear light source and the section between the linear light sources. Thereby the prism shape can be easily manufactured so that the cost can be reduced.

Forming the convex structure of the exit plane, any of an extrusion molding, an injection molding and a 2P molding using ultraviolet curing resin can be used. The forming method may be selected in consideration of size, required shape and productivity. In this case, a female die reversed the shape of the convex structure is required.

Meanwhile according to the present invention, the convex structures periodically is provided on the incident plane of the light diffusion plate thereby the light diffusion plate in which the total light transmittance is more than 50% when the light is incident at a predetermined angle $\alpha$ with the normal direction of the incident plane and 1.05-3 times as many as total light transmittance when the light is incident from the normal direction.

Where, the convex structures are periodically formed on the incident plane, the border line of the cross-section in at least a predetermined one direction, which includes the top of the convex structures and is cut by the plane perpendicular to the incident plane has two straight lines, and the two straight lines cross in the top or the entrance side of the top at an acute angle $\theta1'$ more than an angle $(\pi/9)$ radian. The angle substantially means the apex angle of the convex structures for the following reason.

Figure 53:
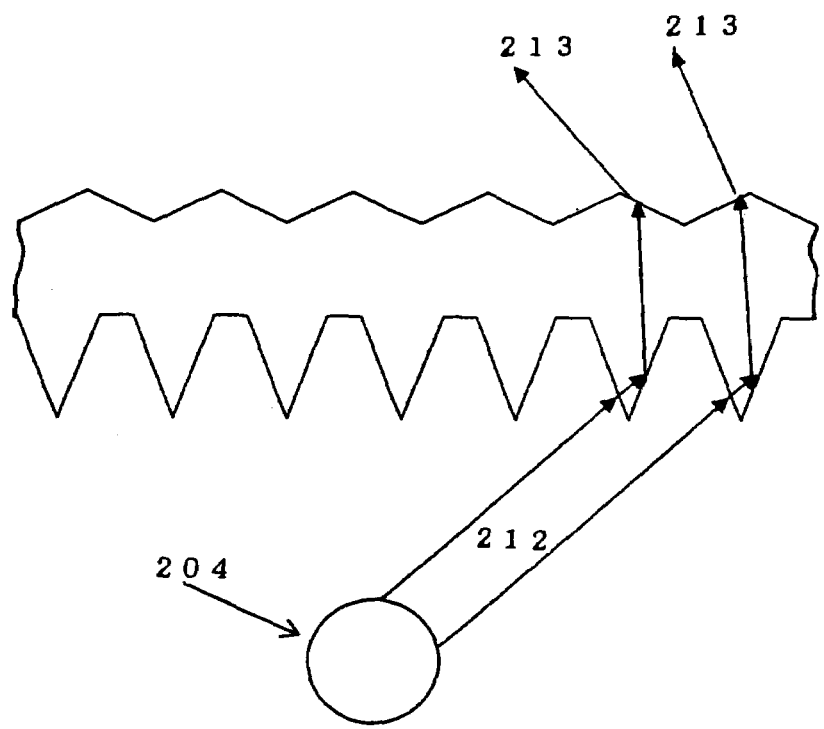
FIG. 53 is a schematic view representing an example of the device to measure angular dependency of the total light transmittance of the light diffusion plate according to the present invention.

The light incident on the incident plane at the angle $\alpha$ is incident on the convex structure of the incident plane, totally reflected by the rear side of the convex structure, inclined to the front direction and exits as FIG. 53. Thereby the outgoing light energy in the plane can be uniformalized in the light diffusion plate. For example, the light incident on the incident plane opposite to the section between the linear light sources of the lighting system in which a plurality of linear light sources are arranged is also exited approximately perpendicular to the light diffusion plate so that higher luminance can be obtained.

When the tip at which the two straight lines of the convex structure cross on the top is sharp, the light incident on the convex structure and inclined, is increased than when the tip at which the two straight lines cross out of the top is obtuse so that it is effective against increasing the front luminance. However it is preferable that the tip is obtuse in view of easiness of molding and mechanical strength of the tip of the convex structure. Accordingly, the height of the convex structure from the incident plane is preferably more than 85% of the height when the tip at which the two straight lines cross on the top is sharp, further preferably it is more than 90%, and furthermore preferably it is more than 95%.

Additionally in this case, it is preferable that almost none of convexoconcave pattern causing to reduce the quality from the aspect of view is viewed in comparison with when the convex structures are provided on the exit plane.

The light incident on the convex structures on the entrance plate of the light diffusion plate of the present invention in which the convex structures are provided on the incident plane from the normal direction are partially reflected and advanced to the incident plane direction. Thereby the total light transmittance of the light from the normal direction is decreased and the ratio of the total light transmittance can be adjusted. Additionally, convexoconcaves are provided on the exit plane so that the angle of the light reflected to the incident plane direction of the light from the normal direction can be adjusted.

When the refractive index of the light diffusion plate is n, a region Y where the absolute value of the slope to the incident plane is angle $\theta2'$ satisfying $0 \leq |Sin^{-1}(n \cdot sin(\theta2' - Sin^{-1}(1/n \cdot sin \theta2')))| \leq (\pi/12)$ (radian) is provided between the convex structures of the incident plane. Thereby the ratio of the transmitted light from the normal direction can be adjusted. That is to say, the light incident on the region Y from the normal direction behaves differently from the light incident on the convex structures, is refracted on the region Y, controlled at an angle within ($\pi/12$ radian) with the normal line and exited. Thus the degree of freedom to control the total light transmittance is increased thereby the shape of the convex structure on the incident plane can be widely selected so that the light from wide range of the angle $\alpha$ can be controlled to the front direction.

In this case, the convexoconcave of the exit plane is formed by the slope in the same direction as the convex structure of the incident plane. It is preferable that its cross-section is formed by any of convex shape, lenticular lens shape, sine wave shape, or the combination thereof. Alternatively, embossment shape randomly arranged in the two dimension may be applied.

A part of the light incident on the incident plane from the normal direction is transmitted through the convex structure of the incident plane and the convexoconcave of exit plane, and the other of a part is totally reflected so that it is not transmitted but returned to the light source side.

When the refractive index of the light diffusion plate is n, a region Y where the absolute value of the slope to the incident plane is angle $\theta2'$ satisfying $0 \leq |Sin^{-1}(n \cdot sin(\theta2' - Sin^{-1}(1/n \cdot sin \theta2')))| \leq (\pi/12$ radian$)$ is provided between the convex structures on the incident plane. Thereby the ratio between transmittance and reflectance of incident light from the normal direction can be adjusted. The region Y may be in parallel with the incident plane, i.e. it may be a flat portion on the incident plane.

Figure 54:
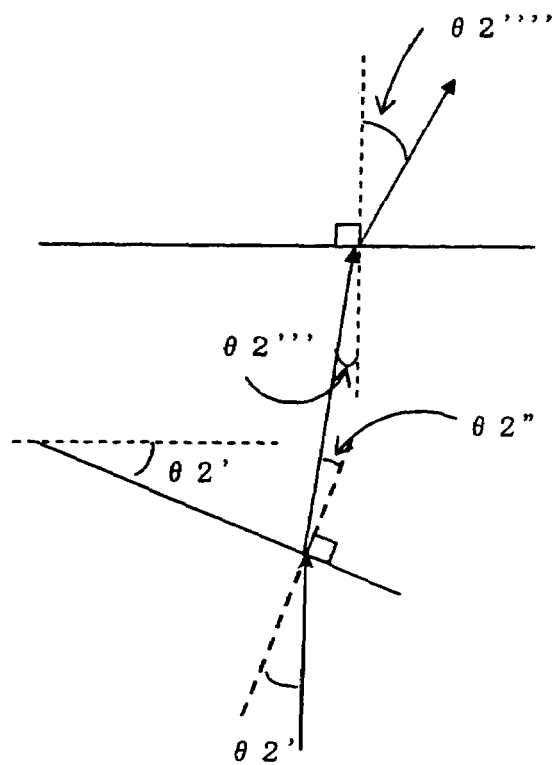
FIG. 54 is a schematic view representing the relationship between the optical path and the angle of the light incident on the prism provided on the incident plane according to the present invention.

The light incident on the plane making $\theta2'$ satisfying the above-described angle condition with the incident plane from the normal direction is exited around the front direction within ($\pi/-12$ radian) with the normal line. That is to say, the region Y is provided between the convex structures on the incident plane so that the light totally reflected when the region Y was not provided is transmitted as FIG. 54. Thereby the light transmittance can be increased. Since the oblique incident 12 is not incident on a valley portion 17 of the convex structure as FIG. 55, the valley portion 17 is independent of the directional control of the oblique incident light 12. Therefore, it is preferable that the region Y is provided in the valley portion to adjust the total light transmittance of the incident light from the normal direction because it does not adversely affect on the directional control of the oblique incident light at the angle α.

Meanwhile, if the region Y is provided on the top of the convex structure (not shown in the figure), the light incident from the angle α is incident on the region Y and exits to the different direction so that the light exited to the front direction is reduced. Additionally, the region Y which is originally provided in order to control the total light transmittance from the normal direction affects also the luminance angle distribution thereby to make difficult to design. That is to say, the region Y may provided not on the top of the convex structure but on the section between the convex structures on the incident plane in order to easily control transmittance and reflectance. Since this matter is conformed to the above described matter that it is preferable that the shape of the convex structure is sharp in order to control the light from the angle α to the front direction, the degree of freedom of the design is not reduced.

Additionally, the convex structures formed on the incident plane has same configuration between the section directly above the linear light source and the section between the linear light sources. Thereby the prism shape can be easily manufactured so that the cost can be reduced.

Forming the convex structure of the incident plane and the convexoconcave of the exit plane, any of an extrusion molding, an injection molding and a 2P molding using ultraviolet curing resin can be used. The forming method may be selected in consideration of size, required shape and productivity. In this case, a female die reversed the shape of the convex structure is required. The apex angle of convex structure of the incident plane used for the present invention is an acute angle more than (π/9 radian), further preferably, it is (π/6 radian)–(π/3 radian). If there is not a region to form the region Y in the top of the convex structure of the female die, the top of the female die is fallen down thereby troubles such as forming failure may be occurred. Accordingly, the region Y is provided between the convex structures of the incident plane so that it can prevent the die from falling down thereby the productivity can be improved.

In the light diffusion plate in which the convex structures are periodically formed on the incident plane, the total light transmittance when the light is incident at a predetermined angle α with the normal direction of the incident plane is 1.05-3 times as many as total light transmittance when the light is incident from the normal direction. Thereby the light diffusion plate can be preferably used for the direct type lighting system in which a plurality of light sources are arranged at even intervals, particularly.

The top of each convex structure in the present invention is the point positioned closest to the exit plane side in one convex structure, and usually one point exist for each convex structure or it is formed of a continuous portion. Since the light incident on any point exhibits the same optical action in the present invention, each convex structure is formed of the same shape. Where, the height of each convex structure is approximately same. However, a plurality of convex structures composed of each convex structure having different shape may be regularly arranged as FIG. 50. Where, the height of each top may be different.

The predetermined one direction in the present invention is determined based on a desired polarizing direction. For example, in the linear light source, ununifomity of luminance occurs in the direction perpendicular to the longitudinal direction of the light source, therefore it is necessary to control the light direction perpendicular to the longitudinal direction of the light source. Accordingly, the shape of the convex structure should be suitable for controlling the light in a cross-section in the direction perpendicular to the longitudinal direction of the light source In this case, a simple wedge is equivalent to the cross-section in which the acute angle is most narrow. When a plurality of light sources are arranged, the predetermined one direction means a direction in parallel with the direction from the light source to the adjacent light source.

As for the linear light source, it is preferable that the convex structures are arranged in parallel or stripe pattern such that the cross-sections perpendicular to the longitudinal direction of the linear light sources have same shape.

As for the point light source, since ununifomity of luminance occurs in omnidirection, it is preferable that the shape of convex structure allows all cross-sections perpendicular to the exit plane to control light. In this case, if a plurality of light sources are arranged, the shape of the convex structures is different according to the arrangement such as the distance between the light sources.

In the light diffusion plate of the present invention, in order that the incident light exhibits the same optical directivity to obtain the preferred optical property at any point on the incident plane, it is preferable that all of the convex structures have the similar shape and size, and the orientation and the period are also similar. When the light diffusion plate of the present invention is used for the direct type lighting system, it is preferable that the light sources having the similar capability are arranged at even intervals for the reason described above.

The light diffusion plate of the present invention can be manufactured using a plurality of different materials according to need. For example, after the convex structures are formed a film, the surface of the film on which the convex structures are not formed is bonded to a support plate to form the light diffusion plate. In this case, when ultraviolet curing resin is used to form the convex structures, general translucent resin is used to form the portion other than around the convex structures thereby the use of the expensive ultraviolet curing resin can be reduced. Additionally, a small amount of light diffusing particles may be dispersed inside and applied to the surface. Using the light diffusing particles, the diffusibility of the outgoing light is improved as well as the luminance uniformity. When the light diffusing particles is applied, it is preferable to apply to the exit plane side. Fine inorganic particles or bridging fine-organic particles used for the conventional light diffusion plate and the diffusion sheet can be used as the light diffusing particles.

When a plurality of materials are used, the reflective index of the light diffusion plate being the important factor to determine the shape of the convex structure is different for each material. The value (reflective index) for the material of the convex structure can be used.

EMBODIMENT 2

The light diffusion plate provided by the present invention will be described with reference to FIG. 39-FIG. 57 as the Embodiment 2.

Figure 39A:
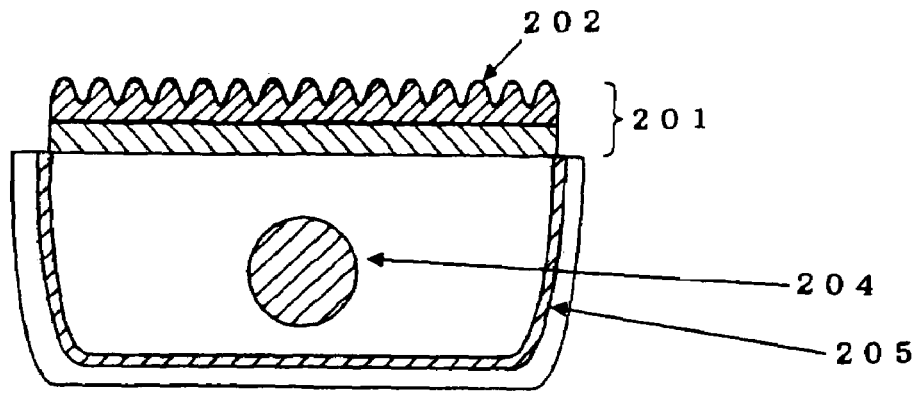
FIG. 39 is a schematic view representing the lighting system including the light diffusion plate according to an embodiment of the present invention.
Figure 39B:
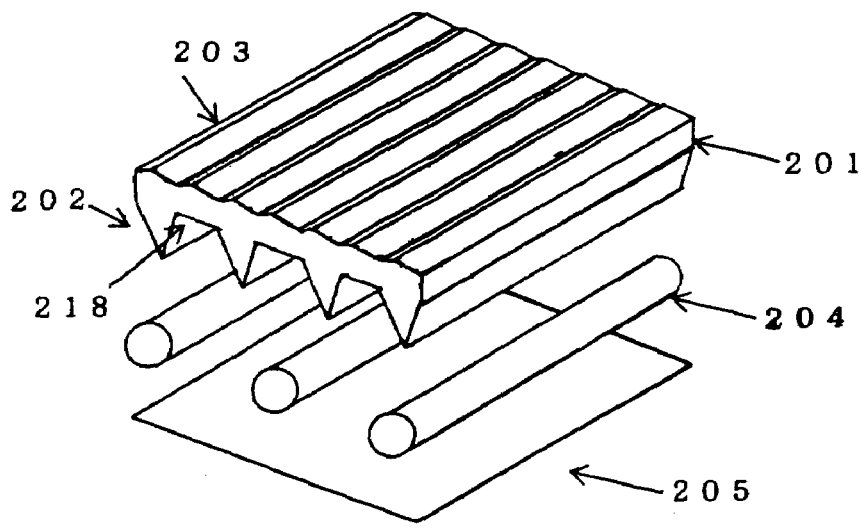
Figure 39C:
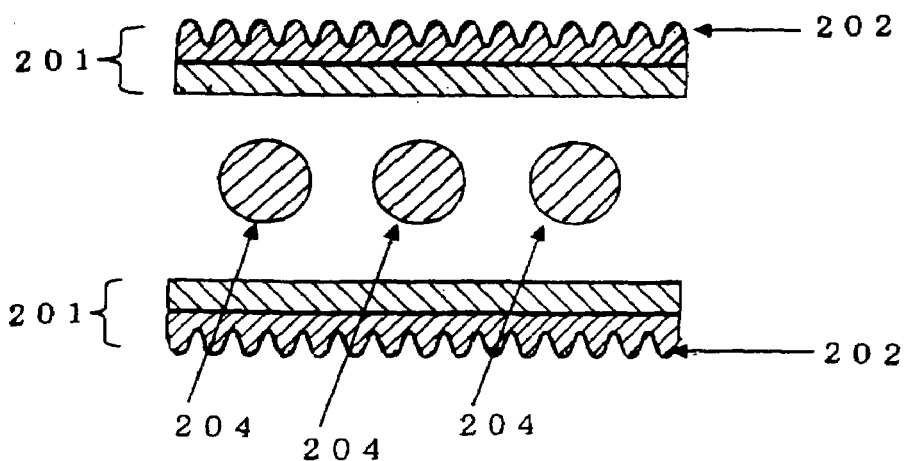

FIG. 39a-FIG. 39c represent examples of the lighting system including the light diffusion plate according to the present invention. In FIG. 39a, a light diffusion plate 201 including convex structures 202 on the exit plane side thereof is disposed above the viewing screen side of the light source 204 selected from linear light sources such as cold fluorescent lamps and a point light source such as an incandescent lamp, and a reflector 205 is provided inside the housing to enclose the light source and the light diffusion plate. In FIG. 39*b*, the light diffusion plate 201 including convex structures 202 and approximately flat portions 218 on the incident plane and convexoconcaves 23 on the exit plane is disposed above the viewing screen side of a plurality of (three in the figure) linear light sources 204 at even intervals and in parallel each other, and the reflector 205 is provided opposite to the light diffusion plate 201 such that the light source 204 is sandwiched therebetween, i.e. the rear side of the viewing screen side. The configuration of FIG. 39*b* is suitable for thin large-screen televisions and computer screens. In FIG. 39*c*, a plurality of (three in the figure) light sources 204 are disposed at even intervals in imaginary plane, and the light diffusion plates 201 including the convex structures 202 sandwiching the imaginary planes therebetween and provided on both of the exit plane side in parallel with the imaginary plane. This configuration is suitable for electric signboards having double-sided viewing screen.

Figure 40:
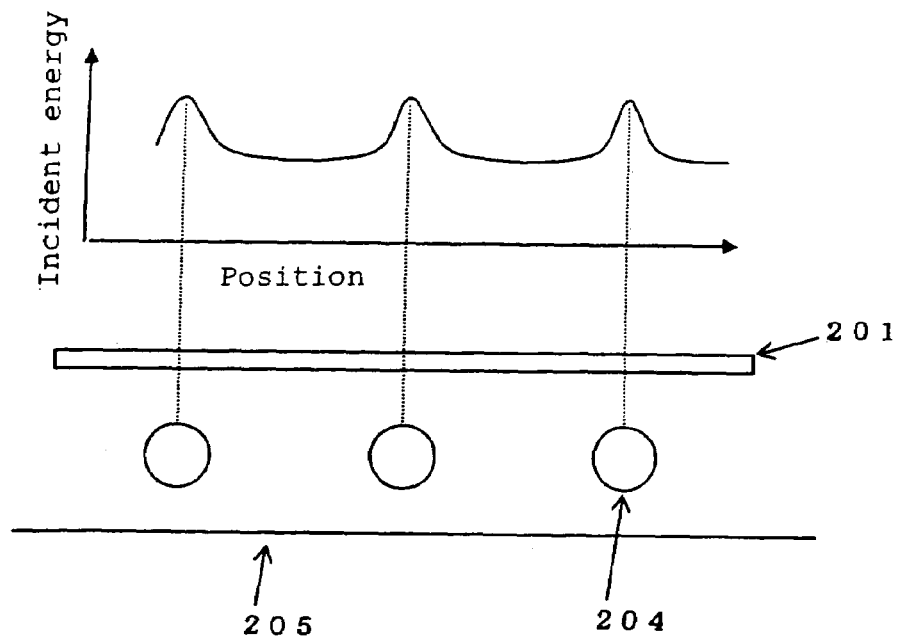
FIG. 40 is an explanatory view representing the incident energy directly above the linear light source according to the present invention.

FIG. 40 is an explanatory view representing the incident energy in a region directly above the linear light source 204. The incident energy of the light incident on the light diffusion plate 201 in the region directly above the light source 204 is larger than that in regions between the region directly above the light source or the both side regions, i.e. the region obliquely above the light source as FIG. 40.

Figure 41:
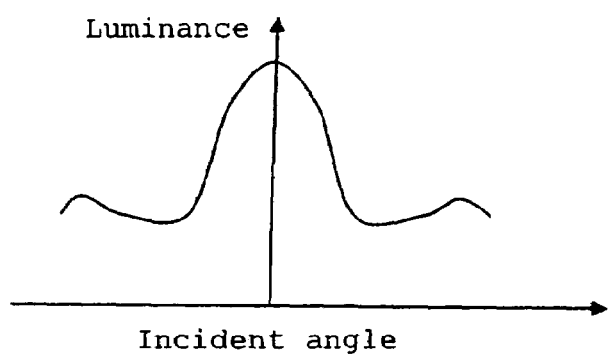
FIG. 41 is a luminance distribution diagram representing the luminance of the light incident on the light diffusion plate directly above each linear light source according to the present invention.

FIG. 41 is an explanatory view representing the relationship between an incident angle β and the luminance of the light incident on the light diffusion plate 201 in the region directly above the light source 204. The incident angle β is an angle of the advancing direction of the light toward the normal direction of the light diffusion plate 201. The luminance of the light incident on the light diffusion plate 201 from the vertical direction at an incident angle β=0 degree is highest as FIG. 41. The luminance is gradually come down as the light advances out of the vertical direction and the incident angle β is increased.

Figure 42:
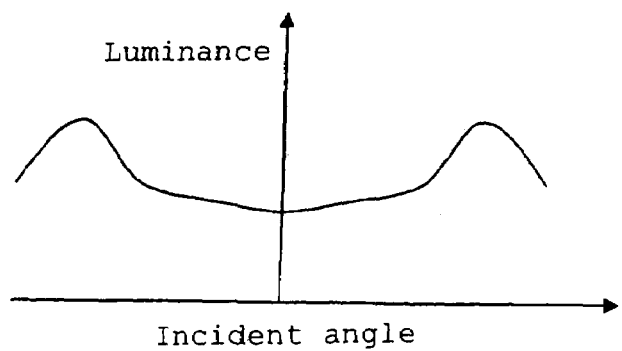
FIG. 42 is an luminance distribution diagram representing the luminance of the light incident on the light diffusion plate obliquely above each linear light source according to the present invention.
Figure 43:
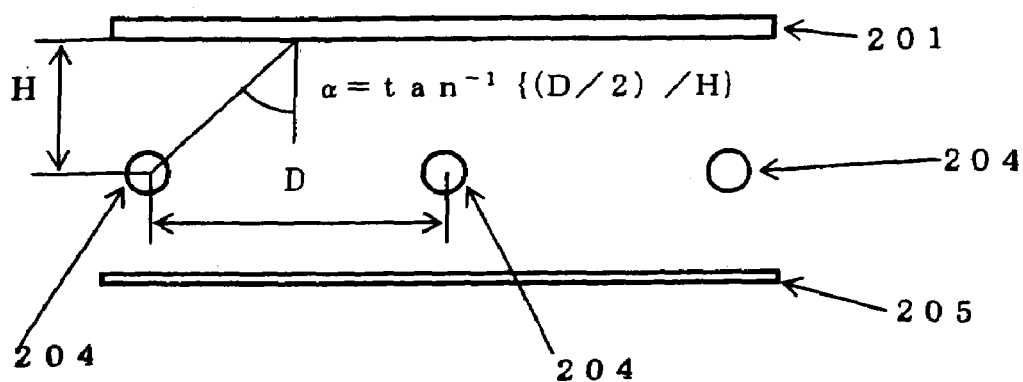
FIG. 43 is a schematic view representing the incident angle of the light incident on the light diffusion plate positioned between a plurality of light sources according to the present invention.

FIG. 42 is an explanatory view representing the relationship between the incident angle β and the luminance of the light incident on the light diffusion plate 201 in the region obliquely above the light source 204. The luminance of the light incident on the light diffusion plate 201 from the normal direction is lowest and the luminance is higher in the oblique direction as FIG. 42.

Accordingly, the relationship between the incident energy distribution and the luminance distribution with respect to the incident angle β is different between the region directly above the light source 204 and the region obliquely above that.

As for the lighting system using a plurality of light sources, it is preferable that the angle α is an incident angle when the light from the light source 204 incident on the light diffusion plate 201 directly above the middle point between the light source 204 and the adjacent light source 204. Since the total light transmittance of the light incident at the oblique incident angle α is larger than the total light transmittance of the light incident from the normal direction, the outgoing light energy of the light diffusion plate 201 can be uniformalized between the section directly above the light source 204 and the sections between the light sources.

Figure 44:
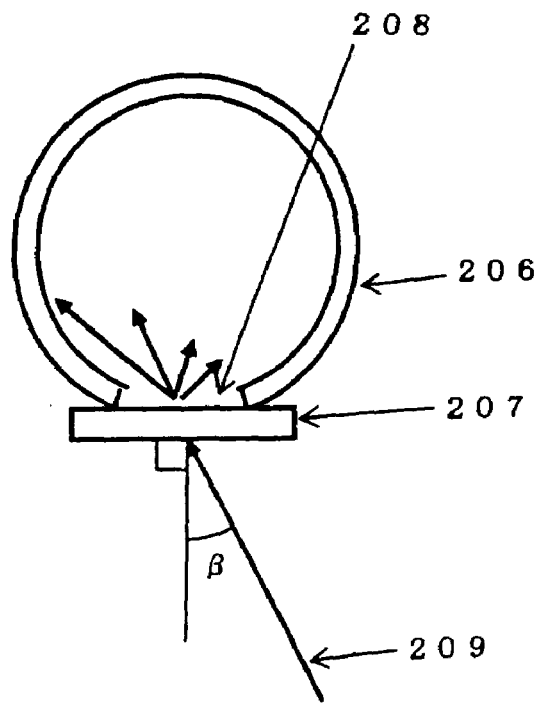
FIG. 44 is a schematic view representing an example of the device to measure angular dependency of the total light transmittance of the light diffusion plate according to the present invention.

A measuring method of the total light transmittance at an incident angle β is represented in FIG. 44. A measuring object 207 is disposed on an aperture 208 of an integrating sphere 206, and laser beam or parallel light 209 collimated by a lens is incident on the normal direction of the measuring object 207 at the angle β. The light transmitted through the measuring object 207 is irregularly reflected in the integrating sphere 206. The reflected energy is measured with a detector as represented by a photomultiplier (not shown in the figure). Provided that the output from the detector when the measuring object 207 is disposed and the parallel light 209 is incident on the measuring object 207 at the angle β is V(β), and the output from the detector when the measuring object 207 is not disposed is V0, the total light transmittance at the angle β is derived from V(β)/V0.

Figure 45:
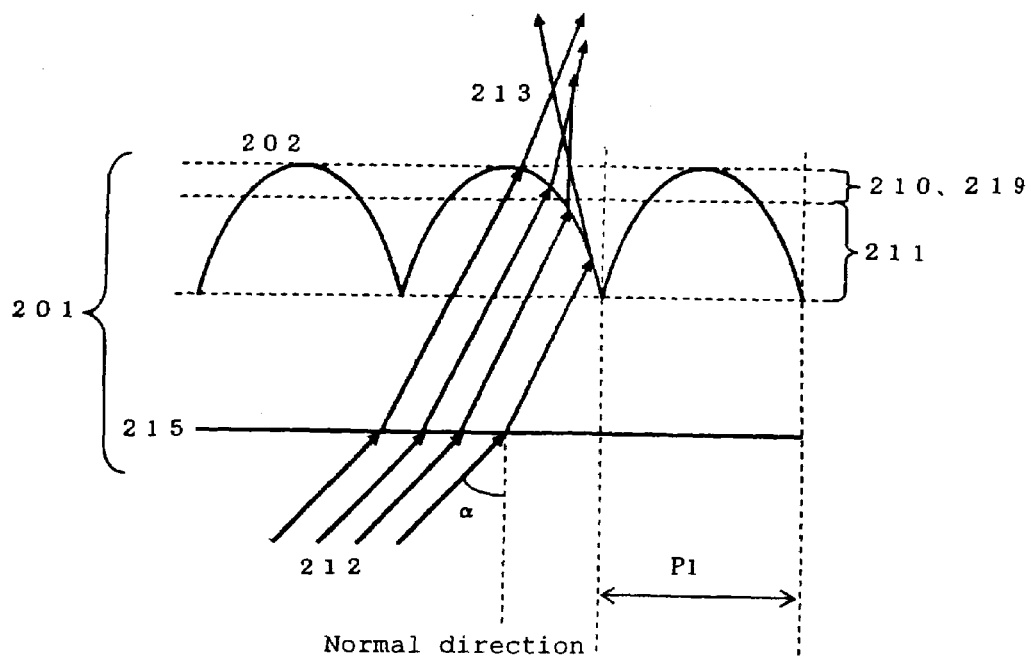
FIG. 45 is a schematic view representing the advancing state of the light obliquely incident on the light diffusion plate according to the present invention.

The light action when convex structures 202 having approximately elliptic cross-sections are formed on the exit plane is represented in FIG. 45 and FIG. 46. The convex structure 202 is formed of approximately elliptic cross-section so that the absolute value for the slope of the bottom of the convex structure 211 is less than θ satisfying $0 \leq |\mathrm{Sin}^{-1}(n \cdot \sin(\theta - \mathrm{Sin}^{-1}((1/n) \cdot \sin \alpha))) - \theta| \leq (\pi/12)$ (radian). An oblique light 212 incident at the angle α with the normal line can be emitted from a light diffusion plate 201 to the approximately front direction by refracting in the bottom of the convex structure 212. The reason is as follows.

Figure 47:
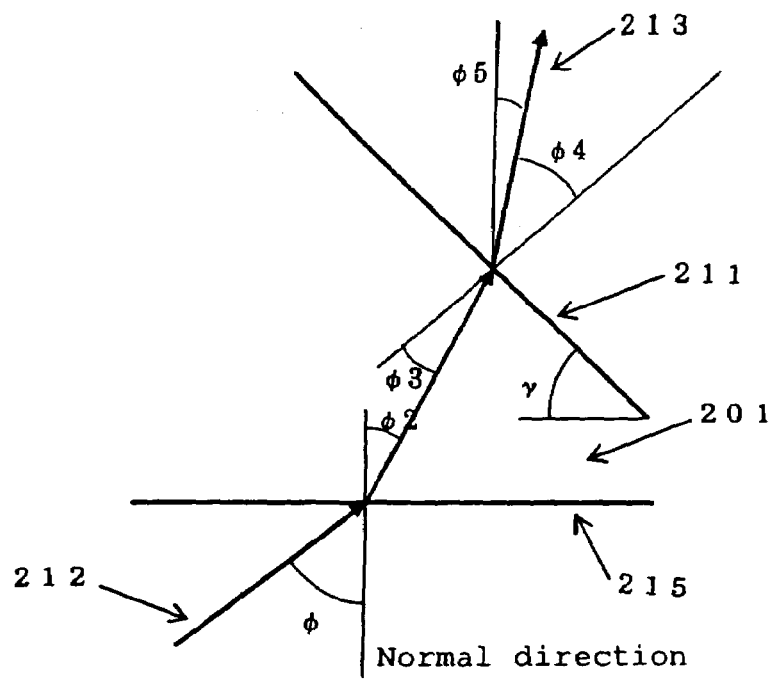
FIG. 47 is a schematic view representing the cross-section of the convex structures on the exit plane of the light diffusion plate used for the present invention.

If a slope of the bottom of the convex structure 211 is γ, an incident angle on the light diffusion plate 201 is φ and a refractive index of the light diffusion plate 201 is n, an angle φ5 of the light transmitted from one of the bottom of the convex structure 202 of the light diffusion plate with the normal direction of the light diffusion plate as FIG. 47 can be derived from the following formula.

$$\phi 2 = \mathrm{Sin}^{-1}\{(\sin \phi 1)/n\}$$

$$\phi 3 = \gamma - \phi 2$$

$$\phi 4 = \mathrm{Sin}^{-1}(n \times \sin \phi 3)$$

$$\phi 5 = \phi 4 - \gamma$$

That is to say, $$\phi 5 = \mathrm{Sin}^{-1}(n \cdot \sin(\gamma - \mathrm{Sin}^{-1}((1/n) \cdot \sin \phi 1))) - \gamma$$

In view of the object of the present invention, the outgoing direction of the light is preferably the front direction. Accordingly, when φ1=α, it is preferably −15 degrees≦φ5≦15 degrees. Further it is preferably −10 degrees≦φ5≦10 degrees. Further, it is excellently preferable that γ is selected such that −5 degrees≦φ5≦5 degrees.

A top of the convex structure 210 includes a region X219 where the absolute value θ2 for the slope to the exit plane is less than $\mathrm{Sin}^{-1}(1/n)$. Thus the slope θ2 of the region X has a plurality of values. Since the top of the convex structure 210 is curve, θ2 is continuously changed so that the diffusing direction can be continuously changed. Thereby the luminance uniformity can be further improved. Additionally, the slope of any point of the top of the convex structure 210 is preferably less than the absolute value for the slope to the exit plane of the bottom of the convex structure 211 in order to facilitate the molding and the directional control of light.

A part of the light 214 vertically incident on the light diffusion plate 201 is dispersed and exited while a part of the light 214 incident on the surface of the convex structure is returned to the entrance side as a reflected light 216 so that the total light transmittance can be reduced. Thereby the lighting system having excellent luminance uniformity and high luminance can be easily obtained.

Figure 48:
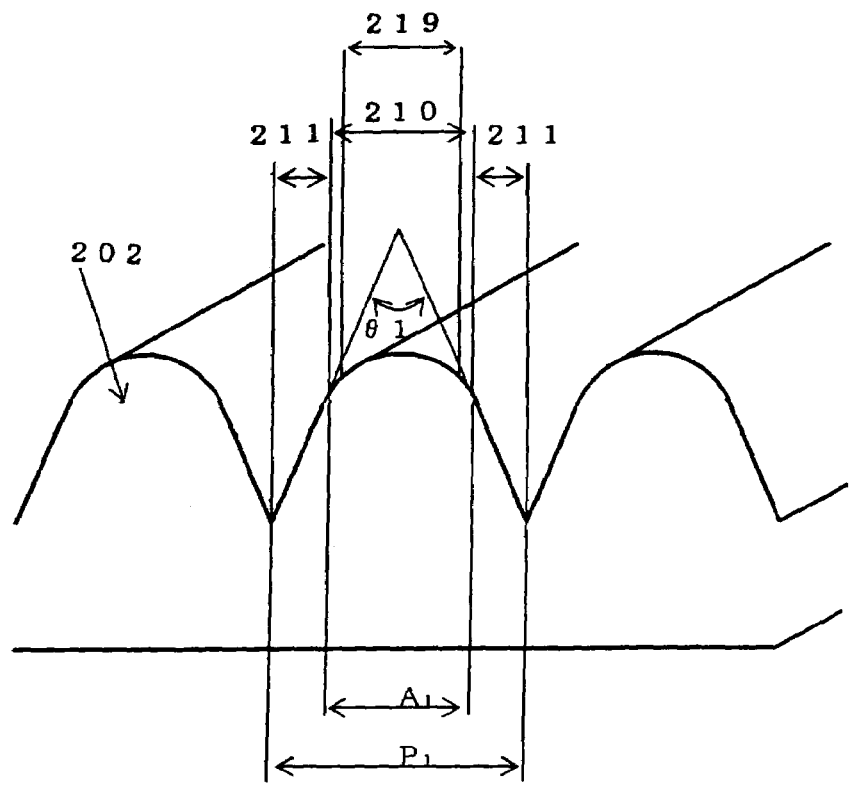
FIG. 48 is a schematic view representing the relationship between the optical path and the angle of the light refracting on the convex structure of the exit plane and exiting in the light diffusion plate according to the present invention.

An example of the preferred cross-section of the convex structure 202 in the shape of strip is described in FIG. 48. The convex structure 202 is composed of the bottom of the convex structure 111 whose border line of the cross-section in at least one predetermined direction, which is perpendicular to the exit plane of the light diffusion plate 201 and includes the top of the convex structure 210 is two approximate straight lines whose extension lines crossing at an acute angle θ1, and the top of the convex structure 210 formed of a curve lying across between each end of the two bottom of the convex structure 211.

Since the light can be exited at the same angle as the incident angle by the straight line portion thereby the outgoing light distribution can be easily controlled, ununifomity of luminance can be easily eliminated, and the luminance around the front can be further increased according to need.

Figure 49:
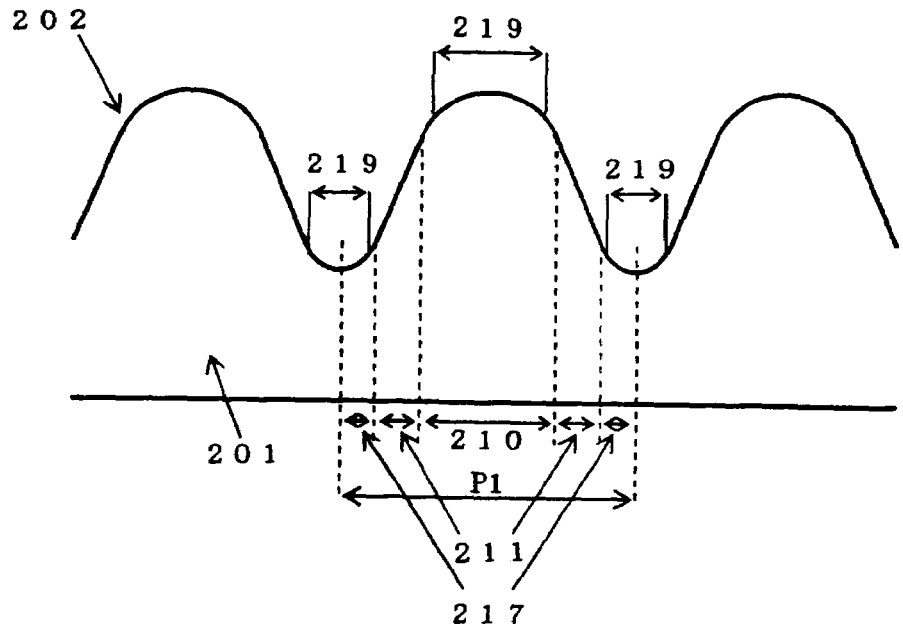
FIG. 49 is an explanatory view of an example of the cross-section of the light diffusion plate used for the present invention.

FIG. 49 represents another shape of the convex structure 202 according to the present invention. Where, a concave curve is provided in the valley portion 217 of the convex structure 202. The concave curve includes the region X219. The region X219 allows the outgoing direction of light to disperse thereby the lighting system having excellent luminance uniformity can be obtained.

Figure 50:
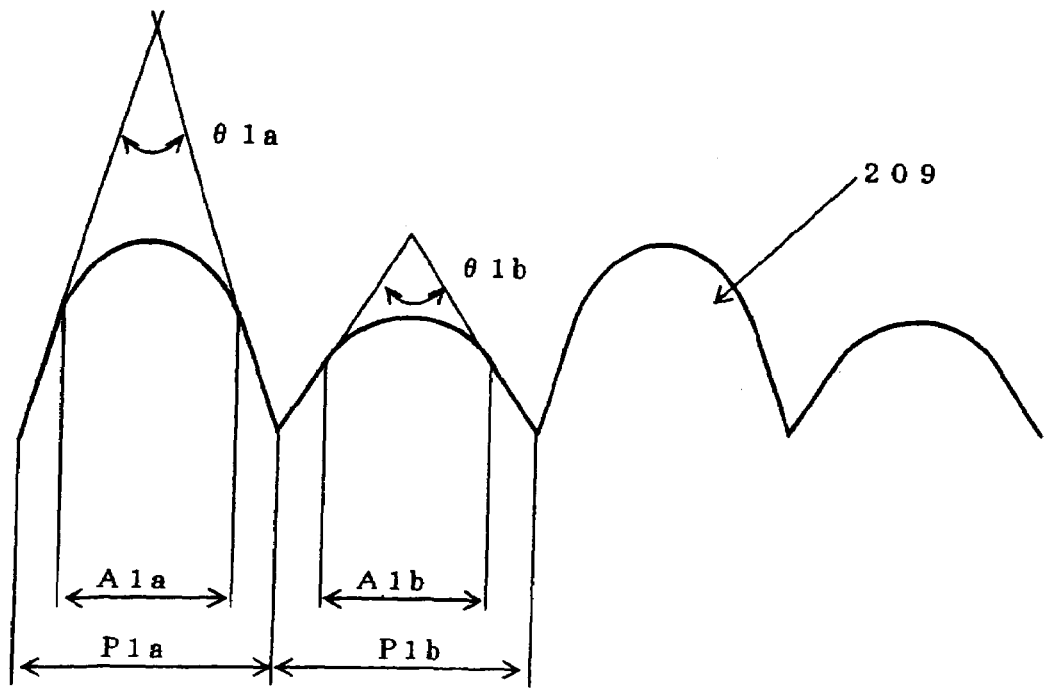
FIG. 50 is an explanatory view of an example of the cross-section of the light diffusion plate used for the present invention.

FIG. 50 represents further another shape of the convex structure 202 according to the present invention. Where, two types of convex structures having different shape are alternately provided. That is to say, at least one of a pair of θ1a and θ1b, a pair of A1a and A2b, and a pair of P1a and P1b are taken as the different shape each other in the figure. Thereby the degree of freedom to shape is increase in comparison with one type of the shape of the convex structure so that the property of the outgoing light further can be easily controlled. The shape is not limited to two types, of course three or more types may be applied.

Figure 51:
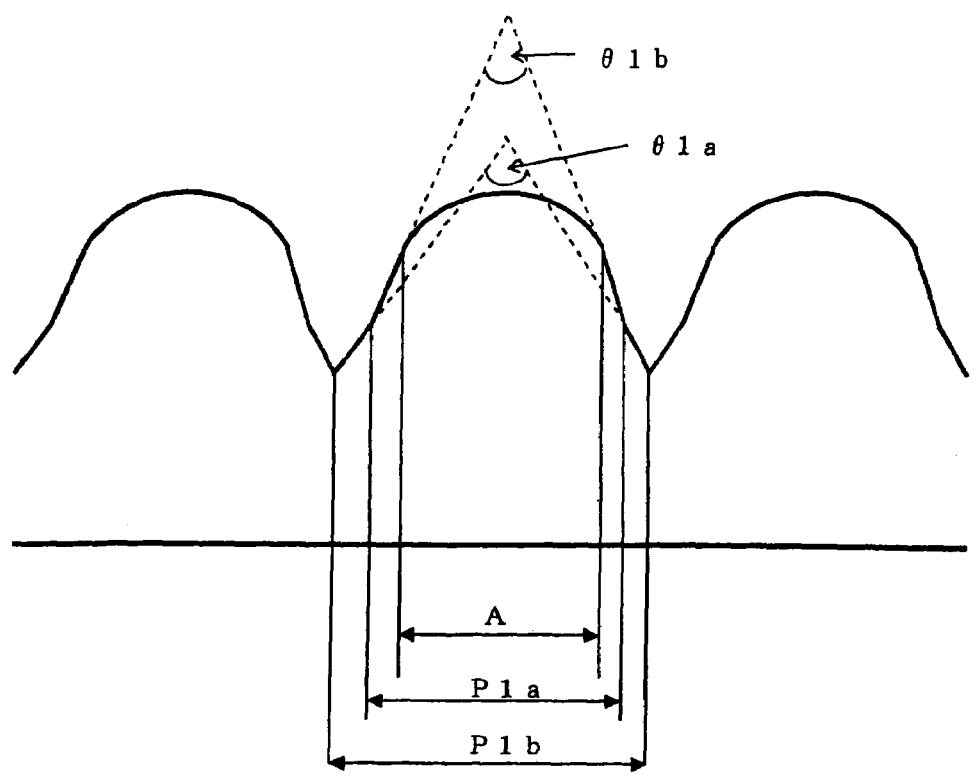
FIG. 51 is an explanatory view of an example of the cross-section of the light diffusion plate used for the present invention.

FIG. 51 represents further another shape of the convex structure 202 according to the present invention. Where, two absolute values for the slope to the exit plane of the straight portion of the bottom of the convex structure 211 are provided by the straight portions. Thereby the degree of freedom to shape for the control of the outgoing light is increased as well as FIG. 50 so that the property of the outgoing light further can be easily controlled. The slope is not limited to two types, of course three or more types may be applied. Additionally, the convex pattern is unremarkable so much in comparison with the shape of FIG. 50 and a sufficient high quality can be obtained even if the convex structure is larger than the shape of FIG. 50 so that the productivity can be improved.

Figure 52:
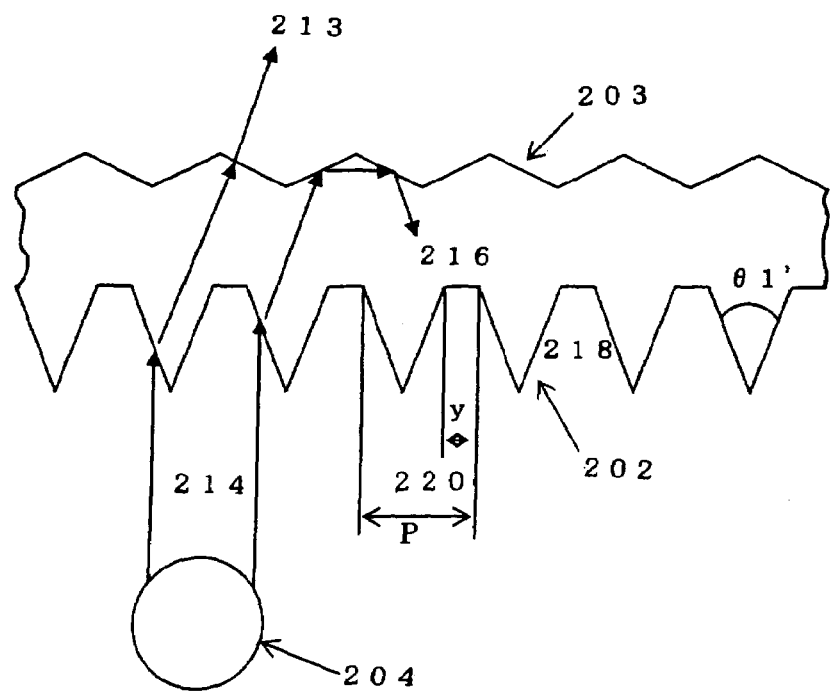
FIG. 52 is a schematic view representing the incident angle of the light incident on the light diffusion plate positioned between a plurality of light sources according to the present invention.

FIG. 52 and FIG. 53 represent a cross-section of the light diffusion plate of the present invention, in which the convex structure 202 having straight line portions crossing at an acute angle more than ($\pi/9$ radian) and approximately flat portions 218 are provided on the incident plane side, and the convexoconcave on the exit plane 203 is provided on the exit plane side, and the light action therein. When the approximately flat portions 218 are not provided, the action of the light incident on the convex structure 202 is same as when the approximately flat portions 218 are provided. That is to say, a part of the incident light 214 from the normal direction is totally reflected and returned to the incident plane side as the reflected light 216 as FIG. 52. The oblique incident light 212 is inclined into the front direction and exited as the outgoing light 213 as FIG. 53.

The apex angle θ1' of the convex structure 202 is an acute angle more than ($\pi/9$ radian) and it is preferably set from ($\pi/6$ radian) to ($\pi/3$ radian). Thereby the convex structure 202 can be easily formed. When the light obliquely incident on the light diffusion plate 201 and totally reflected by the convex structure 202 is exited from the convexoconcave on the exit plane 203, the ratio of the light exiting from the convexoconcave on the exit plane 203 to the approximately vertical direction is increased so that the luminance is increased as FIG. 53. Incidentally, the angle θ1' may be made by extending the straight line portions to cross on the incident plane side in the top.

The approximately flat portion 218 is formed by the region Y220 where the absolute value for the slope to the incident plane is an angle θ2' satisfying $0 \leq |\text{Sin}^{-1}(n \cdot \sin(\theta 2' - \text{Sin}^{-1}(1/n \cdot \sin \theta 2')))| \leq (\pi/12)$ (radian). Where, the ratio y/P between a length y of the region Y220 and a period P being the sum of the length of the convex structure 202 and the approximately flat portion 218 is preferably limited within 0.1-0.5.

If the ratio y/P is less than 0.1, the top of the die is fallen down when the prism portion on the incident plane 5 is molding thereby troubles such as forming failure may be occurred. Alternatively, if the ratio y/P is more than 0.5, the capability of controlling the incident light by the prism portion on the incident plane 5 is significantly reduced.

The absolute value for the slope to the incident plane of the region Y is the angle θ2' satisfying $0 \leq |\text{Sin}^{-1}(n \cdot \sin(\theta 2' - \text{Sin}^{-1}(1/n \cdot \sin \theta 2')))| \leq (\pi/12)$ (radian). The reason is as follows.

When the light in air having the refractive index 1 incident on the region Y of the light diffusion plate having the refractive index n from the normal direction, the incident angle is θ2' with the normal line provided that the slope of the region Y to the incident plane is θ2'. The light is inclined to an angle θ2" in the light diffusion plate, incident on the exit plane to an angle θ2''', inclined again and exited to an angle θ2''''.

Where, $\theta 2'' = \text{Sin}^{-1}((1/n) \cdot \sin \theta 2')$ $\theta 2''' = \theta 2' - \theta 2''$ $\theta 2'''' = \text{Sin}^{-1}(n \cdot \sin(\theta'''))$ Thereby $\theta 2'''' = \text{Sin}^{-1}(n \cdot \sin(\theta 2' - \text{Sin}^{-1}(1/n \cdot \sin \theta 2')))$ Accordingly, when $0 \leq \text{Sin}^{-1}(n \cdot \sin(\theta 2' - \text{Sin}^{-1}(1/n \cdot \sin \theta 2'))) \leq (\pi/12)$ (radian), the outgoing light angle with the normal direction of the exit plane becomes a preferred range from ($-\pi/12$ radian) to ($\pi/12$ radian). When the convexoconcave is provided on the exit plane, the light is inclined into different direction. However, the convexoconcave is shaped as follows so that a desirable distribution centered on ($-\pi/12$ radian)–($\pi/12$ radian) can be obtained.

Figure 55:
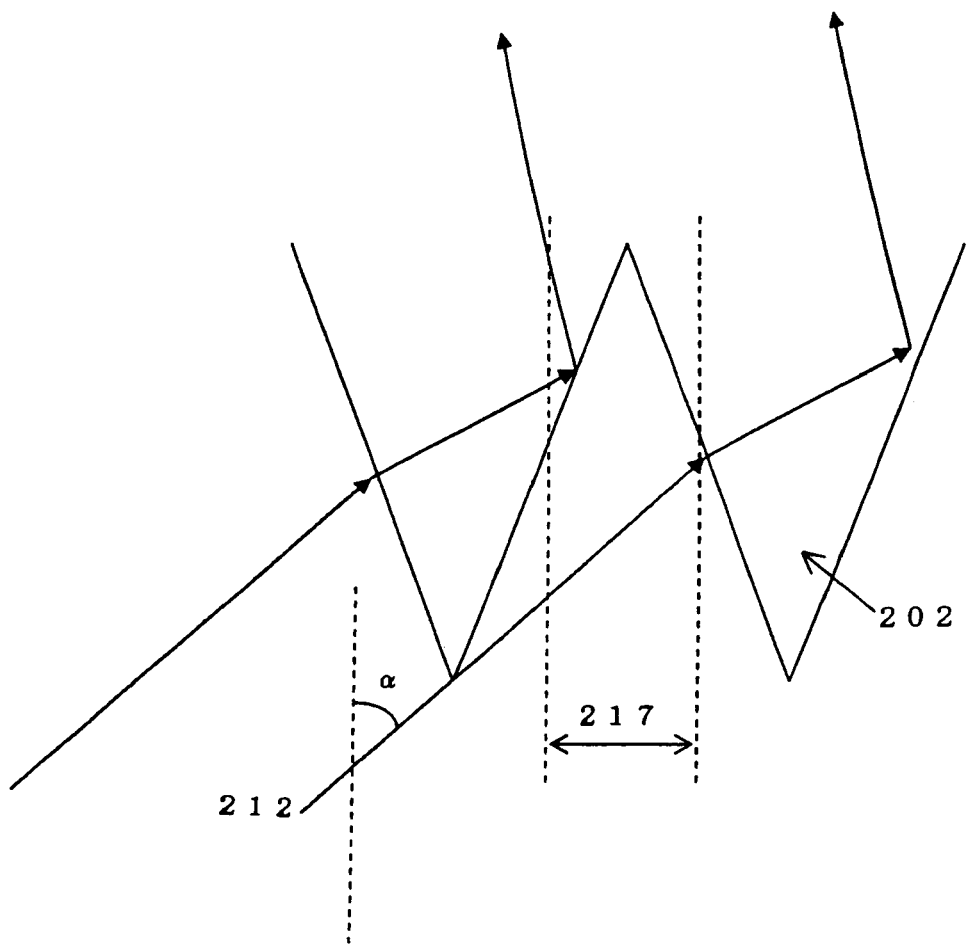
FIG. 55 is a schematic view representing the relationship between the optical path of the light obliquely incident on the prism provided on the incident plane and the valley of the prism according to the present invention.
Figure 56:
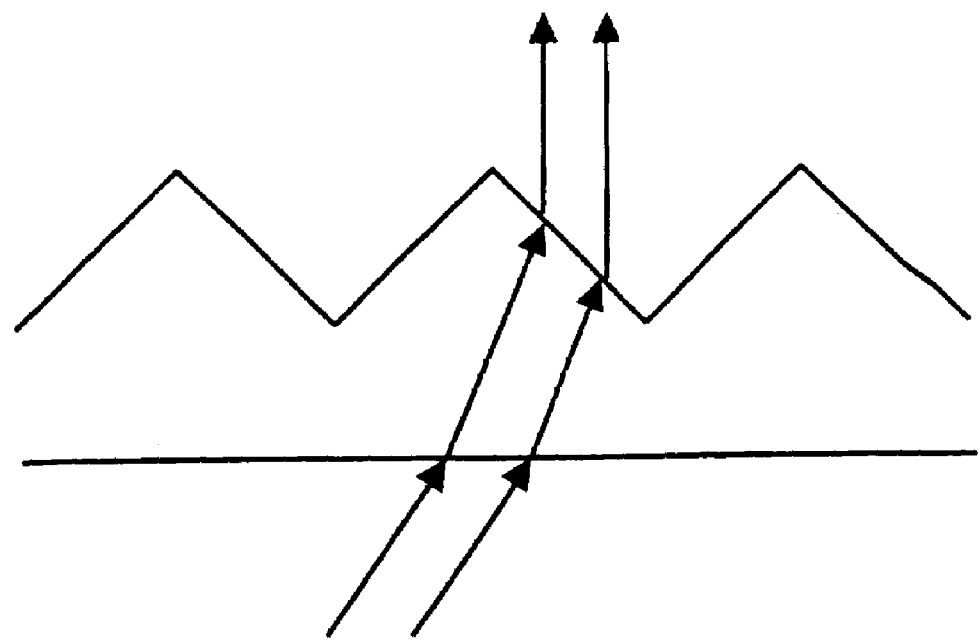
FIG. 56 is a schematic view representing the optical path of the light obliquely incident on the prism according to a comparative example to the present invention.
Figure 57:
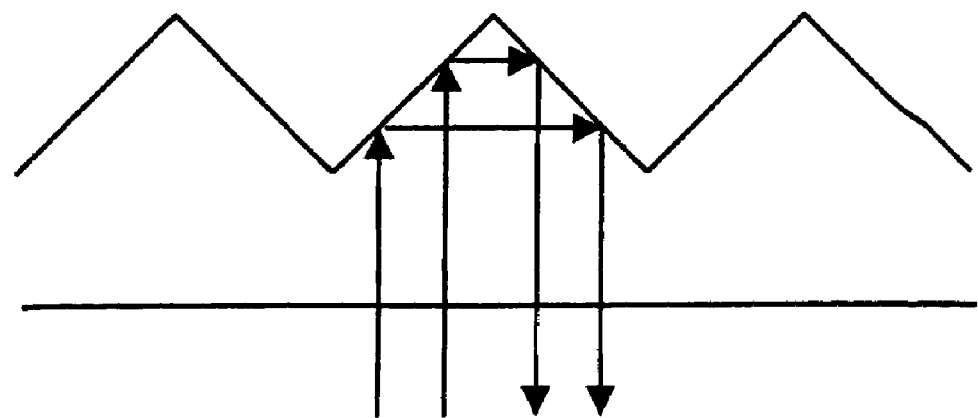
FIG. 57 is a schematic view representing the optical path of the light vertically incident on the prism according to a comparative example to the present invention.

When the convex structure 202 is provided on the incident plane, the oblique incident 212 incident at the angle α is not incident on the valley portion 217 of the convex structure as FIG. 55. Accordingly, the valley portion 217 is independent of the directional control of the oblique incident light 212 at the angle α. Therefore, it is preferable that the region Y is provided in the valley portion to adjust the total light transmittance of the incident light from the normal direction because it does not adversely affect on the directional control of the oblique incident light at the angle α. Meanwhile, if the region Y is provided on the top of the convex structure (not shown in the figure), the light incident from the angle α is incident on the region Y and exits to the different direction so that the light exited to the front direction is reduced. Additionally, the region Y which is originally provided in order to control the total light transmittance from the normal direction affects also the luminance angle distribution thereby to make difficult to design. That is to say, the region Y may provided not on the top of the convex structure but on the section between the convex structures on the incident plane in order to easily control transmittance and reflectance.

Meanwhile, the convexoconcave on the exit plane 203 provided on the exit plane of the light diffusion plate 201 has a plurality of convex streaks or concave grooves extending in parallel with the longitudinal direction of the prism portion on the incident plane 5. The cross-section of the convexoconcave on the exit plane 203 can be formed by any of shape, such as prism shape (triangle) lenticular lens shape (circular arc), approximately sine wave shape, cylindrical lens shape or the combination thereof. Embossment shape in which the convex or concave are randomly arranged in the two dimensions may be applied according to need.

Forming the convex structure 202 and the convexoconcave on the exit plane 203, any of an extrusion molding, an injection molding and a 2P (Photoreplication Process) hybrid molding using ultraviolet curing resin can be used. The forming method may be selected in consideration of size, required shape and productivity of the prism portion on the incident plane 5 and the convexoconcave on the exit plane 203.

The first example of the present embodiment will be described in detail.

A female die having grooves of the elliptic cross-section P1=300 μm as FIG. 45 is formed by cutting work. The shape of the ellipse is derived from the following formula.

$$y=0.139-8.33x2/(1+(1-38.9x2)^{1/2})(-0.15 \leq x \leq 0.15 \text{ (mm)}).$$

Next, convex shaped prisms are formed on the surface of a polycarbonate film with ultraviolet curing resin by the female die. The surface on which the prisms made of the polycarbonate film are not formed is bonded to a transparent acrylic board having the thickness of 2 mm to obtain a light diffusion plate in which the convex structures are formed on one side. Where, the size of the principal plane of the light diffusion plate is 55 mm in the P1 direction and 500 nm in the direction perpendicular to the P1. θ1 is (0.27π radian). The refractive index of the light diffusion plate is different between the acrylic board portion, the polycarbonate portion and the ultraviolet curing resin portion. Since the property is determined based on the material to form the convex structure, the refractive index 1.54 of the ultraviolet curing resin is adopted. Therefore, the length x of P1 directional component in a portion forming the region X within A1 is 174 μm for each convex structure. Additionally, the ratio x/P1 as an index indicative of the ratio of the region X is 0.58.

Next, linear light sources are disposed at a distance of 15 mm from the principal plane made of the acrylic board opposite to the plane on which the convex structure is provided of the light diffusion plate such that the linear light sources are parallel with the light diffusion plate and its longitudinal direction is perpendicular to the P1 direction. The reflector is disposed at one side of the linear light source opposite to the light diffusion plate. Where, the linear light source is disposed at the center of light diffusion plate. If the angle α=60 degrees, the point on which the light is incident at the angle α is positioned at a distance of 26 mm from the center of the light diffusion plate.

In the above-described state, the cold fluorescent lamps are lighted to emit the light diffusion plate by light and the light diffusion plate is observed. As the result of the observation, the lighting system in which the lamp image is eliminated can be obtained. When light is incident on the above-described light diffusion plate at an angle 60 degrees with the normal direction of the incident plane, the total light transmittance R1 is 72%. When light is incident to the normal direction, the total light transmittance R2 is 52%. The ratio of those total light transmittance R1/R2 is 1.38.

The second example of the present embodiment will be described in detail. Firstly, a female die having grooves of the cross-section including two approximately linear bottoms whose extension lines crossing at an angle θ1=(0.27π radian), P1=260 μm, and A1=182 μm is manufactured by cutting work.

Next, convex shaped prisms are formed on the surface of a polycarbonate film with ultraviolet curing resin by the female die. The surface on which the prisms made of the polycarbonate film are not formed is bonded to a transparent acrylic board having the thickness of 2 mm to obtain a light diffusion plate in which the convex structures are formed on one side. Where, the size of the principal plane is 55 mm in the P1 direction and 500 nm in the direction perpendicular to the P1. The refractive index of the light diffusion plate is different between the acrylic board portion, the polycarbonate portion and the ultraviolet curing resin portion. Since the property is determined based on the material to form the convex structure, the refractive index 1.54 of the ultraviolet curing resin is adopted. Therefore, the length x of P1 directional component in a portion forming the region X within A1 is 133 μm for each convex structure. Additionally, the ratio x/P1 as an index indicative of the ratio of the region X is 0.51.

Next, linear light sources are disposed at a distance of 15 mm from the principal plane made of the acrylic board opposite to the plane on which the convex structures are provided of the light diffusion plate such that the linear light sources are parallel with the light diffusion plate and its longitudinal direction is perpendicular to the P1 direction. The reflector is disposed at one side of the linear light source opposite to the light diffusion plate. Where, the linear light source is disposed at the center of light diffusion plate. If the angle α=60 degrees, the point on which the light is incident at the angle α is positioned at a distance of 26 mm from the center of the light diffusion plate.

In the above-described state, the cold fluorescent lamps are lighted to emit the light diffusion plate by light and the light diffusion plate is observed. As the result of the observation, the lighting system in which the lamp image is eliminated can be obtained. When light is incident on the above-described light diffusion plate at an angle 60 degrees with the normal direction of the incident plane, the total light transmittance R1 is 77%. When light is incident to the normal direction, the total light transmittance R2 is 51%. The ratio of those total light transmittance R1/R2 is 1.51.

The light diffusion plate according to the third example of the present embodiment has the same configuration as the second example of the present embodiment except that a circular convex curve with a width of 19 μm is provided in the valley portion between the convex structure as FIG. 49. Thereby the region X is formed in valley portion such that x=14 μm for each convex structure, and when the region X in the top of the convex structure is added thereto, x=147 μm, P1=279 μm, and x/P1 is 0.53.

Next, linear light sources are disposed at a distance of 15 mm from the principal plane made of the acrylic board opposite to the plane of the light diffusion plate, on which the convex structures are provided such that the linear light sources are parallel with the light diffusion plate and its longitudinal direction is perpendicular to the P1 direction. The reflector is disposed at one side of the linear light source opposite to the light diffusion plate. Where, the linear light source are disposed at the center of light diffusion plate. If the angle α=60 degrees, the point on which the light is incident at the angle α is positioned at a distance of 26 mm from the center of the light diffusion plate.

In the above-described state, the cold fluorescent lamps are lighted to emit the light diffusion plate by light and the light diffusion plate is observed. As the result of the observation, the lighting system in which the lamp image is eliminated can be obtained. When light is incident on the above-described light diffusion plate at an angle 60 degrees with the normal direction of the incident plane, the total light transmittance R1 is 73%. When light is incident to the normal direction, the total light transmittance R2 is 52%. The ratio of those total light transmittance R1/R2 is 1.40.

In the fourth example of the present embodiment, the absolute value of the slope of the straight line portion of the convex structure is two types as FIG. 51. The top is an approximately flat portion whose slope is less than ($0.005\pi$ radian). Where, $A=52$ μm, $P1a=130$ μm, $P1b=260$ μm, and $\theta a = (0.26\pi$ radian), $\theta b=(0.44\pi$ radian), the region X for each convex structure is $x=52$ μm, and $x/P1b$ is 0.20. The manufacturing method is same as the first-third examples of the present embodiment. Additionally the size of the principal plane is 55 mm in the P direction and 500 mm in the direction perpendicular to the P1 in the same way.

Next, linear light sources are disposed at a distance of 15 mm from the principal plane made of the acrylic board opposite to the plane of the light diffusion plate, on which the convex structures are provided such that the linear light source is parallel with the light diffusion plate and its longitudinal direction is perpendicular to the P1 direction. The reflector is disposed at one side of the linear light source opposite to the light diffusion plate. Where, the linear light sources are disposed at the center of light diffusion plate. Where, a plurality of cold fluorescent lamps are disposed at intervals of 33 mm. The acrylic board is disposed at the position at a distance of 15 mm from the cold fluorescent lamps such that the surface including the convex structure of the acrylic board is the exit plane. If the angle $\alpha=60$ degrees, the point on which the light is incident at the angle $\alpha$ is positioned at a distance of 26 mm from the center of the light diffusion plate.

In the above-described state, the cold fluorescent lamps are lighted to emit the light diffusion plate by light and the light diffusion plate is observed. As the result of the observation, the lighting system in which the lamp image is eliminated can be obtained. When light is incident on the above-described light diffusion plate at an angle 60 degrees with the normal direction of the incident plane, the total light transmittance R1 is 70%. When light is incident to the normal direction, the total light transmittance R2 is 22%. The ratio of those total light transmittance R1/R2 is 3.26.

In the fifth example of the present embodiment, the absolute value for the slope of the straight line portion of the convex structure is two types as FIG. 51. The top is an approximately flat portion whose slope is less than ($0.005\pi$ radian). Where, $A=42$ μm, $P1a=94$ μm, $P1b=260$ μm, and $\theta a=(0.26\pi$ radian), $\theta b=(0.44\pi$ radian), the region X for each convex structure is $x=42$ μm, and $x/P1b$ is 0.16. The manufacturing method is same as the first-fourth examples of the present embodiment. Additionally the size of the principal plane is 55 mm in the P direction and 500 mm in the direction perpendicular to the P1 in the same way.

Next, the linear light sources are disposed at a distance of 15 mm from the principal plane made of the acrylic board opposite to the plane of the light diffusion plate, on which the convex structures are provided such that the linear light sources are parallel with the light diffusion plate and its longitudinal direction is perpendicular to the P1 direction. The reflector is disposed at one side of the linear light sources opposite to the light diffusion plate. Where, the linear light sources are disposed at the center of light diffusion plate. Where, a plurality of cold fluorescent lamps are disposed at intervals of 33 mm. The acrylic board is disposed at the position at a distance of 15 mm from the cold fluorescent lamps such that the surface including the convex structure of the acrylic board is an exit plane. If the angle $\alpha=60$ degrees, the point on which the light is incident at the angle $\alpha$ is positioned at a distance of 26 mm from the center of the light diffusion plate.

In the above-described state, the cold fluorescent lamps are lighted to emit the light diffusion plate by light and the light diffusion plate is observed. As the result of the observation, the lighting system in which the lamp image is eliminated can be obtained. When light is incident on the above-described light diffusion plate at an angle 60 degrees with the normal direction of the incident plane, the total light transmittance R1 is 74%. When light is incident to the normal direction, the total light transmittance R2 is 16%. The ratio of those total light transmittance R1/R2 is 4.63.

Next, the sixth example of the present embodiment will be described in detail. Firstly in order to mold a die having a prism plane including prism portions having the apex angle ($0.22\pi$ radian), and a die having convexoconcaves in the shape of prism having the apex angle ($0.78\pi$) radian), respectively, a die having a plurality of grooves corresponding to each shape is manufactured by cutting work.

Next, a polycarbonate film is set in the die and ultraviolet curing resin is poured thereto so that each shape corresponding to the groove shape are formed on one side of the polycarbonate film. The rear face of the polycarbonate film on which the prism shaped portions made of the polycarbonate film are not formed is bonded to the both face of a transparent acrylic board having the thickness of 2 mm, respectively. Thereby a light diffusion plate including an incident plane formed by striped prisms with a height of 69 μm and a width of 50 μm, and an exit plane formed by striped convexoconcaves with a height of 5.5 μm and a width of 30 μm in parallel with the striped prisms is obtained.

The size of the principal plane of the light diffusion plate is 30 mm in the cross-sectional direction and 500 mm in the direction perpendicular to the cross-section.

Next, linear light sources are disposed on the plane of the light diffusion plate, on which the convex structure with an apex angle ($0.22\pi$ radian) is provided, at a distance of 15 mm from the principal plane made of the acrylic board such that the linear light source is parallel with the light diffusion plate and its longitudinal direction is perpendicular to the P1 direction. The reflector is disposed at one side of the linear light sources opposite to the light diffusion plate. Where, the linear light sources are disposed at the center of light diffusion plate. If the angle $\alpha=45$ degrees, the point on which the light is incident at the angle $\alpha$ is positioned at a distance of 15 mm from the center of the light diffusion plate.

In the above-described state, the cold fluorescent lamps are lighted to emit the light diffusion plate by light and the light diffusion plate is observed. As the result of the observation, the lighting system in which the lamp image is eliminated can be obtained. When light is incident on the above-described light diffusion plate at an angle 45 degrees with the normal direction of the incident plane, the total light transmittance R1 is 89%. When light is incident to the normal direction, the total light transmittance R2 is 57%. The ratio of those total light transmittance R1/R2 is 1.56.

Next, the seventh example of the present embodiment will be described in detail. A light diffusion plate with a length of 500 mm and with a width of 500 mm which has the same surface shape is manufactured by the same method as well as the first example of the present embodiment.

Fifteen cold fluorescent lamps are used as linear light sources to emit the light to the light diffusion plate. Where, a plurality of cold fluorescent lamps are disposed at intervals of 33 mm in parallel. The light control member 4 is disposed at a distance of 16.5 mm from the imaginary plane on which the cold fluorescent lamps are arranged. Where, the principal plane including the convex structure of the light diffusion plate is disposed such that the principal plane is the exit plane side corresponding the rear side of the plane opposite to the light source. Where, the angle α=45 degrees. A reflecting sheet is provided on one side of the cold fluorescent lamps opposite to the acrylic board.

In the above-described state, the cold fluorescent lamps are lighted to emit the light diffusion plate 201 by light and the light diffusion plate is observed. As the result of the observation, the lighting system in which the lamp image is eliminated can be obtained. When light is incident on the above-described light diffusion plate at an angle 45 degrees with the normal direction of the incident plane, the total light transmittance R1 is 67%. When light is incident to the normal direction, the total light transmittance R2 is 52%. The ratio of those total light transmittance R1/R2 is 1.29.

Next, the eighth example of the present invention will be described in detail. Firstly, a die having grooves formed by prism portions with an apex angle (0.22π radian) and approximately flat portions where the absolute value of the angle with the principal plane lying across between the prism portions in the shape of concave is 0–(1/9π), and a die having a convexo-concave plane in the shape of the striped convexoconcave with an apex angle (0.78π radian) are manufactured by cutting work, respectively. The shape of each groove is fixed.

Next, a polycarbonate film is set in the die and ultraviolet curing resin is poured thereto so that prism each shape corresponding to the shape of grooves are formed on one side of the polycarbonate film. The rear face of the polycarbonate film on which the shapes are not formed is bonded to the both face of a transparent acrylic board having the thickness of 2 mm, respectively, and the prisms with a height of 48 μm and a width of 35 μm are arranged at intervals of 50 μm thereon. Thereby a light diffusion plate including an incident plane including approximately flat portions where the absolute value of the angle with the concave principal plane is 0–(1/9π) radian), and an exit plane formed by striped convexocon-caves with a height of 5.5 μm and a width of 30 μm in parallel with the striped prisms is obtained. The size of the principal plane of the light diffusion plate is 500 mm in the cross-sectional direction and 500 mm in the direction perpendicular to the cross-section.

The refractive index of the light diffusion plate is different between the acrylic board portion, the polycarbonate portion and the ultraviolet curing resin portion. Since the property is determined based on the material to form the convex structure, the refractive index 1.54 of the ultraviolet curing resin is adopted. Therefore, if the slope of the approximately flat portion is θ2', $0 \leq |Sin^{-1}(n \cdot sin(\theta 2' - Sin^{-1}(1/n \cdot sin\ \theta 2')))| \leq ((0.94)/12)\pi$ (radian) so that it corresponds to the region Y.

Fifteen cold fluorescent lamps are used as linear light sources to emit the light to the light diffusion plate. Where, a plurality of cold fluorescent lamps are disposed at intervals of 33 mm in parallel. The light control member 4 is disposed at a distance of 16.5 mm from the imaginary plane on which the cold fluorescent lamps are arranged. Where, the principal plane made of the acrylic board is faced to the plane of the light diffusion plate, on which the convex structure with the apex angle (0.22π radian). Where, the angle α=45 degrees. A reflecting sheet is provided on one side of the cold fluorescent lamps opposite to the acrylic board.

In the above-described state, the cold fluorescent lamps are lighted to emit the light diffusion plate by light and the light diffusion plate is observed. As the result of the observation, the lighting system in which the lamp image is eliminated can be obtained. When light is incident on the above-described light diffusion plate at an angle 45 degrees with the normal direction of the incident plane, the total light transmittance R1 is 79%. When light is incident to the normal direction, the total light transmittance R2 is 66%. The ratio of those total light transmittance R1/R2 is 1.20.

COMPARATIVE EXAMPLE 2

As the first example of the present comparative example, a sheet having prisms with the apex angle (π/2 radian) formed on the exit plane thereof is disposed such that the prisms are in parallel with linear light sources. The light obliquely incident on the sheet of the present comparative example is emitted to the front direction as FIG. 56. Alternatively, the light vertically incident on the sheet is totally reflected so that the light exited to the front direction is significantly reduced. Observing from the front direction, the luminance is reduced and the ununifomity of luminance in the plane is increased at the position directly above the light source. When light is incident on the incident plane of the sheet at an angle α=45 degrees with the normal direction of the incident plane, the transmittance is 90%. When light is incident to the normal direction, the transmittance is 5%. That is to say, the ratio of the transmittance is 18. If the ratio of the transmittance is increased as just described above, the luminance directly above the light source is decreased so that the unevenness in the plane can not be adjusted.

As the second example of the present comparative example, a light diffusion plate containing fine particles of the light diffusing particles without the convex structures thereon is manufactured.

A plurality of cold fluorescent lamps are used as linear light sources to emit the light to the light diffusion plate. Where, a plurality of cold fluorescent lamps are disposed at intervals of 33 mm. The light control member 4 is disposed at a distance of 16.5 mm from the cold fluorescent lamps. Where, α=45 degrees. A reflecting sheet is provided on one side of the cold fluorescent lamps opposite to the acrylic board.

In the above-described state, the cold fluorescent lamps are lighted to emit the light diffusion plate by light and the light diffusion plate is observed. As the result of the observation, the luminance in the exit plane is uneven and the position of the lamp is clearly viewed on the viewing screen side. When light is incident on the above-described light diffusion plate at the angle α=45 degrees with the normal direction of the incident plane, the total light transmittance R1 is 46%. When light is incident to the normal direction, the total light transmittance R2 is 65%. The ratio of those total light transmittance R1/R2 is 0.71.

It is to be understood that the present invention is not intended to be limited to the above-described embodiments, and various changes may be made therein without departing from the spirit of the present invention. Such changes are also included in the scope of the present invention.

DESCRIPTION OF REFERENCE NUMERALS

Figure 35:
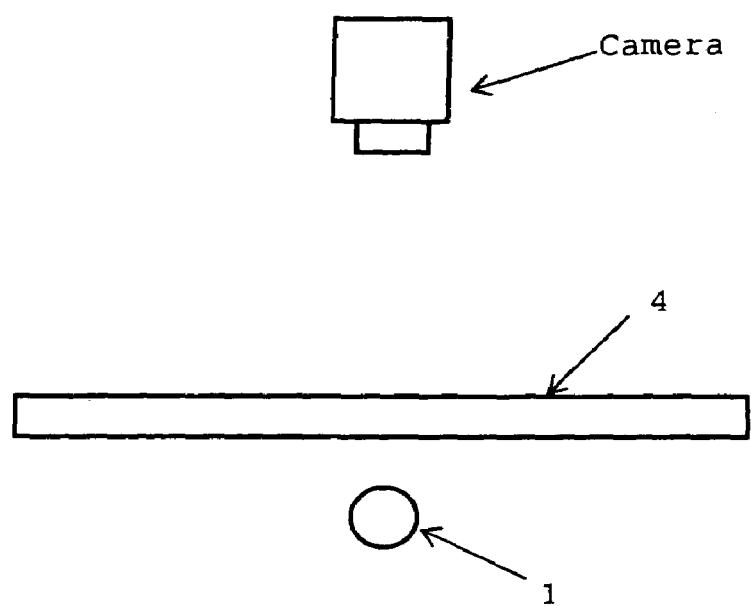
FIG. 35 is an explanatory view representing the installation state of the camera in order to compare the light control member according to the present invention with means described in the patent document 6.

1. Light source
2. Reflector
3. Imaginary plane
4. Light control member
5. Integrating sphere
6. Aperture
7. Measuring object
8. Parallel light 9. Convex structure
10. Linear portion
11. Curve portion
12. Oblique incident light
13. Vertical incident light
14. Valley portion
15. Linear light source
16. Prism
17. Exit plane irregularity
18. Flat portion
19. Incident plane
20. Fine particle-containing light diffusion plate
20a. Aperture
21. Point light source
22. Diffusion sheet
23. Polarization splitting film
24. Liquid crystal panel
25. Advancing light
26. Reflected light
100. Incident light
201: Light diffusion plate
202: Convex structure
203: Exit plane irregularity
204: Light source
205: Reflector
206: Integrating sphere
207: Measuring object
208: Aperture
209: Parallel light
210: Top of Convex structure
211: Bottom of Convex structure
212: Incident light from an oblique direction of light diffusion plate
213: Outgoing light
214: Incident light from a normal direction of light diffusion plate
215: Incident plane
216: Reflected light
217: Valley portion
218: Generally flat portion
219: Region X
220: Region Y
FIG. 2
1. Incident energy
2. Position
FIG. 3
3. Luminance
4. Incident angle
FIG. 5
5. Light source X1
FIG. 8
6. Outgoing light
FIG. 9
7. Reflected light
FIG. 10
8. Normal direction
FIG. 13
9. Transmit
FIG. 14
10. Reflect
FIG. 17B
11. Brightness
12. Position
FIG. 18
13. Vertical outgoing light
14. Oblique transmitted light
15. Film N3
FIG. 24
16. Shape S1
FIG. 28
17. Slope (deg)
18. Coordinate
19. Height
20. Region U1
FIG. 35
21. Camera
FIG. 40
22. Incident energy
23. Position
FIG. 41
24. Luminance
25. Incident angle
FIG. 45
26. Normal direction

What is claimed is:

1. A direct type lighting system comprising:
a plurality of light sources,
a reflector, and
a light control member configured to control an outgoing direction when light reflected by the reflector passes therethrough, wherein
the plurality of light sources are separated from proximate light sources by a distance D in a first direction, and are disposed between the light control member and the reflector in a second direction normal to the first direction,
the light control member includes an incident plane configured to primarily receive light and an exit plane configured to primarily emit light, and a plurality of convex structures are formed on the exit plane or the incident plane of the light control member,
the distance between each of the light sources and the light control member is H in the second direction, and
the total light transmittance of the light incident on any point on the incident plane at an angle $\alpha = \text{Tan}^{-1}\{(D/2)/H\}$, where the angle x is the incident angle when light emitted from one of the light sources is incident on the incident plane directly above the middle point between the one light source and the proximate light source of the one light source, is more than 50% of total light transmittance of the plurality of light sources and 1.05-3 times as much as the total light transmittance when the light is incident on the respective points on the incident plane from the normal direction,
wherein a ratio of an area of regions U provided below a cross-section of each convex structure and above the incident plane of the light control member to the total area provided below said cross-section of each convex structure is between 0.2-0.8 where the regions U are the areas provided below the convex structures and above the incident plane of the light control member corresponding to portions of the convex structures having a slope with an absolute value of 50-70 degrees.

2. The lighting system according to claim 1, wherein a cross-section of each convex structure is formed of two substantially straight line portions and a convex curve portion provided between the two substantially straight line portions. and were the two substantially straight lines extended, the extensions would cross forming an acute angle θ.

3. The lighting system according to claim 1, wherein 10-50% of the light incident on the incident plane of the light control member at the angle u exits at an angle from −15 degrees to +15 degrees relative to the normal direction of the exit plane.

4. The lighting system according to claim 1, wherein in the light control member, a plurality of convex structures are formed on the incident plane, a cross-section of each convex structure is formed of two substantially straight line portions and a top portion provided between the two substantially straight line portions, and the light emitted from the light source to the light control member is inclined in a plurality of directions relative to the incident plane.

5. The lighting system according to claim 1, wherein:
the at least one light source is a linear light source,
the plurality of convex structures are formed on the exit plane of the light control member, and
a ridgeline of the convex structures perpendicular to the exit plane, dissected in a direction defined by a top of the convex structure, and in parallel with the linear light source is a straight line extending in a direction in parallel with the linear light source.

6. The lighting system according to claim 1, wherein at least one layer having a thickness of less than 1 μm and made of material having a refractive index less than that of a base material of the light control member is formed on at least either of the incident plane or the exit plane of the light control member.

7. The lighting system according to claim 1, wherein at least one light source is a point light source.

8. An image display apparatus in which a transmissive display device is provided on the lighting system according to claim 1.

* * * * *